US012783976B2

(12) United States Patent
Andre et al.

(10) Patent No.: US 12,783,976 B2
(45) Date of Patent: Nov. 3, 2026

(54) METHOD AND SYSTEM FOR BUILDING AND MIGRATING CLOUD SERVICE SUBSCRIPTIONS FOR USE IN CREATING RATE CARDS

(71) Applicant: ORACLE INTERNATIONAL CORPORATION, Redwood Shores, CA (US)

(72) Inventors: Sandeep Andre, Seattle, WA (US); Rohit Shetty, Seattle, WA (US); Anindya Ghosh, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 232 days.

(21) Appl. No.: 18/639,768

(22) Filed: Apr. 18, 2024

(65) Prior Publication Data

US 2024/0362655 A1 Oct. 31, 2024

Related U.S. Application Data

(60) Provisional application No. 63/462,878, filed on Apr. 28, 2023.

(51) Int. Cl.
*G06Q 10/0631* (2023.01)
*G06Q 20/22* (2012.01)
(Continued)

(52) U.S. Cl.
CPC . *G06Q 10/06312* (2013.01); *G06Q 10/06313* (2013.01); *G06Q 20/22* (2013.01); *G06Q 30/0201* (2013.01); *H04L 63/102* (2013.01)

(58) Field of Classification Search
CPC ....... G06Q 10/06312; G06Q 10/06313; G06Q 10/06317; G06Q 20/22; G06Q 30/0201; H04L 63/102
See application file for complete search history.

(56) References Cited

U.S. PATENT DOCUMENTS 6,865,601 B1 3/2005 Cherkasova et al.
8,113,959 B2 2/2012 De Judicibus
(Continued)

FOREIGN PATENT DOCUMENTS

CA 2804864 C 11/2018
CA 3159014 A1 6/2021
(Continued)

OTHER PUBLICATIONS

K. Bakshi, "Considerations for cloud data centers: Framework, architecture and adoption," 2011 Aerospace Conference, Big Sky, MT, USA, 2011, pp. 1-7, doi: 10.1109/AERO.2011.5747554. (Year: 2011).*

(Continued)

*Primary Examiner* — George Chen
*Assistant Examiner* — Tayar M Kyu
(74) *Attorney, Agent, or Firm* — Invoke

(57) ABSTRACT

Embodiments described herein are generally related to systems and methods for providing access to software products or services in a cloud computing or other computing environment. Dynamic rate card management allows organizations to optimize the number of rate cards to a manageable level wherein, for example, rate cards can be associated with the type of contract policy. In accordance with an embodiment, in order to accommodate the use of dynamic rate cards, a migration service or process can be used to convert/migrate subscriptions that were originally created under a first, legacy or former subscription pricing model, to conform instead with a subscription pricing service model, for use with the various systems, methods, and features described herein.

20 Claims, 22 Drawing Sheets

(51) Int. Cl.
*G06Q 30/0201* (2023.01)
*H04L 9/40* (2022.01)

(56) References Cited

U.S. PATENT DOCUMENTS

| | | | |
|---|---|---|---|
| 8,161,173 | B1 | 4/2012 | Mishra et al. |
| 8,214,398 | B1 | 7/2012 | Cowan et al. |
| 8,504,443 | B2 | 8/2013 | Ferris et al. |
| 8,898,763 | B1 | 11/2014 | Mannepalli et al. |
| 8,959,221 | B2 | 2/2015 | Morgan |
| 9,092,502 | B1 | 7/2015 | Cannaliato et al. |
| 9,100,424 | B1 | 8/2015 | Thomas |
| 9,137,093 | B1 | 9/2015 | Abraham et al. |
| 9,160,749 | B2 | 10/2015 | Subramanian et al. |
| 9,306,814 | B1 | 4/2016 | Roth et al. |
| 9,438,599 | B1 | 9/2016 | Yuhan et al. |
| 9,553,787 | B1 | 1/2017 | Stickle et al. |
| 9,569,630 | B2 | 2/2017 | Cabrera et al. |
| 9,571,516 | B1 | 2/2017 | Curcic et al. |
| 9,722,895 | B1 | 8/2017 | Sarukkai et al. |
| 9,824,390 | B2 | 11/2017 | Adapalli et al. |
| 9,876,703 | B1 | 1/2018 | Arllen et al. |
| 9,985,947 | B1 | 5/2018 | Elhard |
| 10,021,084 | B2 | 7/2018 | Matthews et al. |
| 10,061,932 | B1 | 8/2018 | Combs et al. |
| 10,089,476 | B1 | 10/2018 | Roth et al. |
| 10,122,717 | B1 | 11/2018 | Reddy et al. |
| 10,198,756 | B2 | 2/2019 | Van Erlach |
| 10,237,149 | B1 | 3/2019 | Guo et al. |
| 10,261,782 | B2 | 4/2019 | Suarez et al. |
| 10,270,759 | B1 | 4/2019 | Bordelon et al. |
| 10,318,265 | B1 | 6/2019 | To et al. |
| 10,411,975 | B2 | 9/2019 | Martinez et al. |
| 10,496,306 | B1 | 12/2019 | Srivastava et al. |
| 10,503,917 | B2 | 12/2019 | Roth et al. |
| 10,511,675 | B1 | 12/2019 | Chud |
| 10,528,995 | B2 | 1/2020 | Maes |
| 10,554,418 | B2 | 2/2020 | Kshirsagar et al. |
| 10,567,360 | B2 | 2/2020 | Nirwal et al. |
| 10,757,574 | B1 | 8/2020 | Rule et al. |
| 10,834,100 | B2 | 11/2020 | Hoy et al. |
| 10,878,483 | B1 | 12/2020 | Felbinger et al. |
| 10,956,600 | B2 | 3/2021 | Ye et al. |
| 10,972,445 | B2 | 4/2021 | Tucker et al. |
| 10,974,516 | B2 | 4/2021 | Moriya |
| 10,977,377 | B2 | 4/2021 | Roth et al. |
| 11,010,191 | B1 | 5/2021 | Hornbeck |
| 11,070,492 | B2 | 7/2021 | Kostov et al. |
| 11,121,985 | B2 | 9/2021 | Cidon et al. |
| 11,240,110 | B1 | 2/2022 | Narula et al. |
| 11,252,157 | B1 | 2/2022 | Khanna et al. |
| 11,321,137 | B2 | 5/2022 | Barsalou et al. |
| 11,323,477 | B1 | 5/2022 | Kumar et al. |
| 11,356,273 | B1 | 6/2022 | Patel et al. |
| 11,360,821 | B1 | 6/2022 | Dey et al. |
| 11,379,353 | B1 | 7/2022 | Marchetti et al. |
| 11,436,012 | B1 | 9/2022 | Narayan |
| 11,444,925 | B1 | 9/2022 | Patimer et al. |
| 11,537,627 | B1 | 12/2022 | Baskaran et al. |
| 11,537,745 | B2 | 12/2022 | Yang et al. |
| 11,552,953 | B1 | 1/2023 | Avadhanam |
| 11,574,151 | B2 | 2/2023 | Wang et al. |
| 11,575,508 | B2 | 2/2023 | Anand et al. |
| 11,587,458 | B2 | 2/2023 | Lowensohn |
| 11,593,251 | B2 | 2/2023 | Chirkin et al. |
| 11,604,672 | B2 | 3/2023 | Subramanian et al. |
| 11,611,558 | B2 | 3/2023 | Lee et al. |
| 11,652,616 | B2 | 5/2023 | Zee et al. |
| 11,689,475 | B2 | 6/2023 | Goyal |
| 11,720,536 | B1 | 8/2023 | Kisser et al. |
| 11,727,464 | B2 | 8/2023 | Eisenstein et al. |
| 11,765,244 | B1 | 9/2023 | Barclay et al. |
| 11,853,753 | B1 | 12/2023 | Chawda et al. |
| 11,936,678 | B2 | 3/2024 | Pieczul et al. |
| 11,943,385 | B1 | 3/2024 | Kumar et al. |
| 11,954,238 | B1 | 4/2024 | Tan et al. |
| 12,021,888 | B1 | 6/2024 | Reed et al. |
| 12,028,274 | B1 | 7/2024 | Krishnaiah et al. |
| 12,067,493 | B2 | 8/2024 | Zhang et al. |
| 12,143,917 | B2 | 11/2024 | Raffa et al. |
| 12,164,652 | B1 | 12/2024 | Li et al. |
| 12,363,148 | B1 | 7/2025 | Anil et al. |
| 12,373,252 | B1 | 7/2025 | Faust et al. |
| 12,412,103 | B1 | 9/2025 | Chen et al. |
| 12,445,419 | B2 | 10/2025 | Adogla et al. |
| 12,457,204 | B2 | 10/2025 | Adogla et al. |
| 12,475,015 | B2 | 11/2025 | Peterson et al. |
| 12,487,833 | B2 | 12/2025 | Peterson et al. |
| 12,493,901 | B2 | 12/2025 | Gallagher et al. |
| 2002/0026592 | A1 | 2/2002 | Gavrila et al. |
| 2002/0198973 | A1 | 12/2002 | Besaw |
| 2003/0135593 | A1 | 7/2003 | Lee et al. |
| 2003/0154407 | A1 | 8/2003 | Kato et al. |
| 2005/0198331 | A1 | 9/2005 | Okajima et al. |
| 2006/0230281 | A1 | 10/2006 | Hofmann |
| 2006/0236381 | A1 | 10/2006 | Weeden et al. |
| 2006/0259833 | A1 | 11/2006 | Swoboda et al. |
| 2007/0124374 | A1 | 5/2007 | Arun et al. |
| 2007/0168531 | A1 | 7/2007 | Sitaraman et al. |
| 2007/0179859 | A1 | 8/2007 | Chan et al. |
| 2009/0164499 | A1 | 6/2009 | Samudrala et al. |
| 2009/0165078 | A1 | 6/2009 | Samudrala et al. |
| 2009/0205018 | A1 | 8/2009 | Ferraiolo et al. |
| 2010/0106678 | A1 | 4/2010 | Pietrek et al. |
| 2010/0131624 | A1 | 5/2010 | Ferris |
| 2010/0153865 | A1 | 6/2010 | Barnes et al. |
| 2010/0212004 | A1 | 8/2010 | Fu |
| 2010/0318609 | A1 | 12/2010 | Lahiri et al. |
| 2011/0153671 | A1 | 6/2011 | Taniguchi |
| 2011/0167435 | A1 | 7/2011 | Fang |
| 2011/0277017 | A1 | 11/2011 | Ivanov et al. |
| 2011/0295727 | A1 | 12/2011 | Ferris et al. |
| 2011/0296000 | A1 | 12/2011 | Ferris et al. |
| 2012/0102486 | A1 | 4/2012 | Yendluri |
| 2012/0117462 | A1 | 5/2012 | Jacobson et al. |
| 2012/0124211 | A1 | 5/2012 | Kampas et al. |
| 2012/0131162 | A1 | 5/2012 | Brandt et al. |
| 2012/0137001 | A1 | 5/2012 | Ferris et al. |
| 2013/0054426 | A1 | 2/2013 | Rowland et al. |
| 2013/0111027 | A1 | 5/2013 | Milojicic et al. |
| 2013/0111609 | A1 | 5/2013 | Resch et al. |
| 2013/0124720 | A1 | 5/2013 | Wood et al. |
| 2013/0226699 | A1 | 8/2013 | Long |
| 2013/0232463 | A1 | 9/2013 | Nagaraja et al. |
| 2013/0232480 | A1 | 9/2013 | Winterfeldt et al. |
| 2013/0276142 | A1 | 10/2013 | Peddada |
| 2013/0282540 | A1 | 10/2013 | Bliesner |
| 2013/0282798 | A1 | 10/2013 | Mccarthy et al. |
| 2013/0297711 | A1 | 11/2013 | Nhu |
| 2013/0304925 | A1 | 11/2013 | Ferris et al. |
| 2013/0339515 | A1 | 12/2013 | Radhakrishnan |
| 2014/0007041 | A1 | 1/2014 | Schmeling et al. |
| 2014/0047064 | A1 | 2/2014 | Maturana et al. |
| 2014/0074793 | A1 | 3/2014 | Doering et al. |
| 2014/0075032 | A1 | 3/2014 | Vasudevan et al. |
| 2014/0075034 | A1 | 3/2014 | Vasudevan et al. |
| 2014/0075565 | A1 | 3/2014 | Srinivasan et al. |
| 2014/0089393 | A1 | 3/2014 | Druet et al. |
| 2014/0095546 | A1 | 4/2014 | Kruglikov et al. |
| 2014/0122707 | A1 | 5/2014 | De et al. |
| 2014/0173683 | A1 | 6/2014 | Zhang et al. |
| 2014/0188938 | A1 | 7/2014 | Banks et al. |
| 2014/0215590 | A1 | 7/2014 | Brand |
| 2014/0236745 | A1 | 8/2014 | Vautour |
| 2014/0280595 | A1 | 9/2014 | Mani et al. |
| 2014/0280948 | A1 | 9/2014 | Schmidt et al. |
| 2015/0089066 | A1 | 3/2015 | Meswani et al. |
| 2015/0089575 | A1 | 3/2015 | Vepa et al. |
| 2015/0106430 | A1 | 4/2015 | Y Arcas et al. |
| 2015/0106736 | A1 | 4/2015 | Torman et al. |
| 2015/0127531 | A1 | 5/2015 | Dimmler et al. |
| 2015/0134485 | A1 | 5/2015 | Kim et al. |
| 2015/0180734 | A1 | 6/2015 | Maes et al. |
| 2015/0180949 | A1 | 6/2015 | Maes et al. |

(56) References Cited

U.S. PATENT DOCUMENTS

2015/0200966 A1 7/2015 Kasturirangan et al.
2015/0242262 A1 8/2015 Ranganathan et al.
2015/0312268 A1 10/2015 Ray
2015/0358161 A1 12/2015 Kancharla et al.
2015/0363852 A1 12/2015 Vautour
2015/0365291 A1 12/2015 Burton et al.
2015/0372938 A1 12/2015 Patel et al.
2015/0381526 A1 12/2015 Beaty et al.
2016/0028833 A1 1/2016 Georgieva
2016/0043909 A1 2/2016 Pogrebinsky et al.
2016/0110553 A1 4/2016 Factor et al.
2016/0125489 A1 5/2016 Gupte et al.
2016/0127418 A1 5/2016 Maes et al.
2016/0127454 A1 5/2016 Maheshwari et al.
2016/0132806 A1 5/2016 To et al.
2016/0139737 A1 5/2016 Conn et al.
2016/0142211 A1 5/2016 Metke et al.
2016/0142323 A1 5/2016 Lehmann et al.
2016/0203544 A1 7/2016 Smits et al.
2016/0253722 A1 9/2016 Johnson et al.
2016/0277411 A1 9/2016 Dani et al.
2016/0294881 A1 10/2016 Hua et al.
2016/0323183 A1 11/2016 Jeuk et al.
2016/0330073 A1 11/2016 Li
2016/0337365 A1 11/2016 Beiter
2017/0006119 A1 1/2017 Pogrebinsky et al.
2017/0069011 A1 3/2017 Akkiraju et al.
2017/0111331 A1 4/2017 Auradkar et al.
2017/0111446 A1 4/2017 Rivera et al.
2017/0116334 A1 4/2017 Kruglikov et al.
2017/0149564 A1 5/2017 Mccallum
2017/0201525 A1 7/2017 Biller et al.
2017/0214632 A1 7/2017 Ravi
2017/0230229 A1 8/2017 Sasturkar et al.
2017/0272336 A1 9/2017 Johnstone et al.
2017/0323112 A1 11/2017 Tran et al.
2017/0373860 A1 12/2017 Kshirsagar et al.
2018/0025399 A1 1/2018 Nedeltchev et al.
2018/0025403 A1 1/2018 Mckay et al.
2018/0052861 A1 2/2018 Seetharaman et al.
2018/0077031 A1 3/2018 Chen et al.
2018/0123890 A1 5/2018 Merk et al.
2018/0124105 A1 5/2018 Rodrigues
2018/0137261 A1 5/2018 Lattin et al.
2018/0176023 A1 6/2018 Prickett et al.
2018/0191718 A1 7/2018 Kuzkin et al.
2018/0197161 A1 7/2018 Kuzkin et al.
2018/0211236 A1 7/2018 Rutherford et al.
2018/0212778 A1 7/2018 Novak
2018/0219784 A1 8/2018 Jiang et al.
2018/0232786 A1 8/2018 Kuzkin et al.
2018/0234256 A1 8/2018 Bowen
2018/0287914 A1 10/2018 Gupta
2018/0288057 A1 10/2018 Varadamma et al.
2018/0288063 A1 10/2018 Koottayi et al.
2018/0288135 A1 10/2018 Narayan et al.
2018/0356964 A1 12/2018 Morris
2018/0367542 A1 12/2018 Wolf et al.
2018/0373521 A1 12/2018 Huang et al.
2019/0020659 A1 1/2019 Loni et al.
2019/0068495 A1 2/2019 Jeuk et al.
2019/0068622 A1 2/2019 Lin et al.
2019/0075111 A1 3/2019 Mutha et al.
2019/0087835 A1 3/2019 Schwed et al.
2019/0097812 A1 3/2019 Toth
2019/0104035 A1 4/2019 Cidon et al.
2019/0114335 A1 4/2019 Koenig et al.
2019/0132299 A1 5/2019 Tucker et al.
2019/0149417 A1 5/2019 Augusto et al.
2019/0156000 A1 5/2019 Hoffmann et al.
2019/0166007 A1 5/2019 Sundaram et al.
2019/0166208 A1 5/2019 Shi et al.
2019/0182153 A1 6/2019 Gundavelli et al.
2019/0190917 A1 6/2019 Joe
2019/0205045 A1 7/2019 Hugot et al.
2019/0273796 A1 9/2019 Allgeier et al.
2019/0332789 A1 10/2019 Vandenbrouck et al.
2019/0334917 A1 10/2019 Demmler et al.
2019/0354692 A1 11/2019 Thoram et al.
2019/0362087 A1 11/2019 Ferrans et al.
2020/0004569 A1 1/2020 Gupta et al.
2020/0007541 A1 1/2020 Appiah et al.
2020/0014659 A1 1/2020 Chasman et al.
2020/0042675 A1 2/2020 Asanghanwa et al.
2020/0059420 A1 2/2020 Abraham
2020/0074520 A1 3/2020 Bermudez et al.
2020/0084216 A1 3/2020 North et al.
2020/0097315 A1 3/2020 Faynberg et al.
2020/0112497 A1 4/2020 Yenumulapalli et al.
2020/0117757 A1 4/2020 Yanamandra et al.
2020/0127823 A1 4/2020 Vats et al.
2020/0204357 A1 6/2020 Seyfried et al.
2020/0244527 A1 7/2020 Sharma et al.
2020/0244549 A1 7/2020 Finch et al.
2020/0250661 A1 8/2020 Padmanabhan et al.
2020/0274900 A1 8/2020 Vaishnavi
2020/0285737 A1 9/2020 Kraus et al.
2020/0358756 A1 11/2020 Rose et al.
2020/0366716 A1 11/2020 Singh et al.
2020/0389463 A1 12/2020 Chen
2021/0036851 A1 2/2021 Villapakkam et al.
2021/0064431 A1 3/2021 Smith et al.
2021/0067372 A1 3/2021 Cidon et al.
2021/0067468 A1 3/2021 Cidon et al.
2021/0075870 A1 3/2021 Kempf et al.
2021/0081404 A1* 3/2021 Kempf ................ G06F 16/2379
2021/0084048 A1 3/2021 Kannan et al.
2021/0142276 A1 5/2021 Gupte
2021/0182940 A1 6/2021 Gupta et al.
2021/0216190 A1 7/2021 Vakil et al.
2021/0218722 A1 7/2021 Gaylor et al.
2021/0224076 A1 7/2021 Dockter et al.
2021/0224132 A1 7/2021 Barsalou
2021/0224409 A1 7/2021 Avanes et al.
2021/0226956 A1 7/2021 Wei et al.
2021/0234864 A1 7/2021 Dube et al.
2021/0273914 A1 9/2021 Cobb
2021/0279109 A1 9/2021 Ji et al.
2021/0334345 A1 10/2021 Sim et al.
2021/0368514 A1 11/2021 Xing
2021/0377272 A1 12/2021 Dasari et al.
2021/0377276 A1 12/2021 Dasari et al.
2021/0377735 A1 12/2021 Latour et al.
2021/0382725 A1 12/2021 Vemula et al.
2021/0383325 A1 12/2021 Loupos et al.
2021/0392048 A1 12/2021 Olden et al.
2021/0392142 A1 12/2021 Stephens et al.
2021/0409403 A1 12/2021 Lewin et al.
2022/0029803 A1 1/2022 Vijayanarayanan
2022/0038449 A1 2/2022 Tripp et al.
2022/0050699 A1 2/2022 Momchilov et al.
2022/0091947 A1 3/2022 Kothari et al.
2022/0103566 A1 3/2022 Faulkner
2022/0103618 A1 3/2022 Pinheiro et al.
2022/0116285 A1 4/2022 Abdollahi et al.
2022/0116286 A1 4/2022 Doshi et al.
2022/0122097 A1 4/2022 Maugans, III
2022/0129575 A1 4/2022 Goel et al.
2022/0150124 A1 5/2022 Cooley et al.
2022/0150133 A1 5/2022 Dhruvakumar et al.
2022/0159010 A1 5/2022 Bandarupalli et al.
2022/0191192 A1 6/2022 Drr et al.
2022/0210018 A1 6/2022 Narula et al.
2022/0244949 A1 8/2022 Iqbal et al.
2022/0255902 A1 8/2022 Woodson
2022/0258066 A1 8/2022 Choi et al.
2022/0263793 A1 8/2022 Baker et al.
2022/0263835 A1 8/2022 Pieczul et al.
2022/0271929 A1 8/2022 Villapakkam et al.
2022/0283926 A1 9/2022 Chirkin et al.
2022/0294818 A1 9/2022 Parekh et al.
2022/0300486 A1 9/2022 Venkateshaiah et al.
2022/0327095 A1 10/2022 Kim et al.
2022/0335340 A1 10/2022 Moustafa et al.

(56) References Cited

U.S. PATENT DOCUMENTS

| | | | |
|---|---|---|---|
| 2022/0337578 | A1 | 10/2022 | Mankekar et al. |
| 2022/0350675 | A1 | 11/2022 | Navali et al. |
| 2022/0350923 | A1 | 11/2022 | Kremer et al. |
| 2022/0353133 | A1 | 11/2022 | Shrestha et al. |
| 2022/0353266 | A1 | 11/2022 | Ramamurthi et al. |
| 2022/0353267 | A1 | 11/2022 | Kundu et al. |
| 2022/0365835 | A1 | 11/2022 | Kandasamy et al. |
| 2022/0368813 | A1 | 11/2022 | Rossignol et al. |
| 2022/0374271 | A1 | 11/2022 | Pogrebinsky et al. |
| 2022/0377111 | A1 | 11/2022 | Liao et al. |
| 2022/0377135 | A1 | 11/2022 | Boshev et al. |
| 2022/0382590 | A1 | 12/2022 | Hashimoto et al. |
| 2022/0398078 | A1 | 12/2022 | Segler |
| 2022/0405152 | A1 | 12/2022 | Edamadaka et al. |
| 2022/0413956 | A1 | 12/2022 | Mathew et al. |
| 2023/0006889 | A1 | 1/2023 | Thyagaturu et al. |
| 2023/0011628 | A1 | 1/2023 | Hurley et al. |
| 2023/0020974 | A1 | 1/2023 | Liu |
| 2023/0060675 | A1 | 3/2023 | Szab et al. |
| 2023/0068221 | A1 | 3/2023 | Magowan et al. |
| 2023/0086475 | A1 | 3/2023 | Mosko |
| 2023/0104368 | A1 | 4/2023 | Miriyala et al. |
| 2023/0105901 | A1 | 4/2023 | Adogla et al. |
| 2023/0107133 | A1 | 4/2023 | Ali et al. |
| 2023/0108661 | A1 | 4/2023 | Adogla et al. |
| 2023/0109926 | A1 | 4/2023 | Nair et al. |
| 2023/0110527 | A1 | 4/2023 | Bhat et al. |
| 2023/0116463 | A1 | 4/2023 | Rath et al. |
| 2023/0123734 | A1 | 4/2023 | Oxman et al. |
| 2023/0132478 | A1 | 5/2023 | Robinson et al. |
| 2023/0195926 | A1 | 6/2023 | Mehta et al. |
| 2023/0222550 | A1 | 7/2023 | Huang et al. |
| 2023/0224304 | A1 | 7/2023 | Lukanov et al. |
| 2023/0229543 | A1 | 7/2023 | Mohanty et al. |
| 2023/0244505 | A1 | 8/2023 | Hernandez et al. |
| 2023/0275833 | A1 | 8/2023 | Hyun et al. |
| 2023/0297962 | A1 | 9/2023 | Alabdrabalnabi et al. |
| 2023/0315726 | A1 | 10/2023 | Ponjavic et al. |
| 2023/0316348 | A1 | 10/2023 | Dageville et al. |
| 2023/0328003 | A1 | 10/2023 | Agarwal et al. |
| 2023/0342179 | A1 | 10/2023 | Suttle et al. |
| 2023/0362161 | A1 | 11/2023 | Spector et al. |
| 2023/0367654 | A1 | 11/2023 | Kurian et al. |
| 2023/0370461 | A1 | 11/2023 | Kalley et al. |
| 2023/0385286 | A1 | 11/2023 | Glickman et al. |
| 2023/0393829 | A1* | 12/2023 | Panikkar ............. G06F 11/3006 |
| 2023/0409590 | A1 | 12/2023 | Shah et al. |
| 2023/0418979 | A1 | 12/2023 | Deluca et al. |
| 2024/0015164 | A1 | 1/2024 | Guy et al. |
| 2024/0015165 | A1 | 1/2024 | Guy et al. |
| 2024/0031373 | A1 | 1/2024 | Gupta |
| 2024/0053973 | A1 | 2/2024 | Ranganathan et al. |
| 2024/0054063 | A1 | 2/2024 | Wichelman et al. |
| 2024/0061714 | A1 | 2/2024 | Pandit et al. |
| 2024/0069884 | A1 | 2/2024 | Majumdar et al. |
| 2024/0070735 | A1 | 2/2024 | Gallagher et al. |
| 2024/0089722 | A1* | 3/2024 | Samanta ............. H04L 41/0686 |
| 2024/0095055 | A1 | 3/2024 | Adogla et al. |
| 2024/0095056 | A1 | 3/2024 | Adogla et al. |
| 2024/0095390 | A1 | 3/2024 | Chao et al. |
| 2024/0095739 | A1 | 3/2024 | Adogla et al. |
| 2024/0095809 | A1 | 3/2024 | Adogla et al. |
| 2024/0095865 | A1 | 3/2024 | Adogla et al. |
| 2024/0098088 | A1 | 3/2024 | Adogla et al. |
| 2024/0098089 | A1 | 3/2024 | Adogla et al. |
| 2024/0103818 | A1 | 3/2024 | Gallagher et al. |
| 2024/0106832 | A1 | 3/2024 | Adogla et al. |
| 2024/0137339 | A1 | 4/2024 | Vemulpali |
| 2024/0143351 | A1 | 5/2024 | Davis |
| 2024/0152401 | A1 | 5/2024 | Naseem |
| 2024/0154992 | A1 | 5/2024 | Martin et al. |
| 2024/0171586 | A1 | 5/2024 | Jain et al. |
| 2024/0179146 | A1 | 5/2024 | Pinski et al. |
| 2024/0184465 | A1 | 6/2024 | Zwiegincew et al. |
| 2024/0205235 | A1 | 6/2024 | Batni |
| 2024/0232408 | A1 | 7/2024 | Pan et al. |
| 2024/0235945 | A1 | 7/2024 | Togare |
| 2024/0244053 | A1 | 7/2024 | Tian et al. |
| 2024/0259389 | A1 | 8/2024 | Wu et al. |
| 2024/0275853 | A1 | 8/2024 | Singh et al. |
| 2024/0291729 | A1 | 8/2024 | Khan et al. |
| 2024/0305622 | A1 | 9/2024 | Vijayan et al. |
| 2024/0320240 | A1 | 9/2024 | Podder |
| 2024/0330069 | A1 | 10/2024 | Atur et al. |
| 2024/0330072 | A1 | 10/2024 | Kantamneni et al. |
| 2024/0362142 | A1 | 10/2024 | Berg et al. |
| 2024/0364509 | A1 | 10/2024 | Potlapally et al. |
| 2024/0364638 | A1 | 10/2024 | Peterson et al. |
| 2024/0364690 | A1 | 10/2024 | Doherty et al. |
| 2024/0364707 | A1 | 10/2024 | Elmenshawy et al. |
| 2024/0378307 | A1 | 11/2024 | Dcosta |
| 2024/0378518 | A1 | 11/2024 | Sparrow et al. |
| 2024/0388512 | A1 | 11/2024 | Tesfatsion et al. |
| 2024/0414169 | A1 | 12/2024 | Fang et al. |
| 2024/0414518 | A1 | 12/2024 | Joseph et al. |
| 2024/0422215 | A1 | 12/2024 | Khan et al. |
| 2025/0023844 | A1 | 1/2025 | Juneja et al. |
| 2025/0077214 | A1 | 3/2025 | Banaal |
| 2025/0085978 | A1 | 3/2025 | R C et al. |
| 2025/0097215 | A1 | 3/2025 | Vangpat et al. |
| 2025/0097223 | A1 | 3/2025 | Brown et al. |
| 2025/0106221 | A1 | 3/2025 | Wang et al. |
| 2025/0227101 | A1 | 7/2025 | Chan et al. |
| 2025/0322077 | A1 | 10/2025 | Panwar et al. |
| 2025/0379830 | A1 | 12/2025 | Deowanshi et al. |

FOREIGN PATENT DOCUMENTS

| | | | |
|---|---|---|---|
| CN | 102656589 | A | 9/2012 |
| CN | 104106276 | A | 10/2014 |
| CN | 108197493 | A | 6/2018 |
| CN | 108696496 | A | 10/2018 |
| CN | 114091725 | A | 2/2022 |
| CN | 118312629 | A | 7/2024 |
| DE | 112021005656 | T5 | 8/2023 |
| EP | 2893685 | B1 | 7/2017 |
| EP | 3429156 | A1 | 1/2019 |
| EP | 3271857 | B1 | 4/2020 |
| KR | 10-2014-0066616 | A | 6/2014 |
| WO | 2010/088081 | A1 | 8/2010 |
| WO | 2012/006638 | A1 | 1/2012 |
| WO | 2014/039921 | A1 | 3/2014 |
| WO | 2018/010791 | A1 | 1/2018 |
| WO | 2019/212773 | A1 | 11/2019 |
| WO | 2020/252088 | A1 | 12/2020 |
| WO | 2021/030220 | A1 | 2/2021 |
| WO | 2021/051933 | A1 | 3/2021 |
| WO | 2021/145894 | A1 | 7/2021 |
| WO | 2021/150306 | A1 | 7/2021 |
| WO | 2021/150307 | A1 | 7/2021 |
| WO | 2021/150366 | A1 | 7/2021 |
| WO | 2021/150435 | A1 | 7/2021 |
| WO | 2021/174104 | A1 | 9/2021 |
| WO | 2022/005992 | A1 | 1/2022 |
| WO | 2022/104395 | A1 | 5/2022 |
| WO | 2022/104396 | A1 | 5/2022 |

OTHER PUBLICATIONS

Anonymous: "Oracle Cloud Infrastructure Documentation—Security Guide for Exadata Database Service on Cloud@Customer Systems", Apr. 1, 2023, XP093181902.

Anonymous: "Oracle Cloud Infrastructure Documentation-Overview of IAM", Feb. 8, 2023, XP093184083.

Anonymous: "Oracle Cloud Infrastructure Documentation—Renaming a Cloud Account", May 14, 2021, XP093185071.

Anonymous: "Oracle Cloud Infrastructure Documentation-Site-to-Site VPN Overview", Feb. 8, 2023, XP093184733.

Anonymous: "Oracle Cloud Infrastructure Documentation—Billing and cost management overview", Dec. 20, 2022, XP093183514.

Anonymous: "Oracle Cloud Infrastructure Documentation—Cloud Guard concepts", Jan. 18, 2022, XP093183028.

(56) References Cited

OTHER PUBLICATIONS

Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973,.
Anonymous: "Oracle Operator Access Control Configuration and Administration Guide", Nov. 18, 2022, XP093181896.
Anonymous: "Oracle Public Sector Licensing and Permitting", 2022, XP093184298.
Anonymous: "Oracle Sovereign Cloud", Feb. 15, 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).
"Create a Reseller and Reseller Administrator User", Retrieved from https://abiquo.atlassian.net/wiki/spaces/ABI54/ pages/310740667/ Create+a+Reseller+and+Reseller+Administrator+User, May 3, 2022, pp. 1-5.
"General Variables for All Requests", Jun. 28, 2023, p. 6.
"Overview of Access Approval", Retrieved from https://cloud.google. com/assured-workloads/access-approval/docs/ overview, Jun. 6, 2024, p. 5.
"Periodic 802.1X reauthentication", Retrieved from https://techhub. hpe.com/eginfolib/networking/docs/ switches/5130ei/5200-3946_ security_cg/content/485048074.htm, Retrieved from Oct. 25, 2023, p. 1.
"Policy Syntax", Jan. 4, 2023, p. 7.
"Reinstate admin privileges for a customer's Azure CSP subscriptions", Retrieved from https://learn.microsoft. com/en- US/partner-center/reinstate-csp, Aug. 1, 2023, p. 7.
"Tenant administrator settings", Retrieved from https://backstage. forgerock.com/docs/idcloud/latest/tenants/tenant- administrator-settings.html, Jun. 7, 2023, p. 12.
"Verbs", Jun. 5, 2023, p. 2.
Anonymous: "Tokenization -(data security)", Wikipedia, Feb. 12, 2023, pp. 1-12.
Bhat S., "Admin access management in Azure Cloud Solution Provider (CSP) subscriptions", Retrieved from https:// techcommunity. microsoft.com/t5/security-compliance-and-identity/admin-access-management-in-azure-cloud-solution- provider-csp/ba-p/3947126, Nov. 21, 2023, p. 8.
Ducharme et al., "Seamlessly Protect Your IBM Cloud Application Infrastructure with Privileged Access Gateway", Oct. 3, 2022, p. 13.
George et al., "Data anonymization and integrity checking in cloud computing", 2013 Fourth International Conference on Computing, Communications and Networking Technologies (ICCCNT), Jul. 2013, p. 5.
Ma et al., "ServiceRank: Root Cause Identification of Anomaly in Large-Scale Microservice Architectures", : IEEE Transactions on Dependable and Secure Computing, vol. 19, No. 5, September-Oct. 2022, pp. 3087-3100.
Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.
International Application No. PCT/US2023/074341, International Search Report and Written Opinion, mailed on Dec. 8, 2023, 15 pages.
International Application No. PCT/US2023/074342, International Preliminary Report on Patentability mailed on Mar. 27, 2025, 10 pages.
International Application No. PCT/US2023/074342, International Search Report and Written Opinion, mailed on Dec. 8, 2023, 13 pages.
International Application No. PCT/US2023/074343, International Preliminary Report on Patentability mailed on Mar. 27, 2025, 9 pages.
International Application No. PCT/US2023/074343, International Search Report and Written Opinion, mailed on Jan. 29, 2024, 13 pages.
International Application No. PCT/US2023/074344, International Preliminary Report on Patentability mailed on Mar. 27, 2025, 10 pages.
International Application No. PCT/US2023/074344, International Search Report and Written Opinion, mailed On Dec. 19, 2023, 13 pages.
International Application No. PCT/US2024/028744, International Search Report and Written Opinion mailed on Jul. 23, 2024, 16 pages.
International Application No. PCT/US2024/028767, "International Search Report and Written Opinion", mailed Sep. 10, 2024, 13 pages.
International Application No. PCT/US2024/028788, International Search Report and Written Opinion mailed on Jul. 23, 2024, 16 pages.
International Application No. PCT/US2024/029210, "International Search Report and Written Opinion", mailed Sep. 16, 2024, 12 pages.
International Application No. PCT/US2024/029417, "International Search Report and Written Opinion", mailed Sep. 16, 2024, 12 pages.
International Application No. PCT/US2024/030201, "International Search Report and Written Opinion", mailed Sep. 16, 2024, 12 pages.
International Application No. PCT/US2024/030208, "International Search Report and Written Opinion", mailed Sep. 16, 2024, 13 pages.
International Application No. PCT/US2024/030212, "International Search Report and Written Opinion", mailed Sep. 16, 2024, 12 pages.
Krichen et al., "Towards Optimizing the Placement of Security Testing Components for Internet of Things Architectures", 2019 Institute of Electrical and Electronics Engineers/ACS 16th International Conference on Computer Systems and Applications (AICCSA), 2019, 2 pages.
Machine translation of CN 102656589 A, published on Sep. 5, 2012, 228 pages.
Machine translation of CN 104106276 A, published on Oct. 15, 2014, 347 pages.
Machine translation of CN 108197493 A, published on Jun. 22, 2018, 43 pages.
Mampage et al., "A Holistic View on Resource Management in Serverless Computing Environments Taxonomy and Future Directions", Research Gate, ACM Computing Surveys, 2022, 34 pages.
Marketplace Management, Available online at: https://www.appxite. com/platform/manage-marketplace?hsLang=en, 2022, 4 pages.
Marketplace Setup, Available online at: https://www.appxite.com/ platform/launch-marketplace?hsLang=en, 2022, 3 pages.
Microsoft Learn, "Azure Key Vault Rest Api reference", Apr. 19, 2023, Available online at <https://learn. microsoft. com/en-US/rest/ api/keyvault/>, 12 pages.

(56) References Cited

OTHER PUBLICATIONS

Microsoft Learn: "Connect to a Key Vault via private endpoint - Code Samples", Jul. 6, 2022, Available online at <https://learn.microsoft.com/en-US/samples/azure/azure-quickstart-templates/key-vault-private-endpoint/>, 5 pages.
N. Katica and A. Tahirovic, "Opportunities for telecom operators in cloud computing business," 2012 Proceedings of the 35th International Convention MIPRO, Opatija, Croatia, 2012, pp. 495-500. (Year: 2012).
Nolle, "Operational Strategies for Isolation in Cloud Computing", Tech Target, Sep. 15, 2021, 6 pages.
Organization Governance for Google Cloud Marketplace, Available online at: https://cloud.google.com/marketplace/docs/governance, Accessed from internet on Jan. 18, 2023, 1 page.
Palanisamy, "Cloud-based and Containerized Testing Environments Revolutionizing Text Automation", International Journal of Science and Research Archive, 2021, 11 pages.
Power your Cloud Business with StreamOne Cloud Marketplace, Available online at: https://asia.techdata.com/sg/wp-content/uploads/2021/01/SCM_TD_10.23.pdf, 2 pages.
Private Marketplace, Available online at: https://aws.amazon.com/marketplace/features/privatemarketplace, 2023, 4 pages.
Resell Cloud Marketplace Products from Independent Software Vendors (ISVs), Available online at: https://cloud.google.com/marketplace/docs/partners/resell, Accessed from internet on Jan. 18, 2023, 1 page.
Set up your Cloud Marketplace Products for Resale, Available online at: https://cloud.google.com/marketplace/docs/partners/resell/set-up-reselling, Accessed from internet on Jan. 18, 2023, 2 pages.
Study of Software as a Service Support Platform for Small and Medium Businesses Chang-Jie Guo, Wei Sun, Zhong-Bo Jiang, Ying Huang, Bo Gao, and Zhi-Hu Wang (Year: 2011).
Towards Optimizing the Placement of Security Testing Components for Internet of Things Architectures by K2019 IEEE/ACS 16th International Conference on Computer Systems and Applications (AICCSA), Abu Dhabi, United Arab Emirates, 2019, pp. 1-2, doi: 10.1109/AICCSA47632.2019.9035301. (Year: 2019).
U.S. Appl. No. 18/368,863, Non-Final Office Action mailed on Jun. 17, 2025, 11 pages.
U.S. Appl. No. 18/368,881, Non-Final Office Action mailed on Jan. 6, 2026, 25 pages.
U.S. Appl. No. 18/468,037, Notice of Allowance mailed on Dec. 23, 2025, 9 pages.
U.S. Appl. No. 18/468,047, Final Office Action mailed on Jan. 15, 2026, 10 pages.
U.S. Appl. No. 18/498,964, Non-Final Office Action mailed on Jul. 29, 2025, 23 pages.
U.S. Appl. No. 18/537,902, Non-Final Office Action, mailed on May 20, 2025, 10 pages.
U.S. Appl. No. 18/368,870, Non-Final Office Action mailed on Mar. 31, 2025, 11 pages.
U.S. Appl. No. 18/368,884, Non-Final Office Action mailed on Mar. 6, 2025, 44 pages.
U.S. Appl. No. 18/468,037, Non-Final Office Action mailed on Mar. 20, 2025, 8 pages.
U.S. Appl. No. 18/468,044, Non-Final Office Action mailed on May 19, 2025, 22 pages.
U.S. Appl. No. 18/468,047, Non-Final Office Action mailed on May 23, 2025, 11 pages.
U.S. Appl. No. 18/647,741, Non-Final Office Action mailed on Nov. 4, 2025, 17 pages.
U.S. Appl. No. 18/647,893, Notice of Allowance mailed on Sep. 15, 2025, 9 pages.
U.S. Appl. No. 18/647,971, Non-Final Office Action mailed on Oct. 10, 2025, 16 pages.
Vanbenschoten et al., "Enabling the Next Generation of Multi-Region Applications with CockroachDB", Available Online at https //www cockroachlabs com/pdf/SIGMOD2022 pdf, Jun. 11, 2022, 14 pages.
Vidich, "Microsoft Publishes Secure Isolation Guidance for Azure and Azure Government", Microsoft, Dev Blogs, Aug. 31, 2020, 6 pages.
Want to Resell Public Cloud Services?, Available online At: https://ngkloud.com/resell-public-cloud/, 2021, 3 pages.
What is AWS Marketplace, Available online at: https://docs.aws.amazon. com/marketplace/latest/userguide/what-is-marketplace.html, Accessed from internet on Jan. 18, 2023, 5 pages.
What is Azure Marketplace?, Available online At: https://learn.microsoft.com/en-us/marketplace/azure-marketplace-overview?source=recommendations, Dec. 30, 2022, 9 pages.
What is Google Cloud Marketplace?, Available online at: https://cloud.google.com/marketplace/docs, Accessed from internet on Jan. 18, 2023, 2 pages.
Yedida et al., "Partitioning Cloud-based Microservices", Research Gate, via Deep Learning, Sep. 29, 2021, 11 pages.
"Cloud External Key Manager," Retrieved from https://cloud.google.com/kms/docs/ekm, Mar. 4, 2024, p. 5.
"CNAME Record", Wikipedia, Available Online at: https://en.wikipedia.org/w/index.php? title=CNAME_record&oldld=1105641340, Accessed from Internet on Jan. 24, 2024, 4 pages.
"Dedicated Region Cloud@Customer", Available Online at: https://web.archive.org/web/20220705140320if_/https://www.oracle.com/a/ocom/docs/cloud/dedicated-region-cloud-customer-product-brief.pdf, Jul. 5, 2022, 4 pages.
"Developing System Services in Oracle Solaris 11.3", Oracle, Available Online at: https://docs.oracle.com/cd/E53394_01/pdf/E60814.pdf, Sep. 1, 2018, 76 pages.
"External Key Management for AWS by T-Systems, AWS Premier Consulting and Security Competency Partner," Retrieved from https://www.t-systems.com/resource/blob/565764/35be2fbd609320ec590eea9c5fbdf592/DL-Flyer-External-Key-Managment-for-AWS-T-Systems-EN-Aug. 2023.pdf, Retrieved on Jul. 30, 2024, p. 2.
"External key stores," Retrieved from https://docs.aws.amazon.com/kms/latest/developerguide/keystore-external.html, Mar. 4, 2024, p. 16.
"Generating and using SSH keys for remote host authentication," Retrieved from https://cloud.ibm.com/docs/ssh-keys ?topic=ssh-keys-generating-and-using-ssh-keys-for-remote-host-authentication, Apr. 27, 2023, p. 5.
"Integrating Skyhigh CASB On-Prem Proxy with aKey Management Server," Retrieved from https://success. skyhighsecurity.com/Skyhigh_CASB/Skyhigh_CASB_Settings/On-Prem_Proxy/zIntegrating_MVISION_Cloud_On-Prem_Proxy_with_a_Key_Management_Server, Sep. 3, 2021, p. 3.
"Key Management Interoperability Protocol (KMIP)," Retrieved from https://www.encryptionconsulting.com/education-center/kmip/# :~: text=KMIP%20is%20an%20extensible%20communication, by%20simplifying%20encryption%20key%20management., Retrieved on Jul. 30, 2024, p. 5.
"Multicloud Architecture Partitioned, Cloud Burst and DR", NetApp, Apr. 9, 2020, 7 pages.
"New: Using Amazon EC2 Instance Connect for SSH access to your EC2 Instances," Retrieved from https://aws.amazon.com/blogs/compute/new-using-amazon-ec2-instance-connect-for-ssh-access-to-your-ec2-instances/, Retrieved on Aug. 5, 2024, p. 12.
"Sepior's Cloud Encryption Technology Now Supports Key Management Interoperability Protocol (Kmip)," Sepior, Nov. 10, 2017, p. 4.
"SSH Certificates Management Automation Made Easy Introducing Certonid," Retrieved from https://mailtrap.io/blog/certonid/, Retrieved on Aug. 5, 2024, p. 19.
"StorMagic-SvKMS-Data-Sheet," Retrieved from https://stormagic.com/pdf/data-sheet/StorMagic-SvKMS-Data-Sheet. pdf, 2023, p. 4.
10 Reasons to Become an AwesomeCloud Channel Partner, Available online at: https://www.awesomecloud.com/about/why-awesomecloud/, 2023, 3 pages.
Aldossary, "A Review of Dynamic Resource Management in Cloud Computing Environments", Computer Systems Science and Engineering, vol. 36, No. 3, 2021, pp. 461-476.

(56) References Cited

OTHER PUBLICATIONS

Anonymous: "AWS Identity and Access Management user guide - first 400 pages", Mar. 15, 2024, https://web.archive.org/web/20240315183106if_/https://docs.aws.amazon.com/pdfs/IAM/latest/UserGuide/iam-ug.pdf, p. 4215.
Anonymous: "IAM Roles Anywhere with an external certificate authority : AWS Security Blog", Oct. 20, 2023, Retrieved from https://aws.amazon.com/blogs/security/ iam-roles-anywhere-with-an-external-certificate-authority/, pp. 1-18.
Anonymous: "OCI Documentation—Managing Key Pairs on Linux Instances", Mar. 6, 2024, https://web.archive.org/web/20240306214752/https://docs.oracle.com/en-us/iaas/Content/Compute/Tasks/managingkeypairs.htm.
Anonymous: "OCI Documentation—Security Credentials", Dec. 11, 2023, https://web.archive.org/web/20231211222908/https://docs.oracle.com/en-us/iaas/Content/General/Concepts/credentials.htm.
Anonymous: "Set up AWS Private Certificate Authority to issue certificates for use with IAM Roles Anywhere : AWS Security Blog", Retrieved from https://aws.amazon.com/blogs/security/set-up-aws-private-certificate-authority-to-issue-certificates-for-use-with-iam-roles-anywhere/, Nov. 8, 2023, pp. 1-14.
U.S. Appl. No. 18/368,884, Final Office Action, Mailed On Nov. 10, 2025, 58 pages.
U.S. Appl. No. 18/468,024, Notice of Allowance, Mailed On Jun. 23, 2025, 8 pages.
U.S. Appl. No. 18/468,238 , Notice of Allowance, Mailed On Jul. 3, 2025, 9 pages.
U.S. Appl. No. 18/498,964 , Notice of Allowance, Mailed On Nov. 18, 2025, 10 pages.
AwesomeCloud Services, Available online at: https://www.awesomecloud.com/about/, Accessed from internet on Jan. 18, 2023, 2 pages.
Azure Marketplace Service Providers Guide, Available online at: https://docs.azure.cn/en-us/articles/azure-marketplace/publishguide, Mar. 9, 2021, 9 pages.
Brassil, Physical Layer Network Isolation in Multi-tenant Clouds, Institute of Electrical and Electronics Engineers 30th International Conference on Distributed Computing Systems Workshops, Jul. 2010, pp. 77-81.
Bridgwater, "Location, Location, Partition How To Beat Latency As Cloud Grows", Forbes, Dec. 3, 2020, 5 pages.
Cloud Reseller Program Overview, Available online at: https://www.awesomecloud.com/cloud-reseller-program/, 2023, 3 pages.
Create a Private Marketplace, Available online at: https://cloud.google.com/marketplace/docs/governance/private-marketplace, Accessed from internet on Jan. 18, 2023, 2 pages.
Direct As-a-Service Sales Platform, Available online at: https://www.appxite.com/cloud-saas-sellers, 2022, 3 pages.
Drive Revenue by Selling in AWS Marketplace, Available online at: https://aws.amazon.com/marketplace/partners/ management-tour, Accessed from internet on Jan. 18, 2023, 7 pages.
E2E Network Slicing—Key 5G technology—What is it? Why do we need it? How do we implement it? By Harrison et al (Year: 2015).
Enable Google Private Marketplace, Available online at: https://cloud.google.com/marketplace/docs/governance/enable-private-marketplace, Accessed from internet on Jan. 18, 2023, 2 pages.
Ferry, "Kubernetes Namespaces Isolation—What It is, What It Isn't, Life, Universe and Everything", SynActiv, 2021, 13 pages.
Gholipour et al., "Recent Advances in Energy-Efficient Resource Management Techniques in Cloud Computing Environments", New Frontiers in Cloud Computing and Internet of Things, 2021, pp. 31-68.
Girola et al., "IBM Data Center Networking; Planning for Virtualization and Cloud Computing", Redbooks, May 9, 2011, 258 pages.
Google Cloud Platform Services Summary, Available online at: https://cloud.google.com/terms/services, Accessed from internet on Jan. 18, 2023, 25 pages.
Huey Patricia et al., "Oracle Database Security Guide", Nov. 2023, https://web.archive.org/web/20231121145008if_/https://docs.oracle.com/en/database/oracle/oracle-database/23/dbseg/database-security-guide.pdf, p. 1327.
International Application No. PCT/US2023/074323, International Search Report and the Written Opinion, mailed on Nov. 22, 2023, 15 pages.
International Application No. PCT/US2023/074322, International Preliminary Report on Patentability mailed on Mar. 27, 2025, 9 pages.
International Application No. PCT/US2023/074322, International Search Report and Written Opinion, mailed on Nov. 22, 2023, 12 pages.
International Application No. PCT/US2023/074323, International Preliminary Report on Patentability mailed on Mar. 27, 2025, 10 pages.
International Application No. PCT/US2023/074325, International Preliminary Report on Patentability mailed on Mar. 27, 2025, 10 pages.
International Application No. PCT/US2023/074325, International Search Report and the Written Opinion, mailed on Nov. 22, 2023, 13 pages.
International Application No. PCT/US2023/074330, International Preliminary Report on Patentability mailed on Mar. 27, 2025, 10 pages.
International Application No. PCT/US2023/074330, International Search Report and the Written Opinion, mailed on Dec. 19, 2023, 14 pages.
International Application No. PCT/US2023/074341, International Preliminary Report on Patentability mailed on Mar. 27, 2025, 11 pages.
"OneBill's Dynamic Billing Software : Rule-based & Events-based Billing", Retrieved from https://www.onebillsoftware.com/dynamic-billing/, Retrieved on Jun. 8, 2026, pp. 1-2.
"Rate Plans", Retrieved from https://help.sap.com/docs/CLOUD_TO_CASH_OD/e4aa21cd43494cc1a8a90ea0f3dab8bb?locale=en-US&state=PRODUCTION&version=2023-12-18, Dec. 18, 2023, pp. 1-4.
"ZoneBilling NetSuite Advanced Billing & Revenue Management", Retrieved from https://www.zoneandco.com/billing-management/zonebilling, Retrieved on Dec. 20, 2023, pp. 1-9.
Apache, "Name-based Virtual Host Support", Mar. 12, 2019, https://web.archive.org/web/20190312131043/https://httpd.apache.org/docs/2.4/vhosts/name-based.html (Year: 2019).
Cao et al., "Dynamic Pricing for Resource Consumption in Cloud Service", vol. 2018, Article ID 4263831, May 24, 2018, pp. 1-23.
U.S. Appl. No. 18/498,964, Notice of Allowance, mailed on Mar. 27, 2026, 10 pages.
U.S. Appl. No. 18/520,103, Non-Final Office Action, mailed on Apr. 17, 2026, 34 pages.
U.S. Appl. No. 18/368,863, Final Office Action mailed on Mar. 2, 2026, 11 pages.
U.S. Appl. No. 18/368,870, Final Office Action mailed on Feb. 26, 2026, 13 pages.
U.S. Appl. No. 18/368,877, Non-Final Office Action mailed on Apr. 20, 2026, 13 pages.
U.S. Appl. No. 18/368,884, Non-Final Office Action mailed on Mar. 25, 2026, 55 pages.
U.S. Appl. No. 18/468,044, Final Office Action mailed on Apr. 22, 2026, 27 pages.
U.S. Appl. No. 18/468,047, Non-Final Office Action mailed on Apr. 8, 2026, 8 pages.
User2048589 et al., "Multiple domains on 1 cloud service", Feb. 4, 2014, https://stackoverflow.com/questions/21564348/multiple-domains-on-1-cloud-service (Year: 2014).

* cited by examiner

550

| Subscription Type | PayG & Commitment with At List Price | | Commitment with At Contract Price | | Commitment with At Contract Price-Price Drop | |
|---|---|---|---|---|---|---|
| Price changes 01 Jan 2022 | PayGSubQ1-1<br>PayGSubQ1-2<br>PayGSubQ1-3 | ALP-0000 | ContractPriceSubQ1-1<br>ContractPriceSubQ1-2<br>ContractPriceSubQ1-3 | ACP-010122 | CPPriceDropSubQ1-1<br>CPPriceDropSubQ1-2<br>CPPriceDropSubQ1-3 | ACPPD-010122 |
| Price changes 01 Apr 2022 | PayGSubQ2-1<br>PayGSubQ2-2<br>PayGSubQ2-3 | | ContractPriceSubQ2-1<br>ContractPriceSubQ2-2<br>ContractPriceSubQ2-3 | ACP-040122 | CPPriceDropSubQ2-1<br>CPPriceDropSubQ2-2<br>CPPriceDropSubQ2-3 | ACPPD-040122 |
| Price changes 01 Jul 2022 | PayGSubQ3-1<br>PayGSubQ3-2<br>PayGSubQ4-3 | | ContractPriceSubQ3-1<br>ContractPriceSubQ3-2<br>ContractPriceSubQ3-3 | ACP-070122 | CPPriceDropSubQ3-1<br>CPPriceDropSubQ3-2<br>CPPriceDropSubQ3-3 | ACPPD-040122 |
| Price changes 01 Oct 2022 | PayGSubQ4-1<br>PayGSubQ4-2<br>PayGSubQ4-3 | | ContractPriceSubQ4-1<br>ContractPriceSubQ4-2<br>ContractPriceSubQ4-3 | ACP-100122 | CPPriceDropSubQ4-1<br>CPPriceDropSubQ4-2<br>CPPriceDropSubQ4-3 | ACPPD-100122 |

FIGURE 15

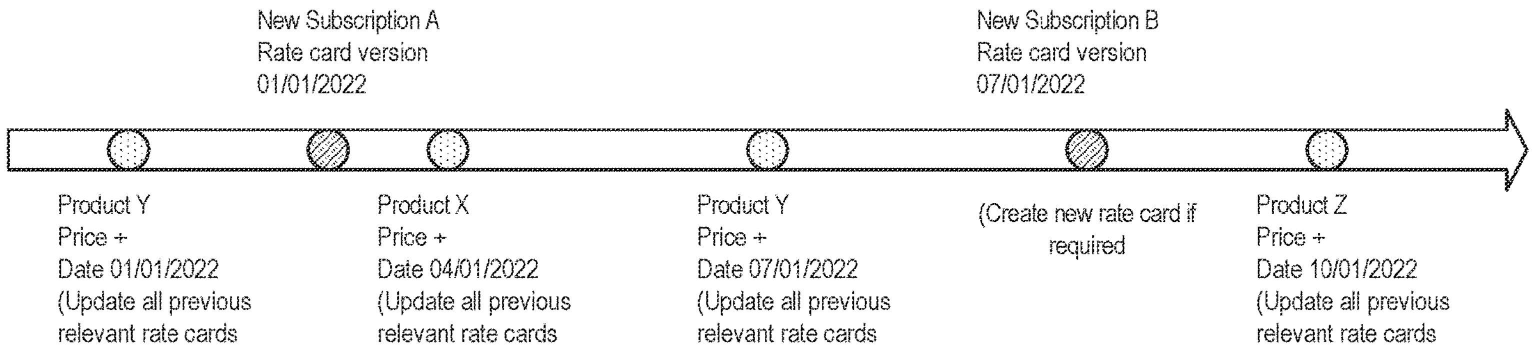

FIGURE 16

METHOD AND SYSTEM FOR BUILDING AND MIGRATING CLOUD SERVICE SUBSCRIPTIONS FOR USE IN CREATING RATE CARDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY AND CROSS-REFERENCE TO RELATED APPLICATIONS

This application claims the benefit of priority to U.S. Provisional Patent Application titled "SYSTEM AND METHOD FOR PROVIDING DEDICATED CLOUD ENVIRONMENTS FOR USE WITH A CLOUD COMPUTING INFRASTRUCTURE," Application No. 63/462,878, filed Apr. 28, 2023; and is related to U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,868, filed Apr. 28, 2023; U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,875, filed Apr. 28, 2023; U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,880, filed Apr. 28, 2023; U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,882, filed Apr. 28, 2023; and U.S. Provisional Patent Application titled "SYSTEM AND METHOD FOR PROVIDING DEDICATED CLOUD ENVIRONMENTS FOR USE WITH A CLOUD COMPUTING INFRASTRUCTURE", Application No. 63/462,885, filed Apr. 28, 2023; each of which above applications and the contents thereof are herein incorporated by reference.

TECHNICAL FIELD

Embodiments described herein are generally related to systems and methods for providing cloud environments for use by tenants of a cloud infrastructure environment in accessing software products, services, or other offerings associated with the cloud environment, including systems and methods for building and managing dynamic rate cards related to subscriptions of the tenants to the software products, services, or other offerings associated with the cloud environment.

BACKGROUND

A cloud computing environment can be used to provide access to a range of complementary cloud-based components, such as software applications or services, that enable organizations or enterprise customers to operate their applications and services in a highly-available hosted environment.

The benefits to an organization in moving their application and service needs to a cloud environment include a reduction in the cost and complexity of designing, building, operating, and maintaining their own on-premise data center, software application framework, or other information technology infrastructure; allowing them to instead focus on managing their day-to-day business.

In some cloud environments organizations may use rate cards as a mechanism for managing product inventory pricing to end users or customers of the organization. Essentially, each customer subscription to the software applications or services is associated with a rate card that sets the pricing for the cloud service platform services on a per customer subscription basis. Such rate cards used by organizations to manage product inventory pricing for their customers are static, with companies defining pricing per customer subscription. The rate cards may be modified in order to offer the latest price to a customer irrespective of whether the individual product price increases or decreases. The rate cards may similarly be modified to separately reflect individual product price increases or decreases.

The above approach essentially utilizes a 1:1 rate card per customer subscription relationship. While a 1:1 rate card to subscription relationship provides technical accuracy in the management of the products delivered to the end users or customers of the organization and the pricing thereof, this scheme can become very cumbersome where the software application and/or service offerings are vast and/or where the organizations have numerous end users or customers subscribing to the software application and/or service offerings.

For example, every price change in such a 1:1 rate card system could trigger a creation of a version of the rate card for every subscription that exists in the system. By way of example, for a cloud system having 1,000 customers and 10,000 products, a static rate card approach as described would be required to maintain 10 million price points for 1000 rate cards. A new product launch might require all 1000 rate cards to be updated. Price changes would also need to be updated when the price of a product price increases or decreases based on the terms of the various cloud service usage contracts.

Such rate card management for each customer for every product, aligning the scheme with the subscription contract terms, and adjusting it dynamically with price changes is a complex process. For global organizations, adding currency dimensions for rate cards makes the process even more complex.

SUMMARY

Embodiments described herein are generally related to systems and methods for providing access to software products or services in a cloud computing or other computing environment, and are particularly directed to a system and method for building and managing dynamic rate cards, for use with subscription-based products, services, or other offerings.

In accordance with an embodiment, optimized dynamic rate card management allows organizations to provide dynamic customized pricing. Embodiments described herein generally optimize the number of rate cards to a manageable level wherein, for example: rate cards can be associated with the type of contract pricing policy; subscriptions can be associated with an applicable rate card based on contract pricing policy and contract date; and rate cards can be created, and updated, based on a last change in the price of a product in the system, in a just-in-time manner.

In accordance with an embodiment, in order to accommodate the use of dynamic rate cards, a migration service or process can be used to convert/migrate subscriptions that were originally created under a legacy or former subscription pricing model (SPM), to conform instead with a subscription pricing service (SPS) model, for use with the various systems, methods, and features described herein.

BRIEF DESCRIPTION OF THE DRAWINGS

FIG. 15 illustrates a table of example subscription types, and corresponding rate cards, in accordance with an embodiment.

FIG. 16 illustrates an example usage of dynamic rate cards as applied to various subscription-based products, services, or other offerings, in accordance with an embodiment.

DETAILED DESCRIPTION

A cloud computing or cloud infrastructure environment can be used to provide access to a range of complementary cloud-based components, such as software applications or services, which enable organizations or enterprise customers to operate their applications and services in a highly-available hosted environment.

The benefits to an organization in moving their application and service needs to a cloud infrastructure environment include a reduction in the cost and complexity of designing, building, operating, and maintaining their own on-premise data center, software application framework, or other information technology infrastructure; allowing them to instead focus on managing their day-to-day business.

Cloud Infrastructure Environments

Figure 1:
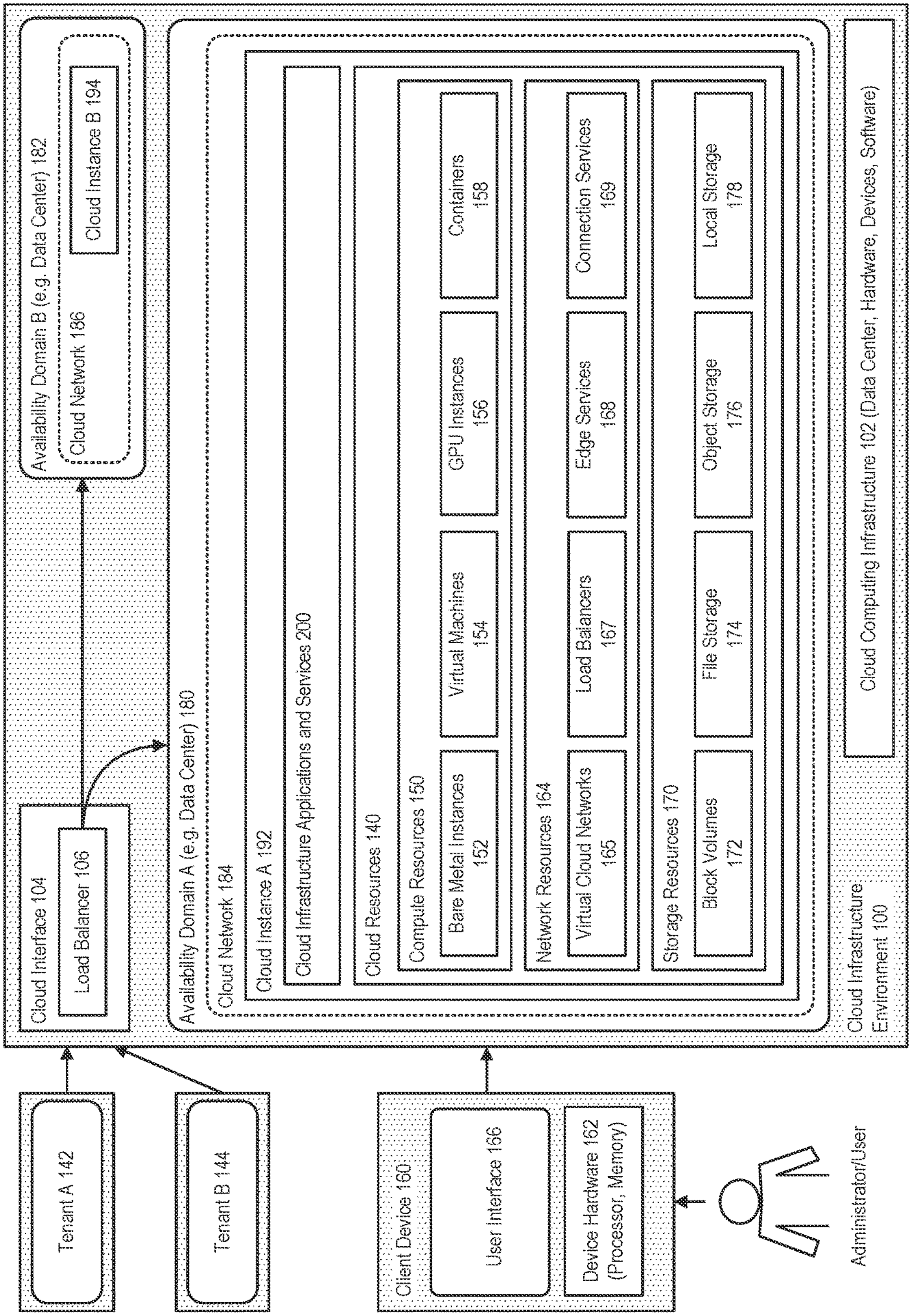
FIG. 1 illustrates a system for providing a cloud infrastructure environment, in accordance with an embodiment.
Figure 2:
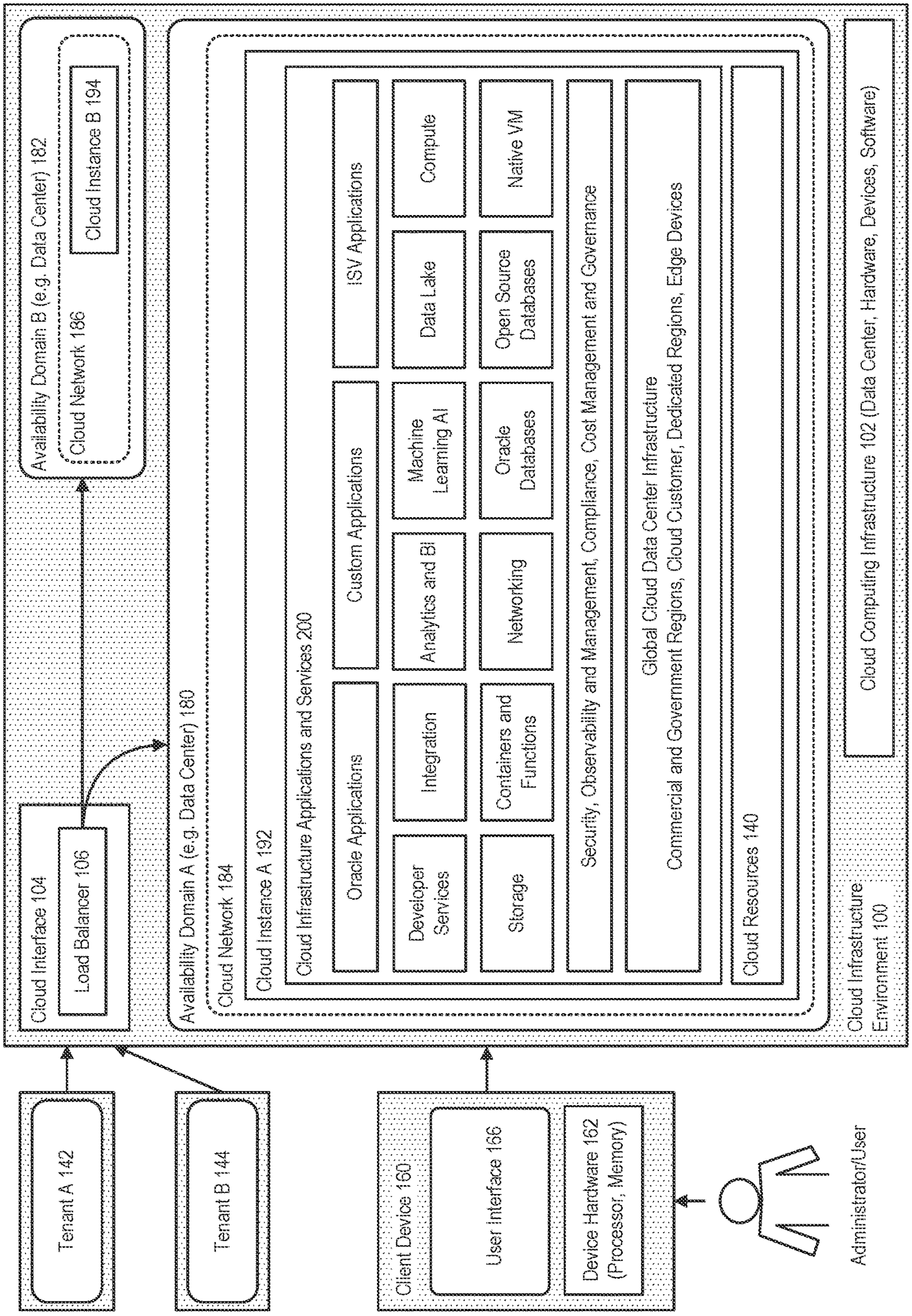
FIG. 2 further illustrates how a cloud infrastructure environment can be used to provide cloud-based applications or services or services, in accordance with an embodiment.

FIGS. 1 and 2 illustrate a system for providing a cloud infrastructure environment, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers 106.

In accordance with an embodiment, the cloud infrastructure environment supports the use of availability domains, such as, for example, availability domains A 180, B 182, which enables customers to create and access cloud networks 184, 186, and run cloud instances A 192, B 194.

In accordance with an embodiment, a tenancy can be created for each cloud tenant/customer, for example tenant A 142, B 144, which provides a secure and isolated partition within the cloud infrastructure environment within which the customer can create, organize, and administer their cloud resources. A cloud tenant/customer can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator other user to communicate with the cloud infrastructure environment via a network such as, for example, a wide area network, local area network, or the Internet, to create or update cloud services.

In accordance with an embodiment, the cloud infrastructure environment provides access to shared cloud resources 140 via, for example, a compute resources layer 150, a network resources layer 164, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud infrastructure environment can provide control of physical host (bare metal) machines within the compute resources layer, which run as compute cloud instances directly on bare metal servers, without a hypervisor.

In accordance with an embodiment, the cloud infrastructure environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 165, load balancers 167, edge services 168, and/or connection services 169.

In accordance with an embodiment, the storage resources layer can comprise a number of resources, such as, for example, data/block volumes 172, file storage 174, object storage 176, and/or local storage 178.

As illustrated in FIG. 2, in accordance with an embodiment, the cloud infrastructure environment can include a range of complementary cloud-based components, for example as cloud infrastructure applications and services 200, that enable organizations or enterprise customers to operate their applications and services in a highly-available hosted environment.

By way of example, in accordance with an embodiment, a self-contained cloud region can be provided as a complete, e.g., Oracle Cloud Infrastructure (OCI) dedicated region within an organization's data center that offers the data center operator the agility, scalability, and economics of a public cloud, while retaining full control of their data and applications to meet security, regulatory, or data residency requirements.

For example, in accordance with an embodiment, such an environment can include racks physically and managed by a cloud infrastructure provider; customer's racks; access for cloud operations personnel for setup and hardware support; customer's data center power and cooling; customer's floor space; an area for customer's data center personnel; and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's public cloud regions, such as, for example, ERP, Financials, HCM, and SCM. A customer can seamlessly lift and shift legacy workloads using the cloud infrastructure provider's services, for example bare metal compute, VMs, and GPUs; database services, for example Autonomous Database; or container-based services, for example Container Engine for Kubernetes.

In accordance with an embodiment, a cloud infrastructure environment can operate according to infrastructure-as-a-service (IaaS) model that enables the environment to provide virtualized computing resources over a public network (e.g., the Internet).

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components (example services include billing software, monitoring software, logging software, load balancing software, or clustering software). Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not be, a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries, or daemons). This is often managed by the cloud infrastructure provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In accordance with an embodiment, IaaS provisioning may refer to acquiring computers or virtual hosts for use, and even installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 3:
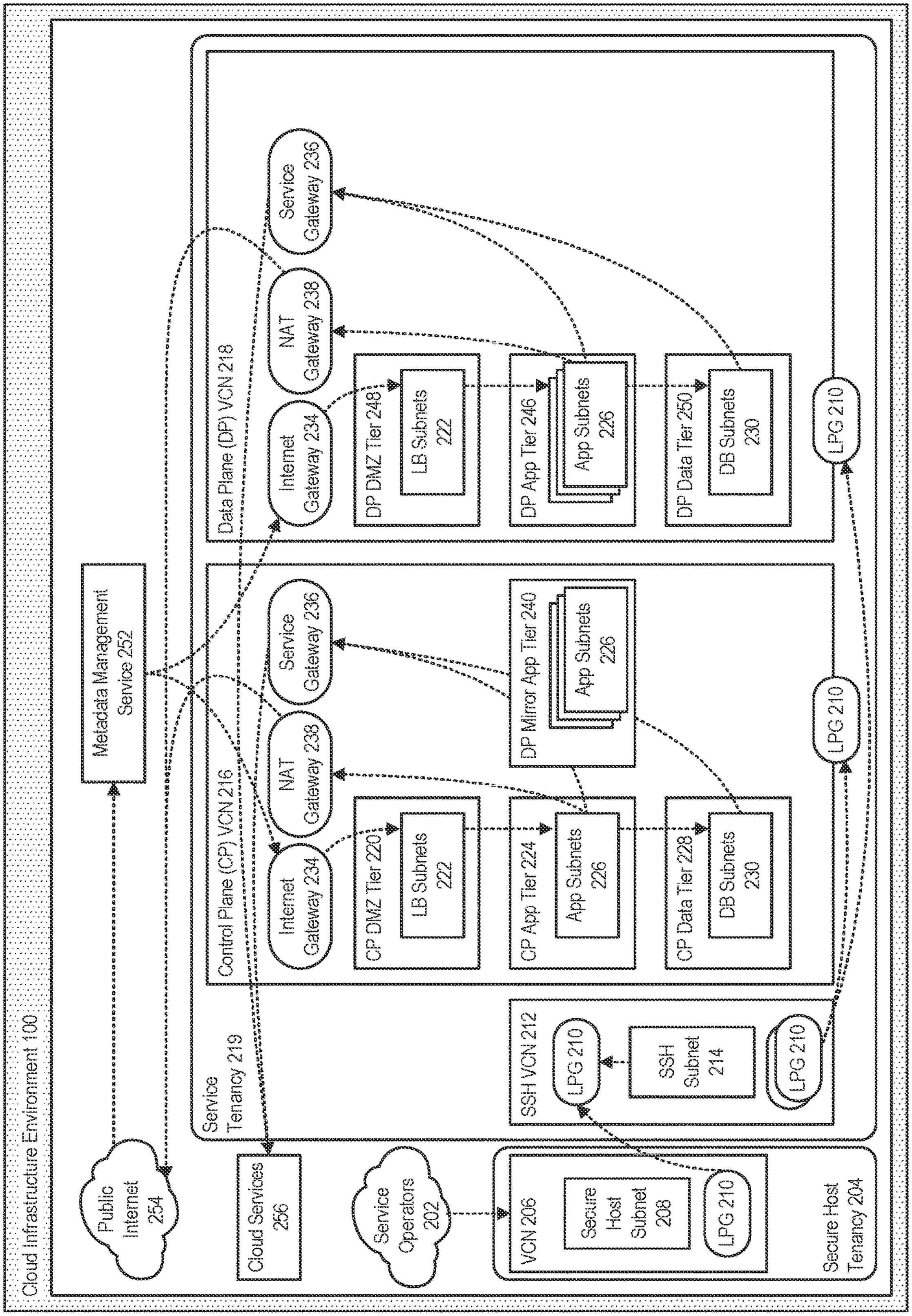
FIG. 3 illustrates an example cloud infrastructure architecture, in accordance with an embodiment.

FIG. 3 illustrates an example cloud infrastructure architecture, in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices, which may be portable handheld devices (e.g., a telephone, a computing tablet, a personal digital assistant (PDA)) or wearable devices (e.g., a head mounted display), running software such as Microsoft Windows, and/or a variety of mobile operating systems such as iOS, Android, and the like, and being Internet, e-mail, short message service (SMS), or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Chrome. Alternatively, or in addition, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnet(s) 222, a control plane app tier 224 that can include app subnet(s) 226, and a control plane data tier 228 that can include database (DB) subnet(s) 230 (e.g., frontend DB subnet(s) and/or backend DB subnet(s)). The LB subnet(s) contained in the control plane DMZ tier can be communicatively coupled to the app subnet(s) contained in the control plane app tier, and an Internet gateway 234 that can be contained in the control plane VCN, and the app subnet(s) can be communicatively coupled to the DB subnet(s) contained in the control plane data tier and a service gateway 236 and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier 246, a data plane DMZ tier 248, and a data plane data tier 250. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way: the service gateway can make API calls to cloud services, and cloud services can send requested data to the service gateway. Generally, cloud services may not initiate API calls to the service gateway.

In accordance with an embodiment, the secure host tenancy can be directly connected to the service tenancy, which may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example create, read, update, or delete (CRUD) operations, through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both of which may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage, which may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy, which may be isolated from the public Internet.

Figure 4:
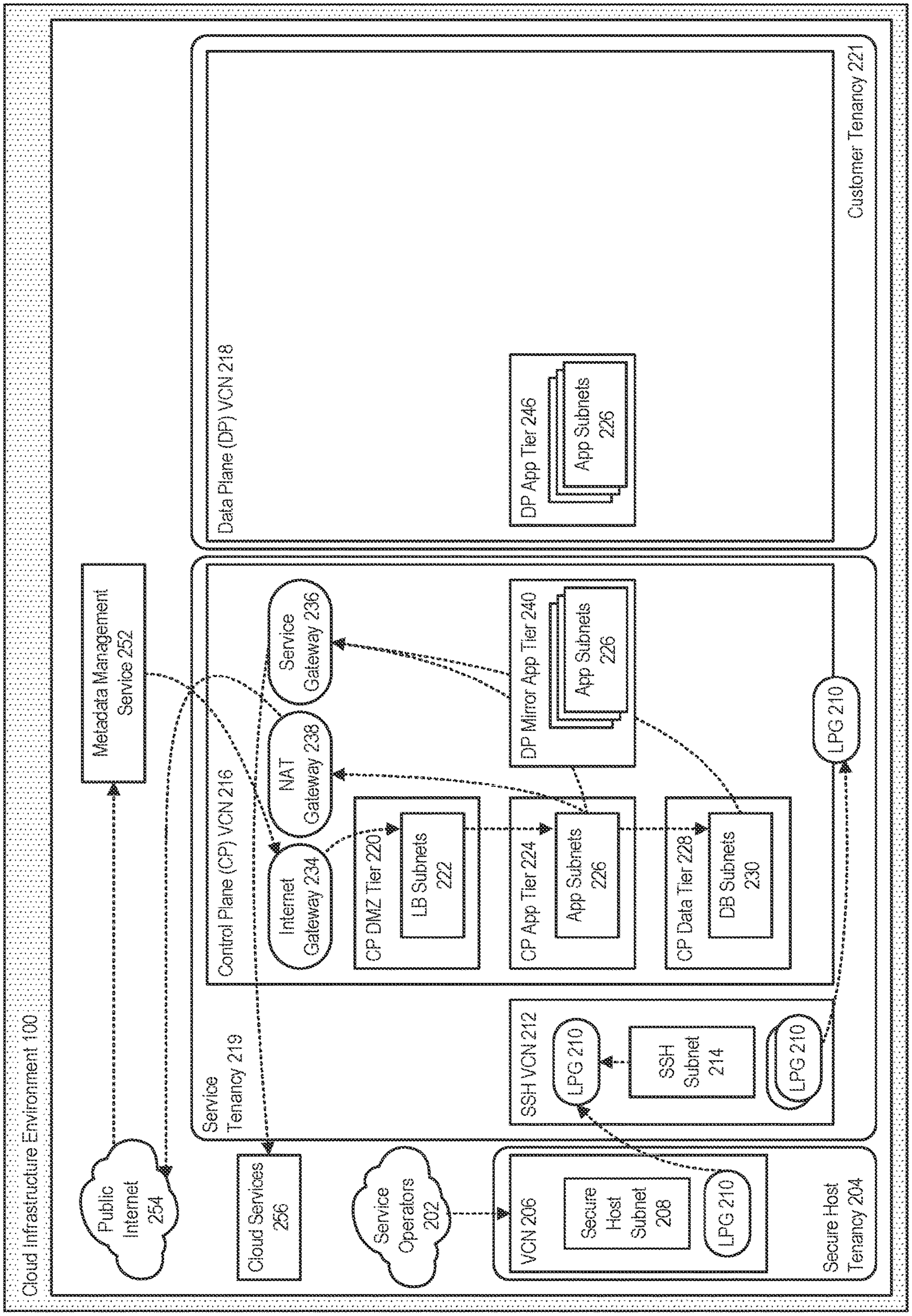
FIG. 4 illustrates another example of a cloud infrastructure architecture, in accordance with an embodiment.

FIG. 4 illustrates another example of a cloud infrastructure architecture, in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources that are provisioned in the control plane VCN that is contained in the service tenancy, to be deployed or otherwise used in the data plane VCN that is contained in the customer tenancy.

In accordance with an embodiment, a customer of the cloud infrastructure provider may have databases that are managed and operate within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, of the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with Deployment 1 in Region 2.

Figure 5:
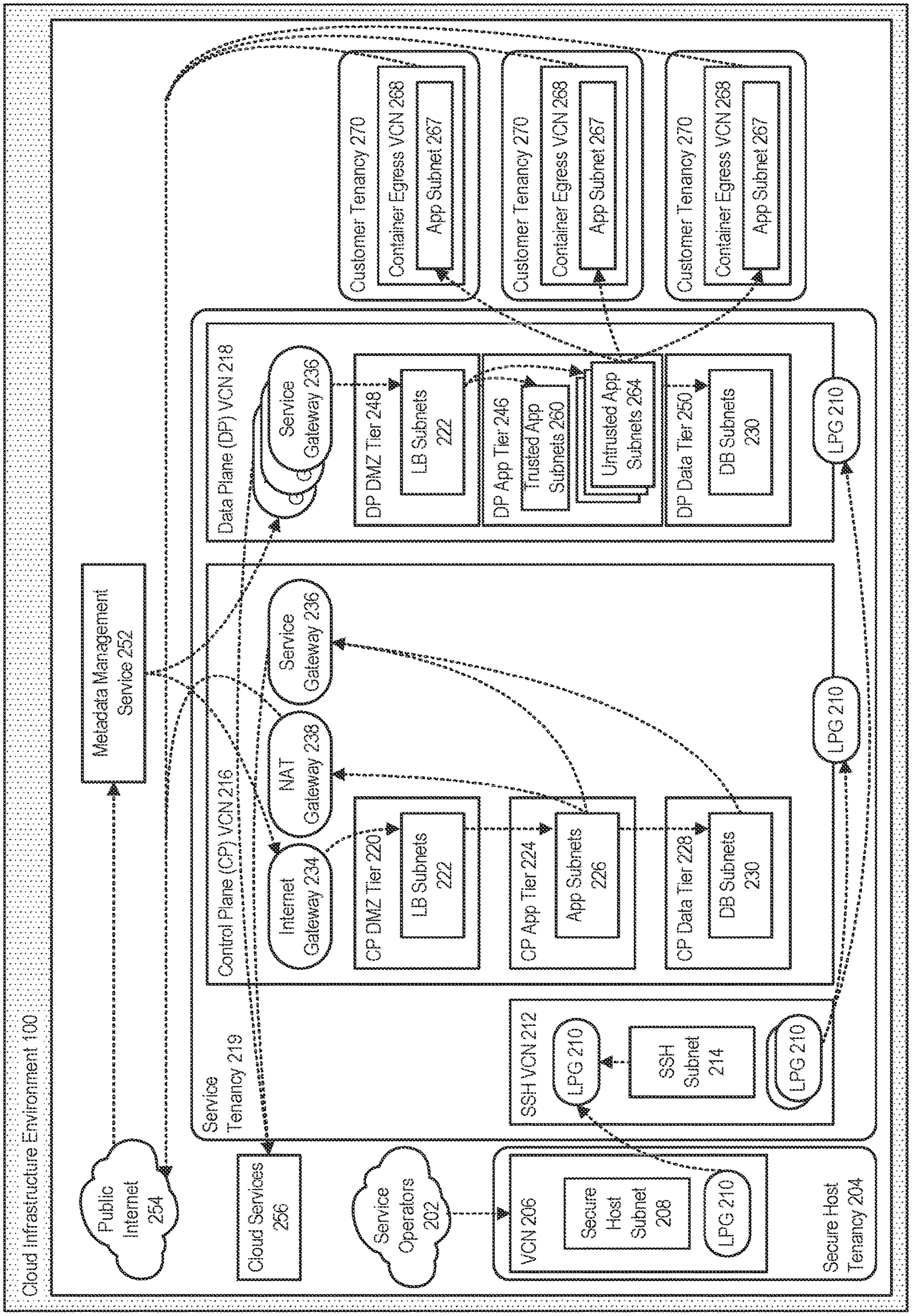
FIG. 5 illustrates another example of a cloud infrastructure architecture, in accordance with an embodiment.

FIG. 5 illustrates another example of a cloud infrastructure architecture, in accordance with an embodiment.

As illustrated in FIG. 5, in accordance with an embodiment, the trusted app subnet(s) 260 can be communicatively coupled to the service gateway contained in the data plane VCN, the NAT gateway contained in the data plane VCN, and DB subnet(s) contained in the data plane data tier. The untrusted app subnet(s) 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs, and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)), which may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s), and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled; or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
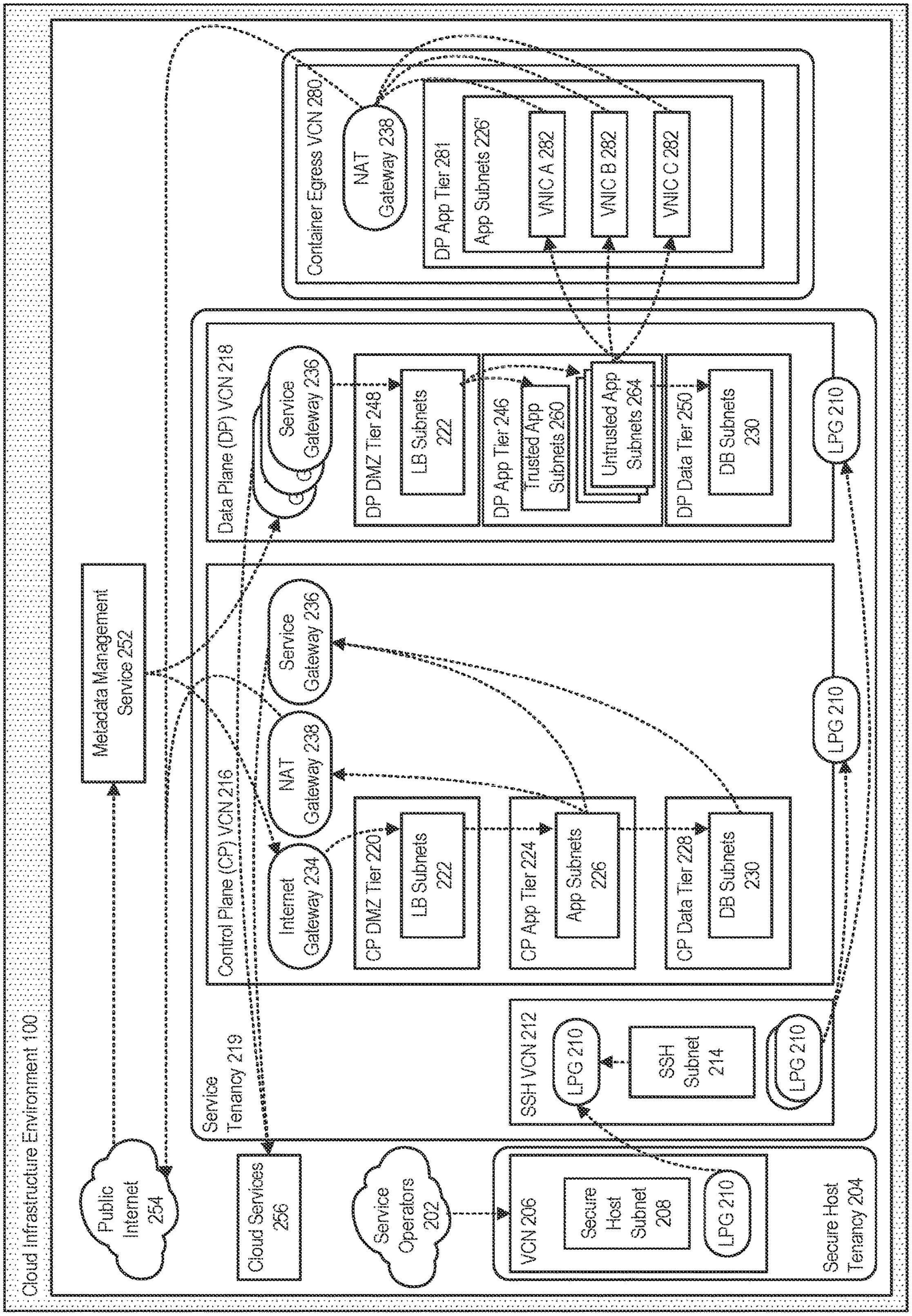
FIG. 6 illustrates another example of a cloud infrastructure architecture, in accordance with an embodiment.

FIG. 6 illustrates another example of a cloud infrastructure architecture, in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container, and be communicatively coupled to an app subnet that can be contained in a data plane app tier 281 that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that requests a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Cloud Environments

In accordance with an embodiment, a cloud infrastructure environment can be used to provide dedicated cloud environments, for example as one or more private label cloud environments, for use by tenants of the cloud infrastructure environment in accessing subscription-based software products, services, or other offerings associated with the cloud infrastructure environment.

Figure 7:
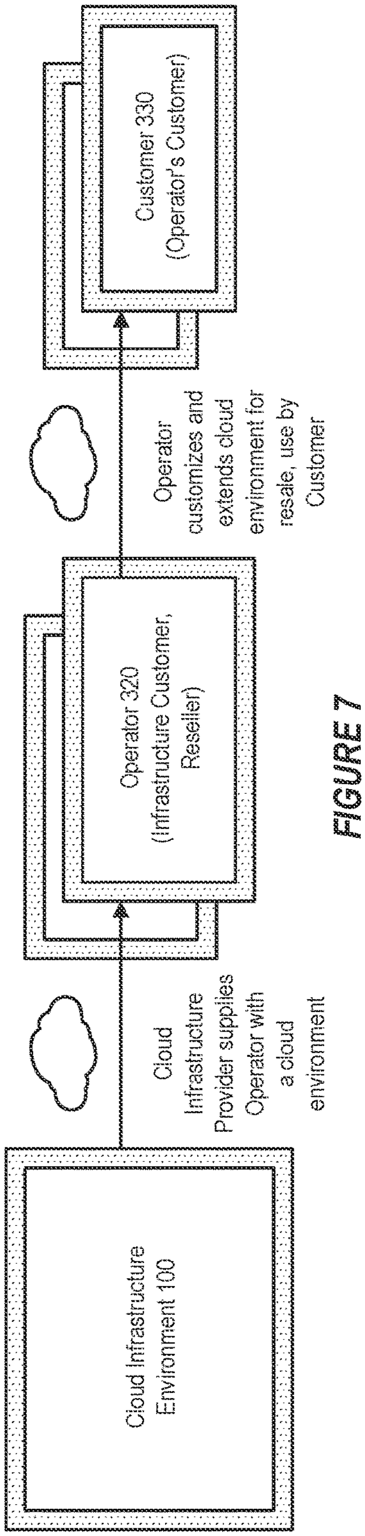
FIG. 7 illustrates a system that provides dedicated or private label cloud environments, for use by tenants or customers of a cloud infrastructure environment, in accordance with an embodiment.

FIG. 7 illustrates how the system can provide dedicated or private label cloud environments, for use by tenants or customers of a cloud infrastructure environment, in accordance with an embodiment.

Although several of the examples described herein illustrate various systems, methods, and/or techniques as may be used in the context of providing private label cloud (PLC) environments, in accordance with various embodiments, the systems, methods, and techniques described herein can be used, within or with other types of cloud environments.

As illustrated in FIG. 7, in accordance with an embodiment, a cloud infrastructure provider can supply an operator 320, for example a cloud infrastructure customer operating as a reseller, with one or more cloud environments (e.g., a PLC environment) or realms. The operator/reseller can then customize and extend the cloud environment for use by (their) customer 330, for use in accessing subscription-based software products, services, or other offerings associated with the cloud infrastructure environment.

For purposes of illustration, examples of such subscription-based products, services, or other offerings may include various cloud infrastructure software products, such as Oracle Fusion Applications products, or other types of products or services that allow customers to subscribe to usage of those products or services.

Figure 8:
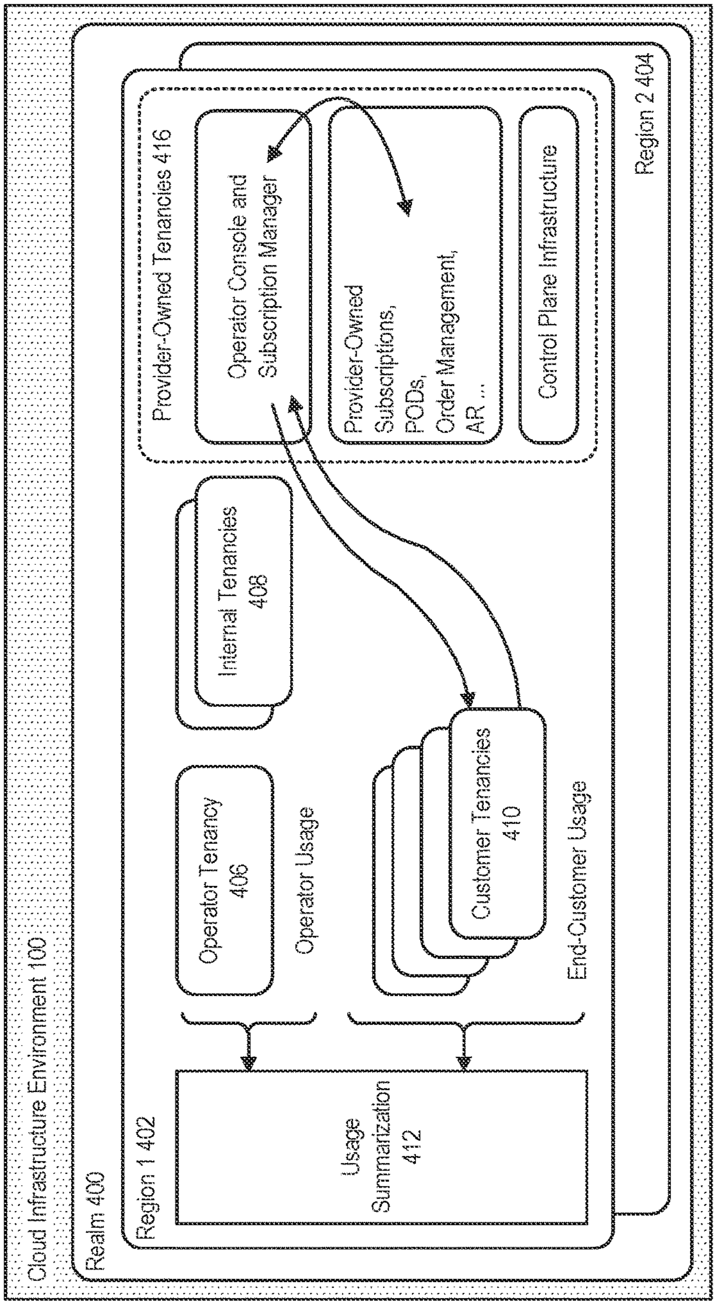
FIG. 8 further illustrates the use of cloud realms, for use by tenants or customers of a cloud infrastructure environment, in accordance with an embodiment.

FIG. 8 further illustrates the use of cloud realms, for use by tenants or customers of a cloud infrastructure environment, in accordance with an embodiment.

As illustrated in FIG. 8, in accordance with an embodiment, the system can include a cloud subscription service or component, referred to herein in some embodiments as a subscription manager, that exposes one or more subscription management APIs for creating orders used to onboard new customers, or to launch a workflow that creates a subscription and orchestrates billing and pricing service or other components for use with a cloud realm 400.

In accordance with an embodiment, when an operator (e.g., a PLC operator) or their customer requests a cloud environment, the system creates a realm, for use within a region 402, 404; together with one or more provider-owned tenancies 416. These tenancies allow a region to function with its required service infrastructure; and are administered by the cloud infrastructure provider.

In accordance with an embodiment, a first step in the process is to create an operator tenancy 406 for the operator, before the region and associated realms are turned over to them for subsequent management. The operator then becomes the administrator of this tenancy, within which they can view and manage everything that happens within that region, including their customer accounts and usage 412 by those customers of cloud resources.

Generally, once the region has been turned over or provided to the operator, the cloud infrastructure provider cannot subsequently access the data within the operator tenancy, unless the operator authorizes the cloud infrastructure provider to do so, for example to provide troubleshooting of issues that may arise.

In accordance with an embodiment, the operator can then create additional internal tenancies 408, intended for their own use internally, for example to assess what the end user or customer experience will be, or to provide a sales demo tenancy, or to operate a database for their own internal use. The operator can also create one or more customer tenancies 410, of which the end user or customer will be the administrator. Cloud infrastructure usage, for example compute, storage, and other infrastructure resources, is consolidated by operator, reflecting both their usage and that of their customers, and reported to the cloud infrastructure provider.

In accordance with an embodiment, a user interface or console can be provided that allows the operator to manage its customer accounts and customer-offered services. A cloud infrastructure provider can also use a cloud infrastructure tenancy, for example a Fusion Applications tenancy, to install any needed infrastructure services for use by the operator and their customers.

Figure 9:
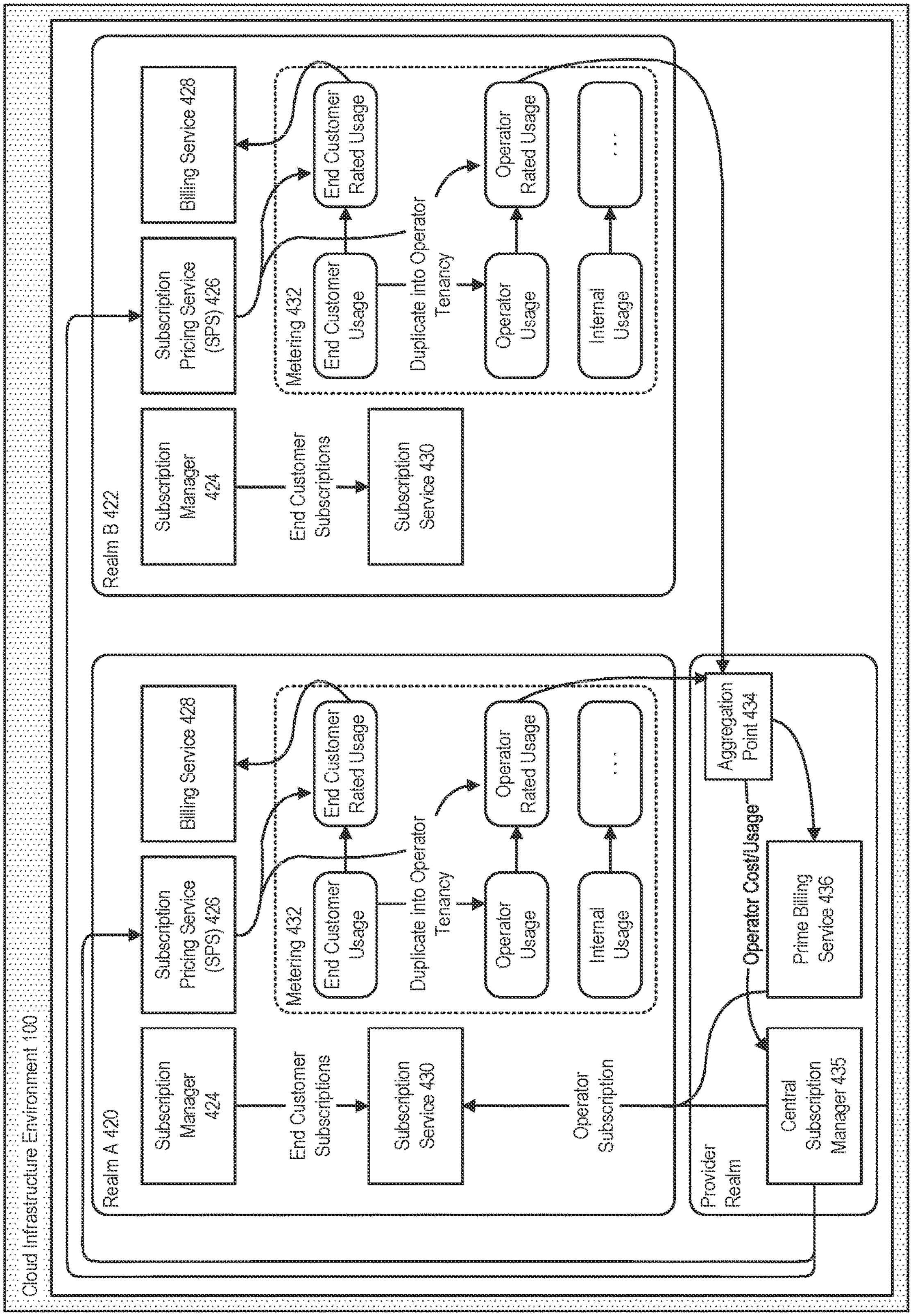
FIG. 9 further illustrates the use of cloud realms, for use by tenants or customers of a cloud infrastructure environment, in accordance with an embodiment.

FIG. 9 further illustrates the use of cloud realms, for use by tenants or customers of a cloud infrastructure environment, in accordance with an embodiment.

As illustrated in FIG. 9, in accordance with an embodiment, a subscription manager 424 service or component exposes one or more subscription management APIs for creating orders used to onboard new customers, or to launch a workflow that creates a subscription and orchestrates billing and pricing service or other components.

In accordance with an embodiment, the system can also include a billing service 428 or component that operates upon a billing account or logical container of subscriptions and preferences used to produce an invoice for a customer.

In accordance with an embodiment, the system can also include a subscription pricing service (SPS) 426 or component, which operates upon a product catalog that defines which products can be purchased by a customer, and can be used to provide a price list (e.g., a rate card) that the pricing service also owns.

In accordance with an embodiment, to support the sales process through which a subscription is created in a realm 420, 422, products can be selected from a product hub. Once an order is created via a subscription service 430, a subscription is created in the subscription manager which thereafter manages the life cycle of that subscription, and provisions what needs to be provisioned in downstream services. The SPS component then manages the aspects of pricing and usage, for use in charging the end cost to the operator or their ability to charge their customers. Usage events are forwarded to the billing service or component, where depending on the billing preferences of the subscription, invoices are created and pushed to an accounts receivables component.

In accordance with an embodiment, although the services that are offered in a realm report their usage to a metering service or component 432, such usage does not have any price associated with it. A rating process determines how much each specific event costs, for example by applying rate cards, determines a unit and cost for that subscription, associates the cost to that record, and then forwards that to the billing service or component.

As further illustrated in FIG. 9, in accordance with an embodiment, an operator may control multiple realms A, B—for example an operator that operates in multiple countries may wish to operate a data center that is completely isolated for the United States of America, and a separate data center that is completely isolated for Europe, for example to address governance or regulatory requirements. In accordance with an embodiment, the usage associated with these multiple realms can be aggregated 434, for use by a central subscription manager 435, and where applicable a prime billing service 436, in billing the operator.

The examples of various systems illustrated above are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Cloud Subscriptions

Figure 10:
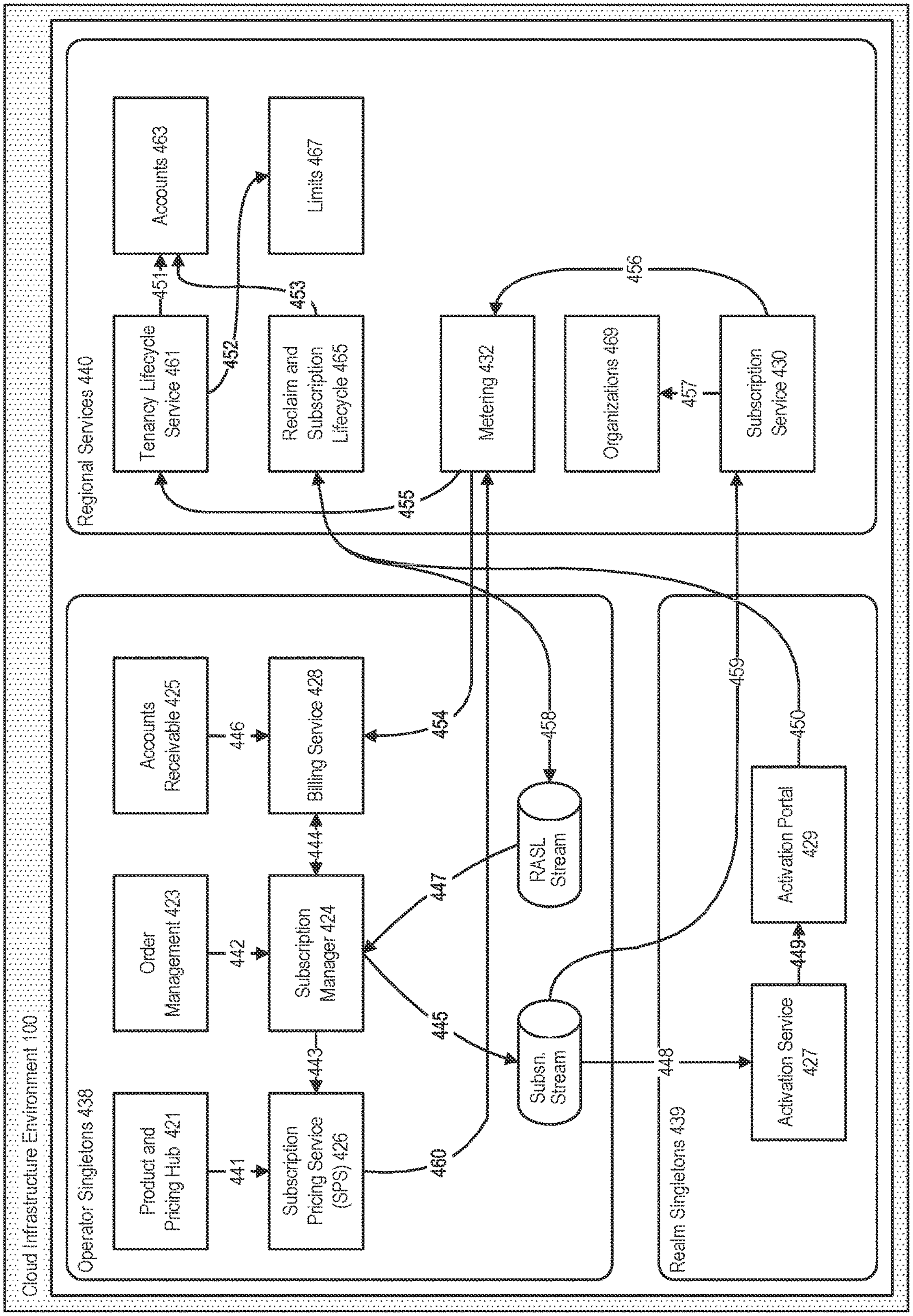
FIG. 10 illustrates a system for providing access to software products or services in a cloud computing or other computing environment, in accordance with an embodiment.

FIG. 10 illustrates a system for providing access to software products or services in a cloud computing or other computing environment, in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various cloud infrastructure software products or services that allow customers to subscribe to usage of those products or services.

In accordance with an embodiment, the environment can include a plurality of components provided as operator singletons 438, realm singletons 439, and regional services 440, as further described below.

In accordance with an embodiment, a subscription can include artifacts such as, for example, products, commits, billing model, and state. The subscription manager service or component can expose one or more subscription management APIs for creating orders used to onboard new customers, or to launch a workflow that creates a subscription and orchestrates creating the proper footprints in billing and pricing service or components, as further described below.

In accordance with an embodiment, the billing service or component operates upon a billing account or logical container of subscriptions and preferences used to produce an invoice. Each billing account generates one invoice per billing cycle. The billing service includes a first pipeline that accepts usage and cost from a metering service or component through a REST API, wherein billing writes the usage to a database from which billing workers aggregate and calculate balances; and a second pipeline responsible for taking the aggregated usage and commitments and calculating charges over a billing interval.

In accordance with an embodiment, the subscription pricing service (SPS) 426 or component operates upon a product catalog that defines which products can be purchased by a customer. The product catalog forms the backbone of a price list (i.e., rate card) that the pricing service also owns. Rate cards are modeled as pricing rules on top of public list prices. The pricing service maintains a single price list for all products, new product prices can be added, and existing prices changed. The price list has a full history, the latest version being the current rate card. Since some contracts may require a snapshot of the rate card be taken, the pricing service handles this by recording the time a customer's rate card is created, and then querying the price list at that time.

In accordance with an embodiment, the SPS or pricing service is responsible for communicating with a product and pricing hub 421, to provide information about products, global price list, and end user or customer's subscription specific price lists and discounts. For example, in accordance with an embodiment, SPS can synchronize product information from a product hub, and a global price list from a pricing hub.

In accordance with an embodiment, the subscription manager service or component operates as an upstream service to receive new order requests from an order management 423 component, for example from an Oracle Fusion Order Management environment. The subscription manager service or component can provide subscription information to the SPS service, including subscription details such as time of quote configured, or subscription type (Commitment, PayG), to help SPS to determine an effective base price (Rate Card) for the subscription. The subscription manager service or component can also send discounts for subscriptions received from the order management component, which SPS stores as a pricing rule entity.

In accordance with an embodiment, the SPS service runs as a background process to manage a rate cards service or component, which is responsible for generating rate cards for new subscriptions and updating those rate cards when new price changes occur. The SPS service can provide APIs to access rate cards and pricing rules. A metering in-line rating engine can utilize these APIs to obtain subscription-specific rate cards and pricing rules, and then use this data for cost calculations.

In accordance with an embodiment, additional SPS components can include, for example, a pricing/product hub integration component, that allows an operator entity providing subscription-based products, services, or other offerings within the environment, to manage their product and price list, for example as provided by a product hub and pricing hub respectively.

For example, in accordance with such an embodiment, an SPS product integration flow can listen to create/update events in the product hub and make calls to an SPS product API. Similarly, an SPS pricing integration flow can pull new price list creation from the pricing hub and call respective SPS pricing APIs.

In accordance with an embodiment, the system can also include an SPS core module that provides APIs to manage and access pricing entities. Pricing entities can be accessed by internal services, for example an inline rating engine.

In accordance with an embodiment, the system can also include a rate card manager component. The SPS service maintains the single base price for a product at a given time. However, product prices for subscription are dependent on a base price at quote configuration time and price list change policy attributes of subscriptions. The SPS service internally maintains the price to be used for subscription using these properties. All such price lists are grouped in a rate card. The rate card manager can create and maintain the rate card, listen to price list changes and update existing rate cards with the new price, and listen to new subscriptions and assigns the rate card based on subscription properties.

In accordance with an embodiment, the SPS service is responsible for managing pricing rules for a subscription, including discounts offered to an end user or customer. Pricing rules eligibility can be based on attributes of products, such as discount group, product category or specific SKUs. Internally SPS needs to identify the list of products for which these rules will be applicable. To accomplish this, a rule decoder engine can compile the pricing rules in a format such that an in-line rating engine can consume the information for cost calculation. This compilation process can be triggered when products or pricing rules are created or updated.

As illustrated by way of example in FIG. 10, in accordance with an embodiment: at 441, a product and price information managed in, e.g., Fusion Applications, is sent to the SPS component.

At 442, orders are sent to the subscription manager component to create subscriptions, rate cards and billing accounts.

At 443, pricing configuration and pricing rules are sent to SPS for new orders.

At 444, the subscription manager component is used to set up a billing account in the billing service or component.

At 445, the subscription manager component publishes events to an subscription manager streaming component.

At 446, a charge data is sent to an accounts receivable component 425 to generate invoices.

At 447, the subscription manager component consumes reclaim and subscription lifecycle (RASL) events from subscription manager streaming.

At 448, an activation service 427 reads the subscription manager event stream.

At 449, a customer obtains activation data from an activation portal 429.

At 450, a tenancy lifecycle service 461 provisions a tenancy as part of the subscription activation.

At 451, the tenancy lifecycle service creates, within an accounts 463 component, an accounts footprint during account provisioning.

At 452, the tenancy lifecycle service sets, within a limits service 467, a limits template during account provisioning.

At 453, the accounts component acts as a downstream RASL client to handle a legacy reclamation and subscription lifecycle 465.

At 454, aggregated cost and usage is sent to the billing service 428 or component.

At 455, an organization can create child tenancies using the tenancy lifecycle service.

At 456, a metering service 432 or component obtains subscription mapping data.

At 457, the subscription service 430 obtains organization data 469 for subscription mappings.

At 458, the RASL component reads the subscription manager event stream.

At 459, the subscription service reads the subscription manager event stream; and at 460, the metering service or component obtains a rate card data for each subscription, which can then be used in charging the end cost to the operator or their ability to charge their customers.

The above examples are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Building and Managing Dynamic Rate Cards for Subscriptions

As described above, it may not be convenient, efficient, or cost-effective to utilize a scheme of a 1:1 rate card per subscription relationship for providing access to software products or services in a cloud computing or other computing environment.

For example, every price change in such system could trigger a creation of a rate card version for every subscription that exists in the system. For cloud systems having 1000 customers and 10,000 products, a customized rate card approach would be required to maintain 10 million price points for 1000 rate cards. A new product launch might require all 1000 rate cards to be updated.

In accordance with an embodiment, systems and methods are provided that provide for building and managing dynamic rate cards for cloud services subscriptions that allows rate cards to be associated with plural subscriptions;

and allow operators to provide customized, dynamic pricing and optimize the number of rate cards within easily manageable parameters.

In accordance with an embodiment, operators may use a single base price for each product at a given time, for a given currency. The effective base price for subscriptions may be determined based on contract date and subscription pricing policy. Subscriptions created under a “Current Date at List Price” policy result in the creation of rate cards that ensure that these customers always get charged with the latest base price. Subscriptions created under a “Contract Date at Contract Price” policy result in the creation of rate cards that ensure that these customers will be charged with the base price as it existed on the contract date. Subscriptions created under a “Lowest of at Contract Price or Price Drop” policy result in the creation of rate cards that ensure that these customers will be charged with the minimum of base price as it existed on the contract date or the latest minimum price.

In accordance with an embodiment, systems and methods are provided that leverage these groups, aggregates the subscriptions into different groups, and uses those groups to determine the base price for any given one or more customers thereby reducing the complexity of rate card management while also at the same time providing the flexibility of custom pricing.

In accordance with an embodiment, the system can provide dynamic management of cost assessment for use of services in a cloud environment. The system can include a cloud environment deployed within a realm and controlled by a tenant operator, a cloud subscription service, manager, or component for managing subscriptions to the cloud services, a subscription pricing service (SPS) configured to dynamically determine rate card information for the subscription, and a metering service.

In accordance with an embodiment, the cloud environment deployed within the realm and controlled by the operator can include software products and/or services provided as vendor cloud products and/or services.

In accordance with an embodiment, the cloud subscription manager can be configured to receive from an end-user a request to order one or more of the cloud products and/or services, and fulfill the order by creating a subscription, wherein the subscription comprises subscription pricing attributes.

In accordance with an embodiment, the subscription pricing service can be configured to dynamically determine rate card information for the subscription, in response to pricing events and based on the subscription pricing attributes.

In accordance with an embodiment, the metering service can be configured to receive the rate card information from the subscription pricing service, receive end-user consumption information from the cloud services wherein the end-user consumption information is representative of a use by the end-user of the cloud services, and determine based on the rate card information and the end-user consumption information a usage cost to the end-user for the use by the end-user of the cloud services.

In accordance with an embodiment, the subscription pricing service is operable to determine the rate card information for the subscription based on subscription pricing attributes comprising a contract date price; and/or a current rate price; and/or one or more of a contract price and/or a reduced price.

In accordance with an embodiment, the metering service is operable to determine usage costs for a plurality of end-users based on end-user consumption information for each of the plurality of end-users and the rate card information, wherein the rate card information is based on subscription pricing attributes common to each of the plurality of end-users.

In accordance with an embodiment, the subscription pricing service can include a product integration tool service operable to pull product information data from a product hub operably coupled with the system, wherein the product information data is representative of parameters of the cloud services; a pricing integration tool service operable to pull product pricing information data from a pricing hub operably coupled with the system, wherein the product pricing information data is representative of pricing of the cloud services; and a pricing control plane operable with the product integration tool service and the pricing integration tool service.

In accordance with an embodiment, the product integration tool service can be controlled by an operator of the system to modify the product information data representative of the functional parameters of the cloud services, and/or to add additional product information data representative of additional parameters of the cloud products and/or services.

In accordance with an embodiment, the pricing integration tool service can be controlled by an operator of the system to modify the product pricing information data representative of the pricing of the cloud services, and/or add additional product pricing information data representative of additional pricing of the cloud services.

In accordance with an embodiment, the cloud environment can be deployed within a realm controlled by the operator comprising a plurality of regions.

In accordance with an embodiment, one or more of the cloud products and/or services can be provided in each of the plurality of regions.

Subscription Pricing Service

Figure 11:
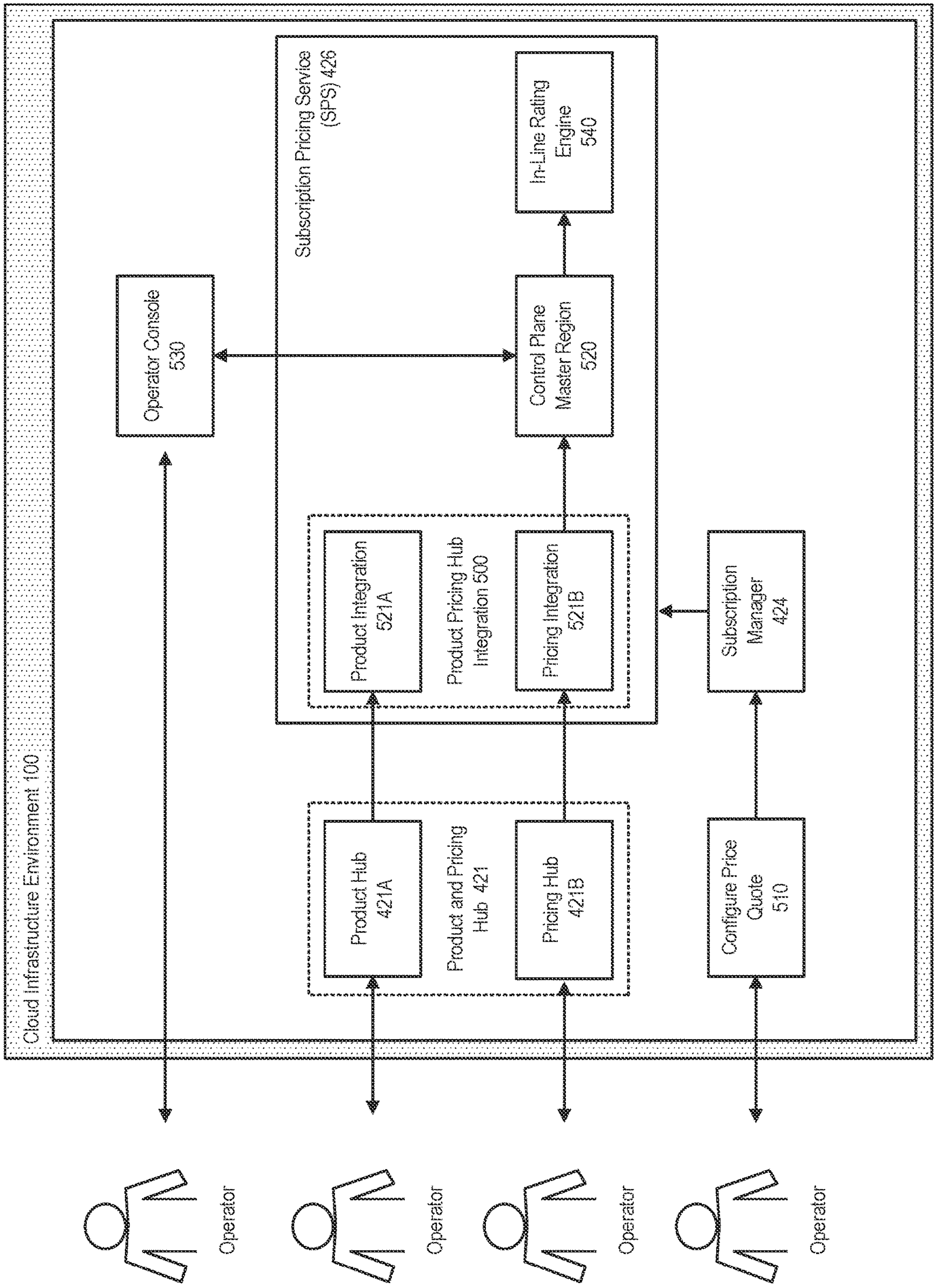
FIG. 11 illustrates the use of a subscription pricing service to provide access to software products or services in a cloud computing environment, in accordance with an embodiment.

FIG. 11 illustrates the use of a subscription pricing service to provide access to software products or services in a cloud computing environment, in accordance with an embodiment.

As illustrated in FIG. 11, in accordance with an embodiment, the subscription pricing service is responsible for providing information about products, global price list, and end customer’s subscription specific price list and discounts.

For example, in accordance with an embodiment, the subscription pricing service operates to synchronize (sync) product information from a product hub 421A portion of the product and pricing hub 421 (as illustrated in FIG. 10), and a global price list from and a pricing hub 421B portion of the product and pricing hub 421.

In accordance with an embodiment, the cloud subscription manager operates as an upstream service to receive new order requests, for example from an order management 423 component. The cloud subscription manager can provide subscription information to the subscription pricing service (SPS). Subscription details such as, for example, time of quote configured, subscription type (Commitment, PayG) help SPS to determine an effective base price (Rate Card) for the subscription. The cloud subscription manager can also send discounts for subscriptions received, for example from the order management component, which SPS stores as a pricing rule entity.

In accordance with an embodiment, the subscription pricing service runs as a background process to manage a rate card service or component, which is responsible for generating rate cards for new subscriptions and updating rates cards when new price changes occur. The subscription pricing service can expose APIs to access rate cards and pricing rules. A metering in-line rating engine 540 can utilize these APIs to obtain subscription-specific rate cards and pricing rules, and uses this data for cost calculations.

In accordance with an embodiment, additional SPS components can include, for example, a pricing/product hub integration component 500, that allows an operator entity (e.g., a PLC operator) to provide subscription-based products, services, or other offerings within the environment, and to manage their product and price list, for example as provided by a product hub and pricing hub respectively.

For example, in accordance with an embodiment, an SPS product integration flow can listen to create/update events in the product hub 421A and make calls to an SPS product API. Similarly, an SPS pricing integration flow can pull new price list creation from the pricing hub 421B and call respective SPS pricing APIs.

In accordance with an embodiment, the subscription pricing service 426 can include a product integration tool service 521A operable to pull product information data from the product hub 421A operably coupled with the system, wherein the product information data is representative of parameters of the cloud services; a pricing integration tool service 521B operable to pull product pricing information data from a pricing hub 421B operably coupled with the system, wherein the product pricing information data is representative of pricing of the cloud services; and a pricing control plane operable with the product integration tool service and the pricing integration tool service.

In accordance with an embodiment, the product integration tool service 521A is operable by an operator of the system to modify the product information data representative of the functional parameters of the cloud services, and/or to add additional product information data representative of additional parameters of the cloud products and/or services. The modified product information data and/or the additional product information data are registered via a control plane master region 520.

In accordance with an embodiment, the pricing integration tool service 521B is operable by the operator of the system to modify the product pricing information data representative of the pricing of the cloud services, and/or add additional product pricing information data representative of additional pricing of the cloud services. The modified product pricing information data and/or the additional product pricing information data are registered via a control plane master region 520.

In accordance with an embodiment, a user interface or console 530 can be provided that allows the operator to manage its customer accounts and customer-offered services. A cloud infrastructure provider can also use a cloud infrastructure tenancy, for example a Fusion Applications tenancy, to install any needed infrastructure services for use by the operator and their customers.

Figure 12:
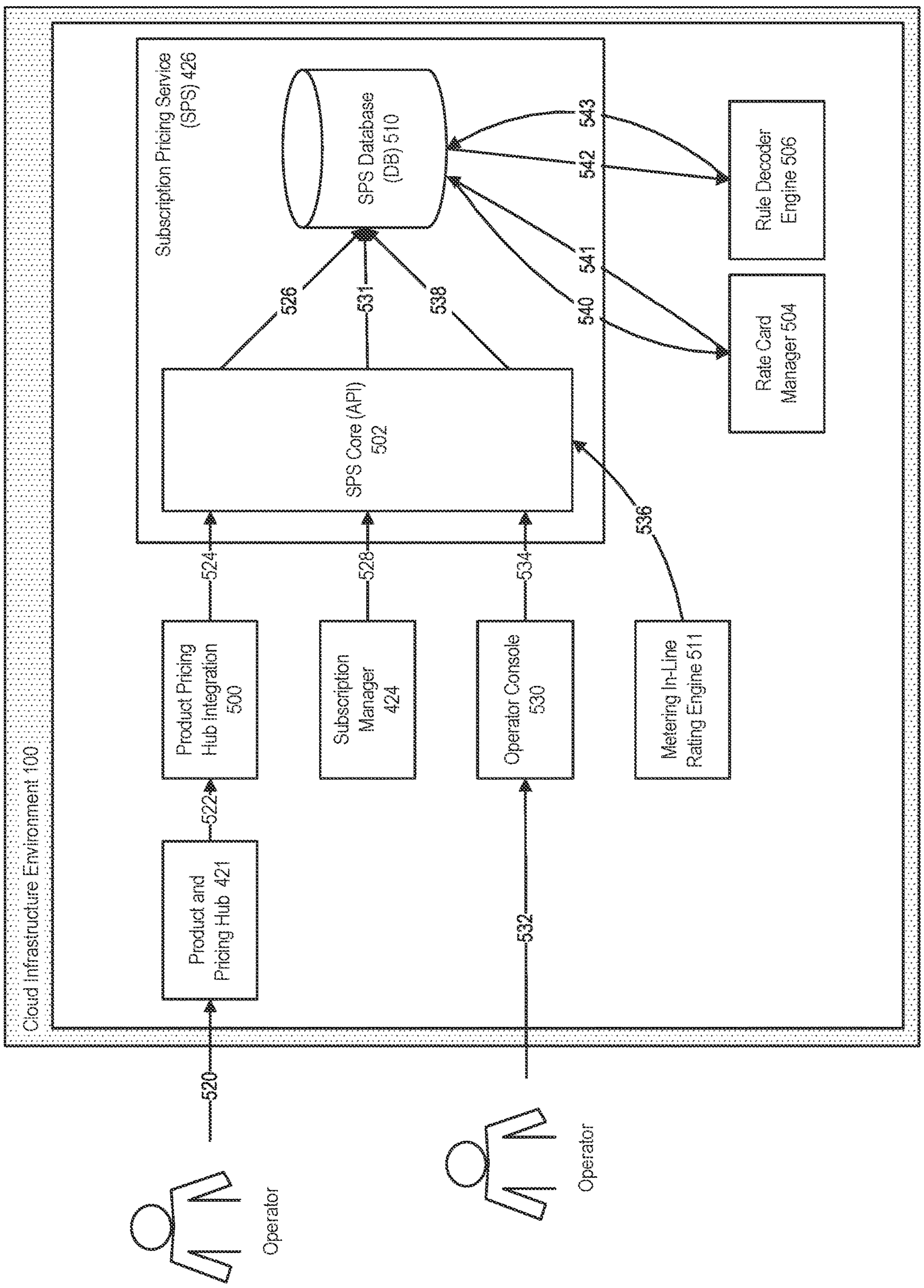
FIG. 12 further illustrates the use of a subscription pricing service to provide access to software products or services in a computing environment, in accordance with an embodiment.

FIG. 12 further illustrates the use of a subscription pricing service to provide access to software products or services in a computing environment, in accordance with an embodiment.

As illustrated in FIG. 12, in accordance with an embodiment, additional SPS components can include, for example, a pricing/product hub (e.g., OCI) integration component 500, that allows an operator or entity providing subscription-based products, services, or other offerings within the environment, to manage their product and price list, for example as provided by the product and pricing hub component 421, respectively.

For example, in accordance with an embodiment, an SPS product integration flow can listen to create/update events in an (e.g., OCI) product hub 421 and make calls to an SPS product API. Similarly, an SPS pricing integration flow can pull new price list creation from an (e.g., OCI) pricing hub 421 and call respective SPS pricing APIs.

In accordance with an embodiment, the system can also include an SPS core module 502 that provides APIs to manage and access pricing entities. Pricing can be accessed by internal services, for example an inline rating engine.

In accordance with an embodiment, the system can also include a rate card manager component 504. The subscription pricing service maintains the single base price for a product at a given time. However, product prices for subscriptions are dependent on a base price at quote configuration time and price list change policy attributes of subscriptions. The subscription pricing service internally maintains the price to be used for subscription using these properties. All such price lists are grouped in a rate card. The rate card manager can create and maintain the rate card and listen to price list changes and update existing rate cards with the new price. The rate card manager is also operable to listen to new subscriptions and to assign the rate card based on subscription properties.

In accordance with an embodiment, the system can also include a rule decoder engine 506. The subscription pricing service is responsible for managing pricing rules for a subscription. These pricing rules contain discounts offered to end customer. Pricing rules eligibility can be based on attributes of products, such as, for example, discount group, product category or specific SKUs. In accordance with an embodiment, the subscription pricing service internally identifies the list of products to which these rules are to be applicable. To accomplish this, the rule decoder engine can compile the pricing rules in a format such that in line rating engine can consume for cost calculation. This compilation process can be triggered when products or pricing rules get created/updated.

In accordance with an embodiment, synchronous operations are performed in SPS. In this regard, at 520, new products are added to the product hub. Similarly, a new price list may be added to the pricing hub, at 520. Thereafter, at 522, the new product event and/or the new pricing event is indicated to the pricing/product hub integration component 500.

The pricing/product hub integration component 500 makes API calls, at 524, using the SPS core 502. At 526, the new product and/or new price is/are inserted into the product and/or price tables of the SPS database 510.

At 528, the SPS uses API calls of the SPS core 502 to create subscription pricing configuration data and/or pricing rules, wherein the cloud subscription cloud subscription service, manager, or component 424 exposes one or more subscription management APIs for creating orders used to onboard new customers, or to launch a workflow that creates a subscription and orchestrates billing and pricing service or other components. Then in turn the SPS core 502, at 531, inserts the configuration data and/or pricing rules into the SPS database 510.

In accordance with an embodiment, the system enables an operator to use an operator console 530 to perform various tasks or the like including for example reading, at 532, pricing rules, price lists, rate cards, and also including selectively creating pricing rules.

The operator console 530 makes API calls, at 534, to retrieve lists and/or create pricing rules.

A metering in-line rating engine module 511 is operable in accordance with an example embodiment to make API calls, at 536, to retrieve rate cards and/or pricing rules which are read at 538 from the SPS database 510.

In addition to the above, various one or more asynchronous background operations are performed by the system in accordance with an embodiment. In this regard new subscriptions may be read, at 540, from the SPS database 510 to the rate card manager 504. Further, the rate card manager 504 may, at 541, insert generated rate card price lists into the SPS database 510.

In further addition to the above, various additional one or more asynchronous background operations are performed by the system in accordance with an embodiment. In this regard new pricing rules may be read, at 542, from the SPS database 510 to the rule decoder engine 506. Further, the rule decoder engine 506 may, at 543, insert new pricing rules into the SPS database 510.

Dynamic Rate Card Management

In accordance with an embodiment, optimized dynamic rate card management allows organizations to provide a customized or dynamic pricing, and optimizes the number of rate cards to a manageable level wherein, for example: rate cards can be associated with the type of contract pricing policy; subscriptions can be associated with an applicable rate card based on contract pricing policy and contract date; and rate cards can be created, and updated, based on a last change in the price of a product in the system, in a just-in-time manner.

For example, in accordance with an embodiment, the system can operate using rate cards to group similar price lists for similar kind of subscriptions to optimize the API calls from metering. Care should be taken to make sure a correct rate card is mapped to a correct subscription and that a correct list of price lists is maintained for each rate card; otherwise, metering can receive a wrong rate, effectively causing incorrect billing.

Figure 13:
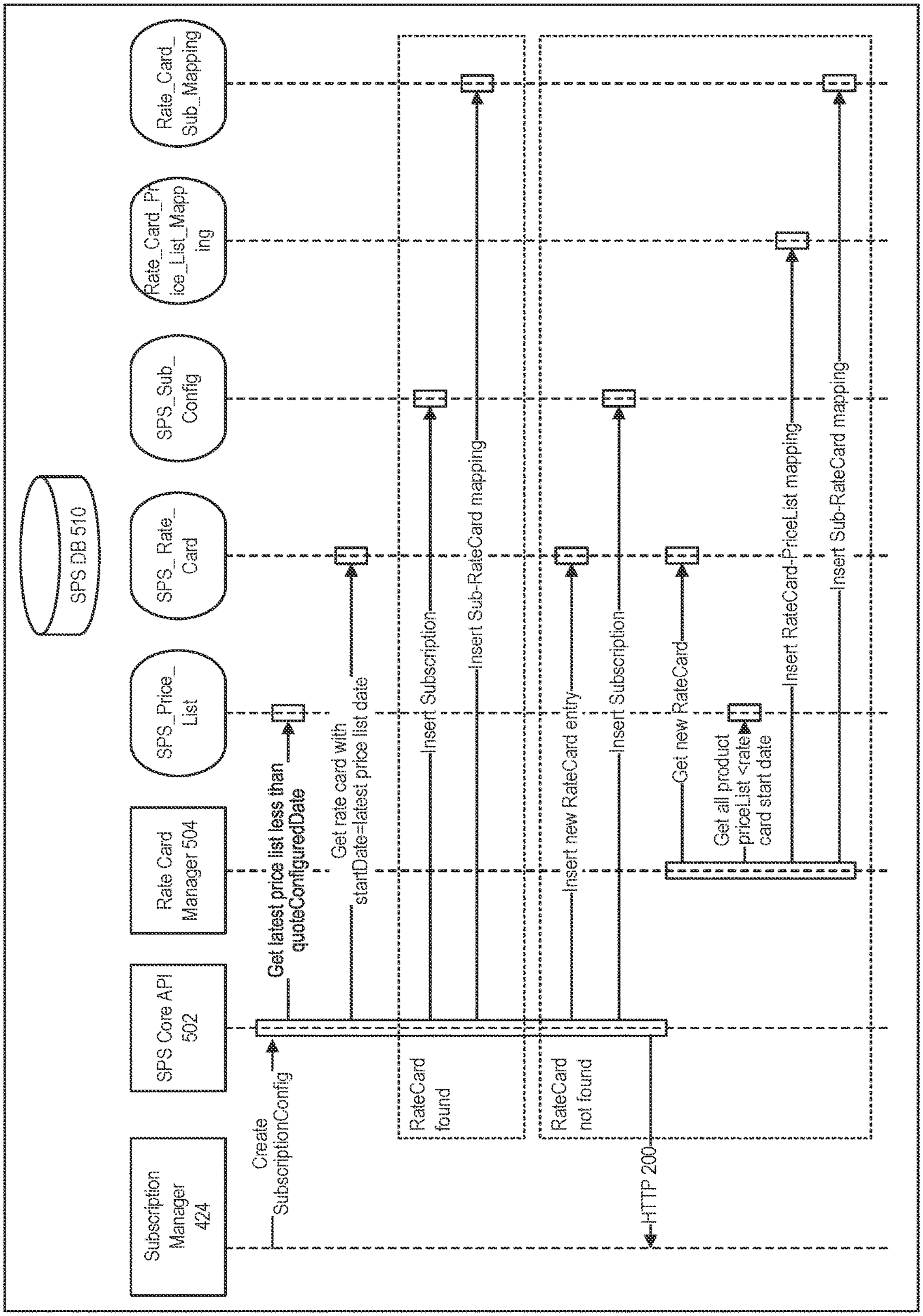
FIG. 13 illustrates an example usage of managing dynamic rate cards, in association with a new subscription, in accordance with an embodiment.

FIG. 13 illustrates an example usage of managing dynamic rate cards, in association with a new subscription, in accordance with an embodiment.

As illustrated in FIG. 13, in accordance with an embodiment, a new rate card can be generated when new subscription is created, and no rate card exists for latest price lists.

Figure 14:
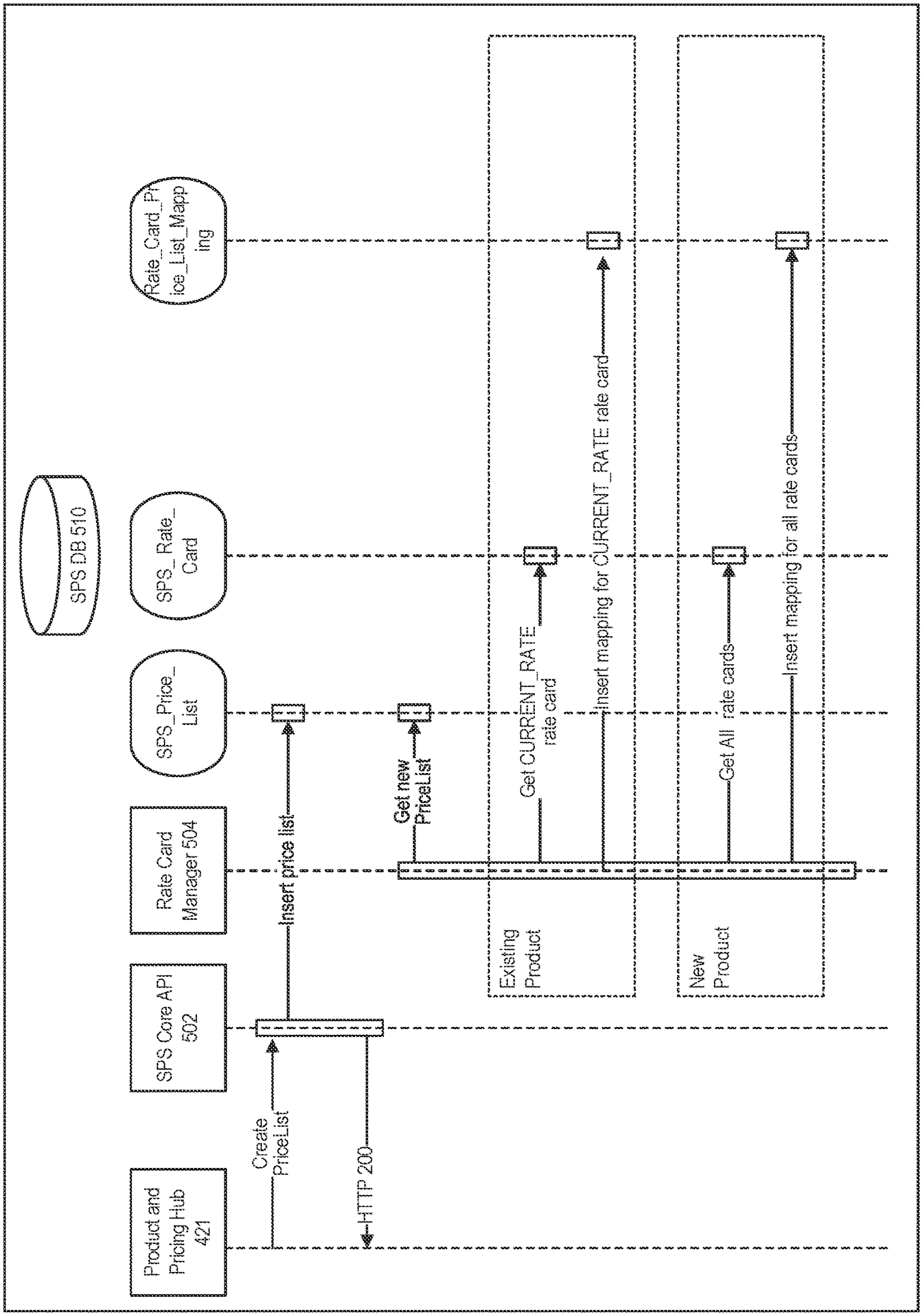
FIG. 14 illustrates an example usage of managing dynamic rate cards, in association with a price list addition, in accordance with an embodiment.

FIG. 14 illustrates an example usage of managing dynamic rate cards, in association with a price list addition, in accordance with an embodiment.

As illustrated in FIG. 14, in accordance with an embodiment, a new price list can be added when price changes for existing product or new product gets added. Existing product price changes will not impact the CONTRACT_RATE type rate cards. New product addition will impact all the rate cards. The rate card manager is responsible for updating rate cards when price list changes In accordance with an embodiment, an organization can use the single base price for each product at a given time, for a given currency. The effective base price for subscription is determined based on contract date and subscription pricing policy, for example (1) CurrentDate (At List Price); (2) ContractDate (At Contract Price); (3) Lowest (of the two) (At Contract Price-Price Drop). In accordance with an embodiment, these form three groupings of subscription types, which the system can then use to put a subscription into a particular grouping and use that to determine the base price. The three (3) groupings include CurrentDate (At List Price), ContractDate (At Contract Price), and the Lowest (of the two) (At Contract Price-Price Drop).

In accordance with an embodiment, the CurrentDate (At List Price) type of subscriptions will always get charged with latest base price.

In accordance with an embodiment, the ContractDate (At Contract Price) type of subscriptions will be charged with the base price on the contract date.

In accordance with an example embodiment, the Lowest (of the two) (At Contract Price-Price Drop) type of subscriptions will be charged with the minimum of base price on contract date or latest price.

FIG. 15 illustrates a table 550 of example subscription types, and corresponding rate cards, in accordance with an embodiment.

The cloud computing environment in accordance with embodiments herein can be used to provide access to a range of complementary cloud-based components, such as software applications or services, that enable organizations or enterprise customers to operate their applications and services in a highly-available hosted environment.

In accordance with an embodiment, a system enables guest or client operators such as service providers, integrators, and independent software vendors (ISVs) that are partnered with cloud operators to become private label cloud providers, and to thereby offer directly to their end customers a wide range of applications and services that may be tailored by the operators to specific industries, markets, and regulatory or governmental stipulations.

Such guest or client operators may develop their own unique/proprietary infrastructure and platform services that may otherwise be unavailable in a public cloud environment, but that their customers may find to have particular value for certain industries, markets, and regulatory schemes.

To enhance the value to the operators, the embodiments herein enable the infrastructure and platform services to be offered under the particular branding of the operator, and also with the ability of the operator to have full control over the commercial terms, customer relationships, and touchpoints. This includes control over pricing strategy including pricing for their own unique/proprietary infrastructure and platform services.

As described above, previously organizations used static rate cards as one way to manage product inventory pricing for their customers, wherein the rate card defined the pricing on a per customer subscription basis. Essentially, each customer subscription was associated with a rate card that set the pricing for the platform services on a per customer basis. Dynamic rate cards have been used as well wherein the customer is always offered the latest price irrespective of whether the individual product price increases or decreases.

In accordance with embodiments herein, customer behavior may be driven by locking the price to a contract date, or in some cases the price on the contract date or the latest price whichever is less, instead of just using the latest catalog price. However, use of this approach with the previously available rate card schemes described above of one rate card per subscription (1:1 relationship) would result in an excessive number of rate cards to the managed by the system thus causing sever overhead burdens for operators.

In accordance with an embodiment, the subject development provides methods and systems for building and managing dynamic rate cards for cloud service subscriptions that allows rate cards to be associated with plural subscriptions.

Therefore, the improvement to be searched, at its highest level, is the ability to associate a rate card with several (N)

subscription relationships (1:N), whereas previously each of the subscription relationships was associated with its own unique rate card (1:1).

There are some several advantages of the 1:N rate card to subscription relationship scheme of the proposed solution over the earlier 1:1 rate card to subscription relationship scheme. The first advantage is that significantly less rate cards are needed to be maintained by the system. Another advantage is the saving in processing needed to update the rate cards of the system for any changes in pricing of the subscriptions, such as may be due to pricing increases for example or discounted pricing offers. In the new 1:N scheme, far fewer rate cards need to be updated to account for the pricing changes for all of the subscription relationships. In further addition, the metering components of the system that assess costs to the subscriptions for use of the cloud products need only consult a far fewer set of rate cards, rather than combing through the full allotment of rate cards in the old 1:1 rate card to subscription relationship scheme.

In accordance with an embodiment, operators use a single base price for each product at a given time, for a given currency. The effective base price for subscription is determined based on contract date and subscription pricing policy.

Subscriptions purchased under a Current Date at List Price policy will result in rate cards that ensure that these customers always get charged with the latest base price. Here there is a single rate card can be used with or associated with as many subscriptions that exist or that may exist that were or that will be purchased under the Current Date at List Price policy (1:N relationship).

As illustrated in the examples shown in table 550 of FIG. 15, product prices are changed every three months by way of illustrative example. Although the product prices are changed every three months by way of illustrative example in FIG. 15 it is to be appreciated that product prices may change on any timetable or randomly as desired and/or necessary. Accordingly, the example of FIG. 15 is not meant to limit the example embodiments and is presented as a non-limiting example.

In an embodiment and in accordance with the illustrative example of FIG. 15, for subscription type At List Price (ALP) there will be a single rate card ALP-0000 for all subscriptions. Price changes will add new entries to this rate card. This is shown in the Table 550 in the column "At List Price" where, as can be seen, a single rate card ALP-0000 is used for all of the subscriptions shown, e.g. PayGSubQ1-1 through PayGSubQ4-3. The price changes at 1 Jan. 2022, 1 Apr. 2022, 1 Jul. 2022, and 1 Oct. 2022 in the example merely result in new entries being added to the single rate card ALP-0000. This 1:N relationship between a rate card and many subscriptions is exceeding efficient relative to the prior 1:1 scheme wherein a rate card was associated with each subscription.

In an embodiment and in accordance with the illustrative example of FIG. 15, for At Contract Price (ACP) subscription type, price changes will generate a new rate card but it will not affect existing rate cards. All subscriptions created during the time window of these modifications will use the same rate card.

In an embodiment subscriptions purchased under a Contract Date at Contract Price policy will result in the example in rate cards that ensure that these customers will be charged with the base price on the contract dates. In this scheme price changes will generate a new rate card but will not affect existing rate cards.

This is shown in the Table 550 of FIG. 15 in the column "At Contract Price" where, as can be seen, a single rate card ACP-010122 is used for all of the subscriptions shown, e.g. ContractPriceSubQ1-1 through ContractPriceSubQ1-3 that were purchased during the time window of 1 Jan. 2022 to 1 Apr. 2022. Similarly, and as shown in the Table below in the column "At Contract Price," a single further rate card ACP-040122 is used for all of the subscriptions shown, e.g. ContractPriceSubQ2-1 through ContractPriceSubQ2-3 that were purchased during the time window of 1 Apr. 2022 to 1 Jul. 2022. Also similarly, a third rate card ACP-070122 is used for all of the subscriptions shown, e.g. ContractPriceSubQ3-1 through ContractPriceSubQ3-3 that were purchased during the time window of 1 Jul. 2022 to 1 Oct. 2022, and a fourth rate card ACP-100122 is used for all of the subscriptions shown, e.g. ContractPriceSubQ4-1 through ContractPriceSubQ4-3 that were purchased during the time window following the price change that occurred on 1 Oct. 2022. This A:N relationship between rate cards (four (4) in the example) and many subscriptions that may be created in the time windows between the price changes is exceeding efficient relative to the prior 1:1 scheme wherein a rate card was associated with each subscription.

In the example embodiments herein, rather than needing to use twelve (12) rate cards-one for each subscription as in the prior system, the new dynamic rate card technology of the instant disclosure need only use four rate cards. Thus, there is a 1:N relationship between rate cards and subscriptions for subscriptions that were created in the time windows between the price changes. Also, there is an A:N relationship between rate cards and subscriptions overall, wherein A<total # of subscriptions. These 1:N and A:N relationships between rate cards and many subscriptions are exceedingly more efficient than the prior 1:1 scheme wherein each subscription is associated with a rate card.

In an embodiment and in accordance with the illustrative example of FIG. 15, for type At Contract Price-Price Drop (ACPPD), a single rate card is used for subscriptions created during same price window. A new ACPPD rate card is generated if price changes, and existing rate cards will be updated if product price drops.

In an embodiment subscriptions purchased under a Lowest of at Contract Price or Price Drop policy will result in rate cards that ensure that these customers will be charged with the minimum of base price on contract date or latest price. In this scheme a single rate card is used for subscriptions created during the same price window. New rate cards are created if the price increases occur and, if price decreases occur the existing rate cards are updated with the new lower price(s). This is shown in the Table below in the column "At Contract Price-Price Drop" where, as can be seen, a single rate card ACPPD-010122 is used for all of the subscriptions shown, e.g. CPPriceDropSubQ1-1 through CPPriceDropSubQ1-3 that were purchased during the time window of 1 Jan. 2022 to 1 Apr. 2022.

Similarly, and as shown in the Table 550 of FIG. 15 in the column "At Contract Price-Price Drop," a single further rate card ACPPD-040122 is used for all of the subscriptions shown, e.g. CPPriceDropSubQ2-1 through CPPriceDropSubQ2-3 that were purchased during the time window of 1 Apr. 2022 to 1 Jul. 2022. In the example the price may decrease on 1 Jul. 2022. In the case, the rate card ACPPD-040122 is updated with the new lower price and all new subscriptions e.g. CPPriceDropSubQ3-1 through CPPriceDropSubQ3-3 that were purchased during the time window of 1 Jul. 2022 to 1 Oct. 2022 use the same rate card ACPPD-040122 with the adjusted lower pricing information. A third rate card ACPPD-100122 is used for all of the subscriptions shown, e.g. CPPriceDropSubQ4-1 through CPPriceDropSubQ4-3 that were purchased during the time window following the price change that occurred on 1 Oct. 2022. This A:N relationship between rate cards (three (3) in the example) and many subscriptions that may be created in the time windows between the price changes is exceeding efficient relative to the prior 1:1 scheme wherein a rate card was associated with each subscription.

In the example, rather than needing to use twelve (12) rate cards-one for each subscription as in the prior system, the new dynamic rate card technology need only use three rate cards. Thus, there is a 1:N relationship between rate cards and subscriptions for subscriptions that were created in the time windows between the price changes. Also, there is an A:N relationship between rate cards and subscriptions overall, wherein A<total # of subscriptions. These 1:N and A:N relationships between rate cards and many subscriptions are exceeding more efficient than the prior 1:1 scheme wherein each subscription is associated with a rate card.

In the table illustrated in FIG. 15 product prices are changed every three months by way of illustrative demonstration. Here, subscription type At List Price will have single rate card ALP-0000 for all subscriptions. Price changes will add new entries to this rate card. For At Contract Price subscription type, price changes will generate new rate card but it will not affect existing rate cards. All subscriptions created during the time window of these modifications will use the same rate card. For type At Contract Price-Price Drop, single rate card is used for subscriptions created during same price window. It will have new rate card if price changes, existing rate cards will be updated if product price drops.

The embodiments herein leverages these groups, aggregates the subscriptions into different groups, and uses those groups to determine the base price for any given customer thereby reducing the complexity of rate card management while also at the same time providing the flexibility of custom pricing.

FIG. 16 illustrates an example usage of dynamic rate cards as applied to various subscription-based products, services, or other offerings, in accordance with an embodiment.

As illustrated in FIG. 16, in accordance with an embodiment, for the above example set as described in connection with FIG. 15, the price changed every three months. In this example, an organization with 10,000 subscriptions might typically need 10,000 rate cards to support custom pricing; however the approach described herein reduces this to 9 rate cards. The embodiments herein using dynamic rate cards in accordance with the embodiment therefore are highly beneficial relative to systems without the benefit of dynamic rate cards.

Rate Card Generation

In accordance with an embodiment, rate cards are associated with subscriptions, so new subscriptions will trigger rate card generation workflow. A new price creation or update will not trigger rate card generation as it is not useful unless new subscriptions are created for that time window. The system will respond to new subscription and price update events.

New Subscription Event

In accordance with an embodiment, for a new subscription event, each subscription type system will respond as explained below:

1. At List Price (ALP):
    a. Assign existing ALP-0000 rate card to new subscription.
2. At Contract Price (ACP):
    a. Find the latest time of price change before subscription contract date, call it $T_{max}$.
    b. Find if ACP rate card exist with TimeEffective=$T_{max}$.
        i. If present, Assign that ACP Rate Card to new subscription.
        ii. If not present,
            1. create a new ACP Rate Card and add all product price points effective on $T_{max}$ to that new ACP Rate Card.
            2. Set $T_{max}$ as the TimeEffective of the new ACP Rate Card.
            3. Update subscription with the newly generated ACP Rate Card.
3. At Contract Price-Price Drop (ACPPD):
    a. The approach for ACPPD type is same as ACP rate card mentioned above, only rate card type will change to ACPPD.

In accordance with an embodiment, in the above flow, rate card generation happens only for missing ACP and ACPPD type of rate cards.

New Product Launch

In accordance with an embodiment, the system is operable to react to a New product launch by adding new price entries to all rate cards in the system to reflect the new product launch. In accordance with an embodiment, the system is operable to react to a New product launch by using a variation of the above-described behavior based on one or more policies that may be adopted and/or required by the organization.

Product Discontinuation

In accordance with an embodiment, the system reacts to a product discontinuation by performing removal of product pricing from all relevant rate cards in the system.

Existing Product Price Change

In accordance with an embodiment, for an existing product change, each subscription type system will respond as explained below:

1. At List Price (ALP):
    a. Add new price entry in ALP-0000 rate card for a product.
2. At Contract Price (ACP):
    a. This will not require any change, as price will remain same as per contract.
3. At Contract Price-Price Drop (ACPPD):
    a. Find all the rate cards of type ACPPD.
    b. For each rate card.
        i. Find the latest price of the product at contract date.
        ii. If present, check if (new product price<contract date price)
            1. If true, add new entry with new updated price for ACPPD rate card.
            2. else update the product price as per the contract date.
        iii. If not present, find the first price of product after contract date
            1. If (new product price<first price of product) add new entry with new updated price for ACPPD rate card.
            2. else update the product price as per the first price.

Custom Pricing Beyond Rate Cards (Discounts)

In accordance with an embodiment, the approach described herein can be used to help an organization to support custom rate cards. An organization can further extend the custom pricing by providing discounts on top of custom rate card prices. For example, an organization can add discount policies such as, for example, "10% discount to subscription A for all products." The effective base price can be combined value of rate card price-offered discount for subscription. An organization can maintain such discount rules outside of base rate card and make it available for cost computation. The use of such custom rate cards and discounts provide an opportunity to organizations to offer competitive pricing.

Rate Cards Stored in Mutable and Semi-Immutable Data Structures

In accordance with an embodiment rate cards are stored in a non-transient memory device in mutable data structures and in semi-immutable data structures. For example, ALP rate cards may be stored in a mutable data structure, and ACP rate cards may be stored in a semi-immutable data structure.

In accordance with an embodiment, to support the sales process through which a subscription is created in a realm, products can be selected from a product hub. Once an order is created via a cloud subscription manager, a subscription is created in the cloud subscription manager which thereafter manages the life cycle of that subscription, and provisions what needs to be provisioned in downstream services. The SPS component then manages the aspects of pricing and usage, for use in charging the end cost to the operator or their ability to charge their customers. Usage events are forwarded to the billing service or component, where depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example by applying rate cards, determines a unit and cost for that subscription, associates the cost to that record, and then forwards that to the billing service or component.

In accordance with an embodiment, the subscription pricing service runs as a background process to manage a rate cards service or component, which is responsible for generating rate cards for new subscriptions and updating those rate cards when new price changes occur. The subscription pricing service can provide APIs to access rate cards and pricing rules. A metering in-line rating engine can utilize these APIs to obtain subscription-specific rate cards and pricing rules, and then use this data for cost calculations.

Use of Dynamic Rate Cards

Figure 17:
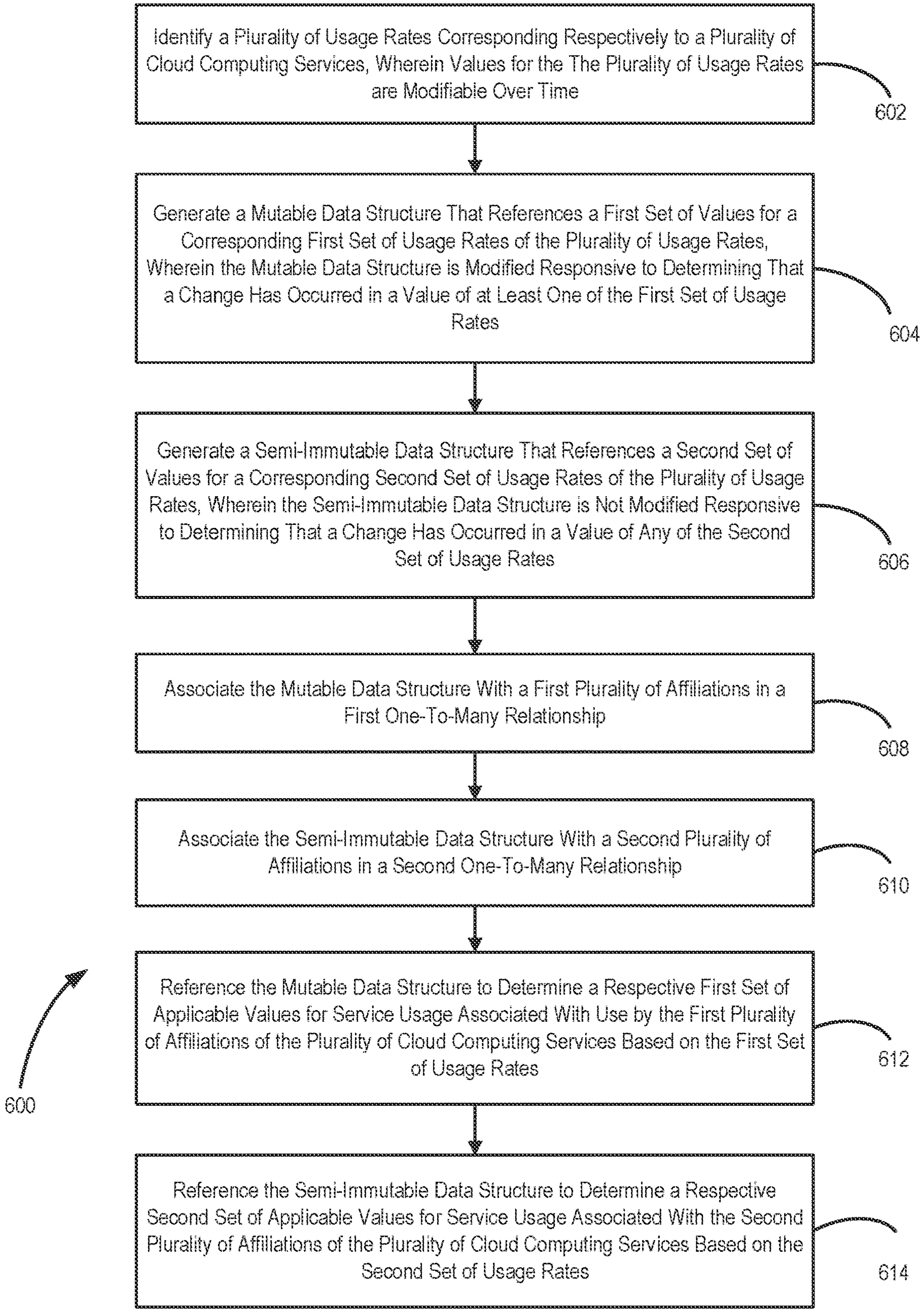
FIG. 17 is a flow diagram illustrating a method of using dynamic rate cards in accordance with an embodiment.

FIG. 17 is a flow diagram illustrating a method 600 of using dynamic rate cards in accordance with an embodiment.

As illustrated in FIG. 17, in accordance with an embodiment, a plurality of usage rates are identified at 602, wherein the plurality of usage rates correspond respectively to a plurality of cloud computing services. In the example embodiment, values for the plurality of usage rates are modifiable over time. The values may be process for the usage of the services in the cloud environment.

A mutable data structure is generated at 604 that references a first set of values for a corresponding first set of usage rates of the plurality of usage rates. In the example embodiment, the mutable data structure is modified responsive to determining that a change has occurred in a value of at least one of the first set of usage rates. In the example, the mutable data structure that is generated at 604 may be an ALP rate card, for example, that references a current set of values for a corresponding first set of usage rates of the plurality of usage rates.

A semi-immutable data structure is generated at 606 that references a second set of values for a corresponding second set of usage rates of the plurality of usage rates. In the example embodiment, all or portions of the semi-immutable data structure are not modified responsive to determining that a change has occurred in a value of any of the second set of usage rates. In the example, the semi-immutable data structure that is generated at 606 may be an ACP rate card for example that references a second set of values for a corresponding second set of usage rates of the plurality of usage rates of the plurality of usage rates.

The mutable data structure is associated at 608 with a first plurality of affiliations in a first one-to-many relationship. In the example embodiment the mutable data structure is associated at 608 with a first plurality of affiliations comprising for example a first plurality of subscriptions in the first one-to-many relationship.

The semi-immutable data structure is associated at 610 with a second plurality of affiliations in a second one-to-many relationship. In the example embodiment the semi-immutable data structure is associated at 610 with a second plurality of affiliations comprising for example a second plurality of subscriptions in the second one-to-many relationship.

The mutable data structure is referenced at 612 to determine a respective first set of applicable values for service usage associated with use by the first plurality of affiliations of the plurality of cloud computing services based on the first set of usage rates. In the example embodiment the referencing at 612 of the mutable data structure may comprise referencing the mutable data structure to determine a respective first set of applicable cost values to user tenants of the cloud environment for service usage associated with use by a first plurality of subscriptions to the plurality of cloud computing services based on the first set of usage rates.

The semi-immutable data structure is referenced at 614 to determine a respective second set of applicable values for service usage associated with the second plurality of affiliations of the plurality of cloud computing services based on the second set of usage rates. In the example embodiment the referencing at 614 of the semi-immutable data structure may comprise referencing the semi-immutable data structure to determine a respective second set of applicable cost values to user tenants of the cloud environment for service usage associated with use by a second plurality of subscriptions to the plurality of cloud computing services based on the first set of usage rates.

Modifying at List Price (ALP) Rate Card

Figure 18:
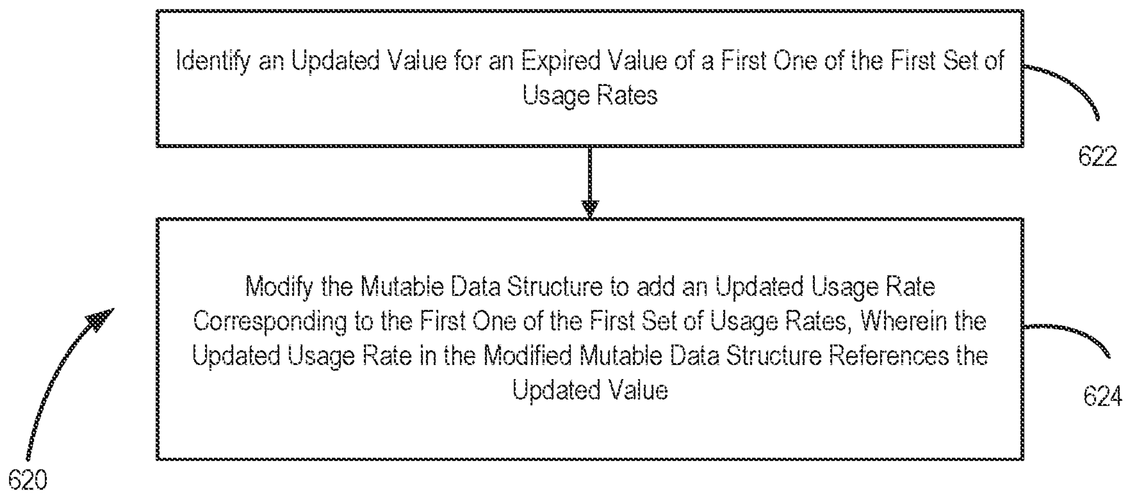
FIG. 18 is a flow diagram illustrating a method of modifying an At List Price (ALP) Rate Card in accordance with an embodiment.

FIG. 18 is a flow diagram illustrating a method 620 of modifying an At List Price (ALP) Rate Card in accordance with an embodiment.

As illustrated in FIG. 18, in accordance with an embodiment, an updated value for an expired value of a first one of the first set of usage rates is identified at 622.

The mutable data structure is updated at 624 to add an updated usage rate corresponding to the first one of the first set of usage rates. In accordance with an embodiment, the updated usage rate in the modified mutable data structure references the updated value.

Modifying at Contract Price (ACP) Rate Card

Figure 19:
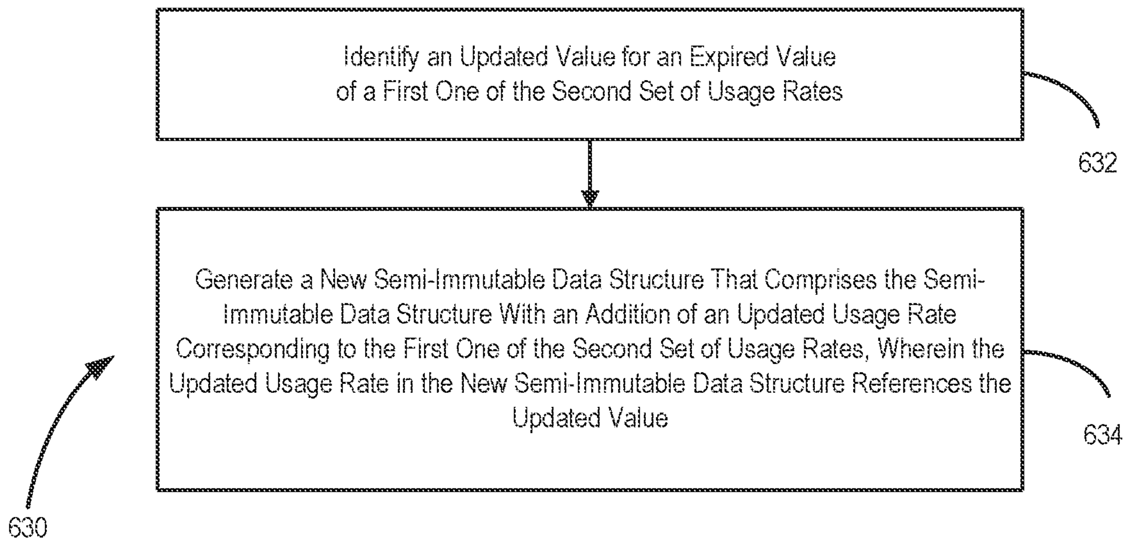
FIG. 19 is a flow diagram illustrating a method of modifying an At Contract Price (ACP) Rate Card in accordance with an embodiment.

FIG. 19 is a flow diagram illustrating a method 630 of modifying an At Contract Price (ACP) Rate Card in accordance with an embodiment.

As illustrated in FIG. 19, in accordance with an embodiment, an updated value for an expired value of a first one of the second set of usage rates is identified at 632.

A new semi-immutable data structure is generated at 634. In accordance with an embodiment, the new semi-immutable data structure that is generated at 634 comprises the semi-immutable data structure with an addition of an updated usage rate corresponding to the first one of the second set of usage rates. In accordance with an embodiment, the updated usage rate in the new semi-immutable data structure references the updated value.

Modifying ALP/ACP Rate Cards for Added New Cloud Computing Services

Figure 20:
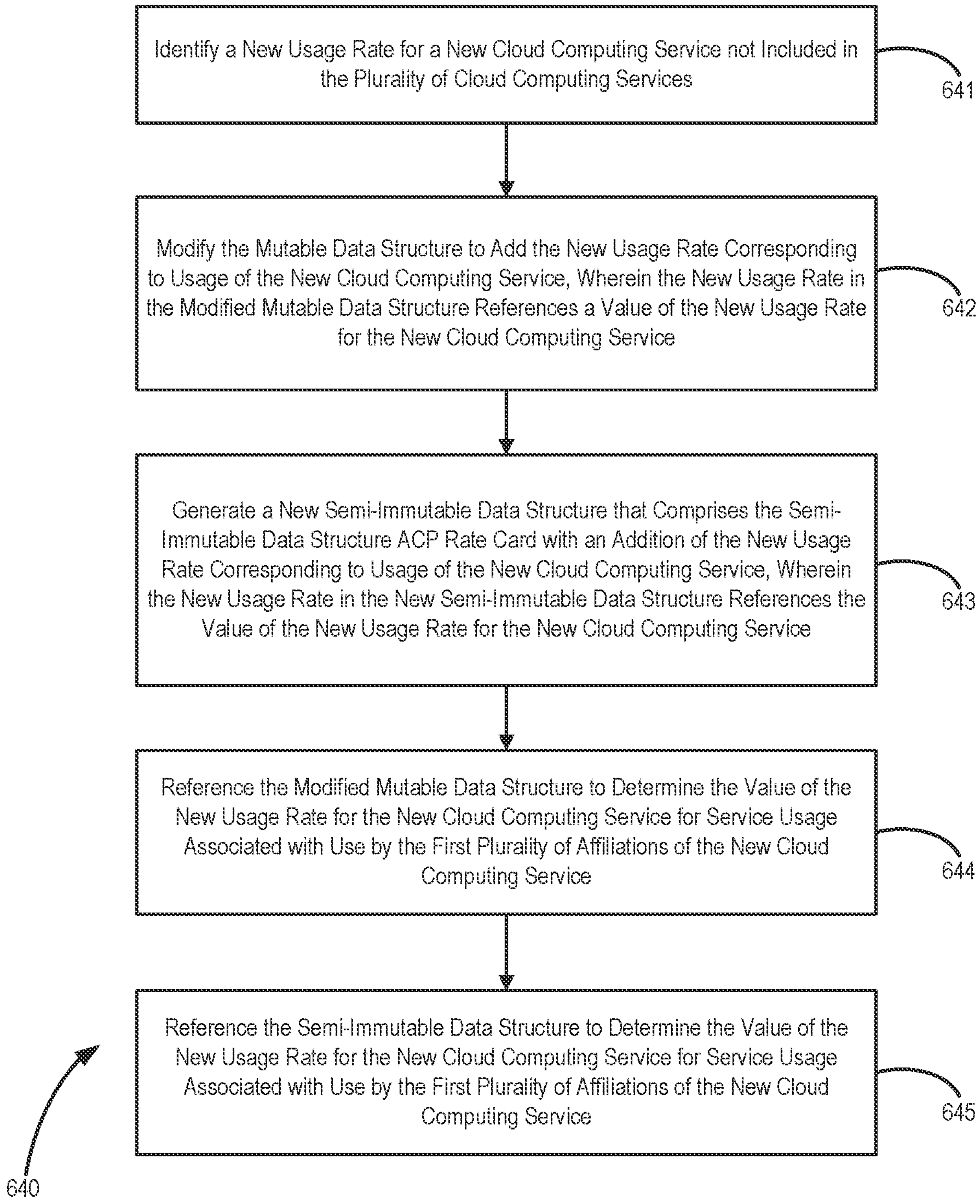
FIG. 20 is a flow diagram illustrating a method of modifying ALP and ACP rate cards for added cloud computing services in accordance with an embodiment.

FIG. 20 is a flow diagram illustrating a method 640 of modifying ALP and ACP rate cards for cloud computing services added to the cloud computing environment in accordance with an embodiment.

As illustrated in FIG. 20, in accordance with an embodiment, a new usage rate for a new cloud computing service is identified at 641. In the example embodiment the new cloud computing service is not included in the plurality of cloud computing services already present in the cloud computing environment.

The mutable data structure is modified at 642 to add the new usage rate corresponding to usage of the new cloud computing service. In accordance with an embodiment the new usage rate in the modified mutable data structure references a value of the new usage rate for the new cloud computing service.

A new semi-immutable data structure is generated at 643 wherein the new semi-immutable data structure comprises the semi-immutable data structure ACP rate card with an addition of the new usage rate corresponding to usage of the new cloud computing service. In accordance with an embodiment the new usage rate in the new semi-immutable data structure references the value of the new usage rate for the new cloud computing service.

The modified mutable data structure is referenced at 644 to determine the value of the new usage rate for the new cloud computing service for service usage associated with use by the first plurality of affiliations of the new cloud computing service.

The semi-immutable data structure is referenced at 645 to determine the value of the new usage rate for the new cloud computing service for service usage associated with use by the first plurality of affiliations of the new cloud computing service.

New Subscriptions to Cloud Services

Figure 21:
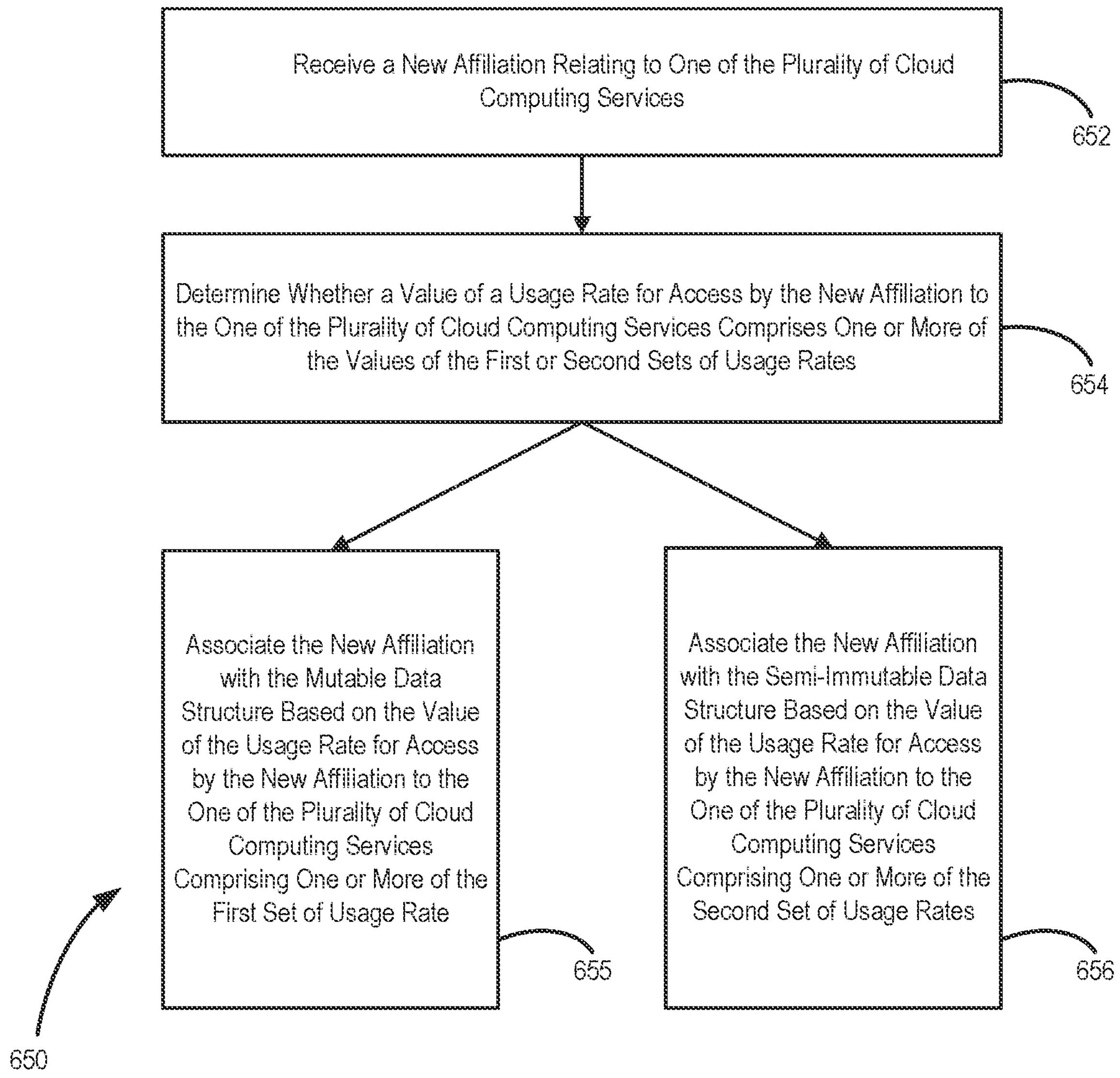
FIG. 21 is a flow diagram illustrating a method of handling new subscriptions to a set of cloud computing services in accordance with an embodiment.

FIG. 21 is a flow diagram illustrating a method 650 of handling new subscriptions to a set of cloud computing services in accordance with an embodiment.

As illustrated in FIG. 21, in accordance with an embodiment, a new affiliation is received at 652, wherein the new affiliation relates to one of the plurality of cloud computing services of the cloud infrastructure environment. In an example embodiment the new affiliation may comprise a new subscription or the like that relates to one of the plurality of cloud computing services.

The method 650 at 654 determines whether a value of a usage rate for access by the new affiliation to the one of the plurality of cloud computing services comprises one or more of the values of the first or second sets of usage rates.

The new affiliation is associated with either the mutable data structure or with the semi-immutable data structure at 655, 656.

In an embodiment the new affiliation is associated at 655 with the mutable data structure based on the value of the usage rate for access by the new affiliation to the one of the plurality of cloud computing services comprising one or more of the first set of usage rates. In an embodiment the new affiliation is associated at 656 with the semi-immutable data structure based on the usage rate for access by the new affiliation to the one of the plurality of cloud computing services comprising one or more of the second set of usage rates.

In an embodiment the new affiliation comprising a new subscription to a cloud service is associated at 655 with the mutable data structure based on the value of the usage rate for access by the new affiliation to the one of the plurality of cloud computing services comprising one or more of the first set of usage rates.

In an embodiment the new affiliation comprising a new subscription to a cloud service is associated at 656 with the semi-immutable data structure based on the usage rate for access by the new affiliation to the one of the plurality of cloud computing services comprising one or more of the second set of usage rates.

Operator Realms as Proxy for Subscription Identification

Figure 22:
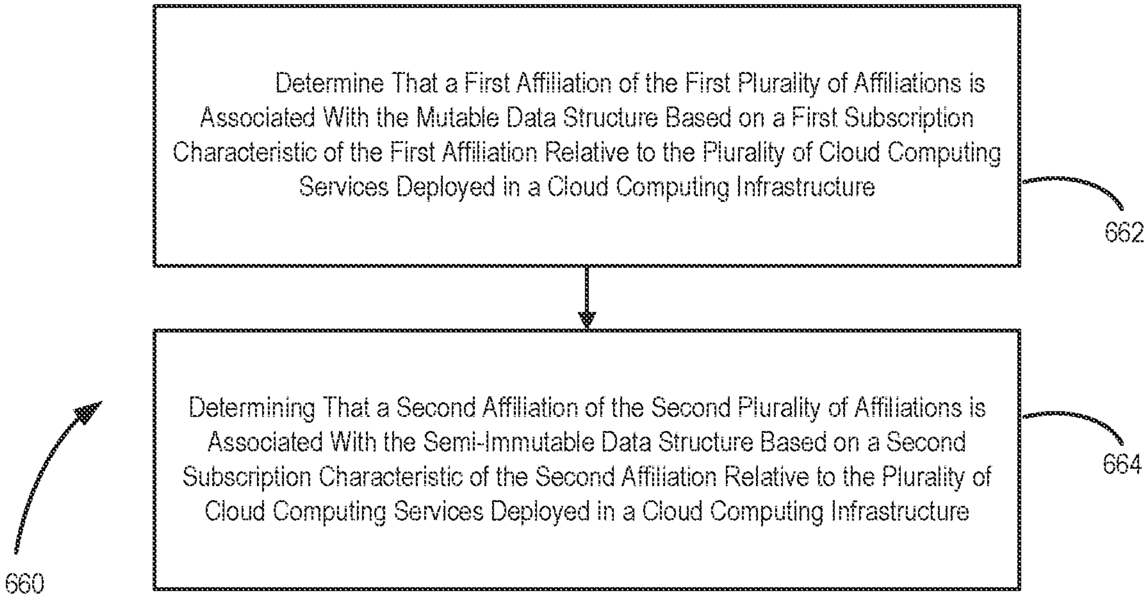
FIG. 22 is a flow diagram illustrating a method of using operator realms as proxies for subscription identification in accordance with an embodiment.

FIG. 22 is a flow diagram illustrating a method 660 of using operator realms as proxies for subscription identification in accordance with an embodiment.

As illustrated in FIG. 22, in accordance with an embodiment, the method 660 determines at 662 that a first affiliation of the first plurality of affiliations is associated with the mutable data structure based on a first subscription characteristic of the first affiliation relative to the plurality of cloud computing services deployed in the cloud computing infrastructure.

In an example embodiment the method 660 determines at 662 that a first affiliation comprising a first subscription of the first plurality of affiliations is associated with the mutable data structure based on the first subscription characteristic of the first affiliation relative to the plurality of cloud computing services deployed in a cloud computing infrastructure.

In an example embodiment the method 660 determines at 662 that the first subscription of the first plurality of affiliations is associated with the mutable data structure based on the first subscription characteristic comprising an operator realm associated with the service usage of the first subscription relative to the plurality of cloud computing services deployed in the cloud computing infrastructure.

With continued reference to FIG. 22, the method 660 determines at 664 that a second affiliation of the second plurality of affiliations is associated with the mutable data structure based on a second subscription characteristic of the second affiliation relative to the plurality of cloud computing services deployed in the cloud computing infrastructure.

In an example embodiment the method 660 determines at 664 that a second affiliation comprising a second subscription of the second plurality of affiliations is associated with the mutable data structure based on the second subscription characteristic of the second affiliation relative to the plurality of cloud computing services deployed in a cloud computing infrastructure.

In an example embodiment the method 660 determines at 662 that the second subscription of the second plurality of affiliations is associated with the mutable data structure based on the second subscription characteristic comprising an operator realm associated with the service usage of the second subscription relative to the plurality of cloud computing services deployed in the cloud computing infrastructure.

Handling New Subscriptions Associated with an ACP Rate Card

Figure 23:
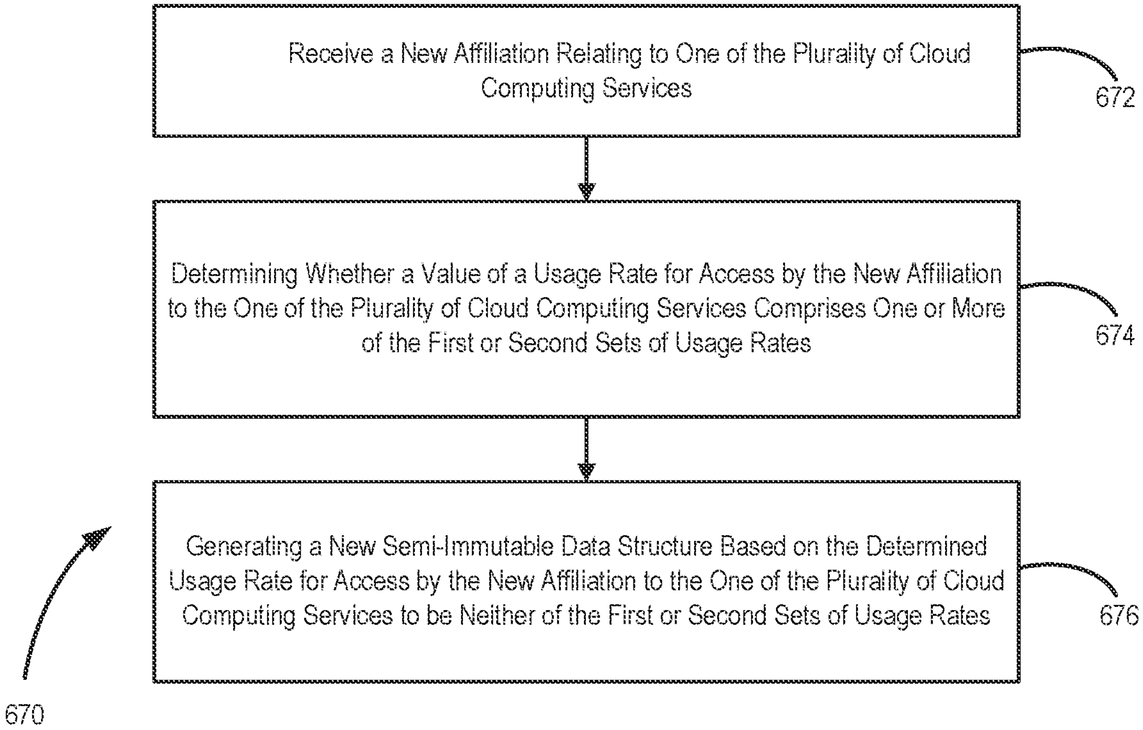
FIG. 23 is a flow diagram illustrating handling new subscriptions to a set of subscriptions associated with ACP rate cards in accordance with an embodiment.

FIG. 23 is a flow diagram illustrating a method 670 for handling new subscriptions to a set of subscriptions associated with ACP rate cards in accordance with an embodiment.

As illustrated in FIG. 23, in accordance with an embodiment, a new affiliation is received at 672, wherein the new affiliation relates to one of the plurality of cloud computing services of the cloud computing infrastructure. In accordance with an embodiment the new affiliation received at 672 may comprise a new subscription or the like to one of the plurality of cloud computing services of the cloud computing infrastructure.

The method 670 determines at 674 whether a value of a usage rate for access by the new affiliation to the one of the plurality of cloud computing services comprises one or more of the first or second sets of usage rates.

A new semi-immutable data structure is generated at 676 based on the determined usage rate for access by the new affiliation to the one of the plurality of cloud computing services to be neither of the first or second sets of usage rates.

Rate Card Migration

In accordance with an embodiment, in order to accommodate the use of dynamic rate cards, a migration service or process can be used to convert/migrate subscriptions that were originally created under a legacy or former subscription pricing model (SPM), to conform instead with a subscription pricing service (SPS) model, for use with the various systems, methods, and features described herein.

Generally described, so-called legacy or SPM rate cards are filled-in for each end customer by salespeople at the time of a subscription order. Each end customer subscription to a cloud application service product therefore has a legacy rate card associated with it; providing a 1:1 relationship in the SPM pricing model between rate cards and product subscriptions. In SPM, each rate card by definition reflects a unit selling price for a given subscription, wherein all discounts are already applied at the time of the order.

Such legacy subscriptions are generally static, with companies defining pricing per customer. However, SPM rate cards may be considered somewhat dynamic to the extent that they may be used to offer the latest price to selected customers irrespective of individual product price changes overall. To support this, the SPM scheme uses pricing policies in association with the legacy rate cards, wherein the combination of a pricing policy and rate card subscription price are used to determine the cost to the end customer.

As described above, in accordance with an embodiment, to address the technical challenges in maintaining end user subscriptions, the system can include a subscription pricing service (SPS) that implements and maintains dynamic rate cards that are base price centric. That is, SPS uses a single global base price for each product at a given time, for a given currency. In the SPS model, the effective base price for a subscription is determined based on a contract date and a subscription Pricing Rule-(1) CurrentDate (At List Price) (2) ContractDate (At Contract Price) (3) Lowest (of the two) (At Contract Price-Price Drop). Unlike the 1:1 legacy rate card to subscription mapping of the SPM subscription model, there is essentially a 1:N mapping between rate cards and end user subscriptions in the new SPS subscription model.

While the 1:N subscription model provided by SPS reduces complexity in pricing and supports modern pricing scenarios via base price modeling and discounts, there is a need to migrate the existing legacy rate cards that use the 1:1 scheme, to the SPS pricing models that use the dynamic rate cards in the 1:N scheme.

In accordance with an embodiment, the system includes a rate card migrator component or migration service or process (referred to herein in some embodiments as an RC-Migrator) that migrates existing subscription and product-specific legacy rate cards, as used in the SPM model, to dynamic rate cards that are used in the SPS model.

In accordance with an embodiment, the rate card migration process uses the configuration/creation dates of SPM rate cards to determine the base price to be applied to the legacy (SPM) rate cards or subscriptions for contract-type subscriptions in SPS.

In accordance with an embodiment, the rate card migration process next determines the discounts to be applied for each subscription, based on a difference between the determined base price in SPS and the original product unit selling price of the subscription in SPM. This difference is reflected in (primary) SPS pricing rules to be applied against the SPS rate card base price for particular subscriptions.

In accordance with an embodiment, special pricing policies that are supported by the legacy (SPM) rate cards or subscriptions are accommodated in the rate card migration process by generating additional (secondary) pricing rules to be applied to the subscriptions in combination with the primary SPS pricing rules and the global base price that was in effect at the configuration/creation date of each of the SPM rate cards.

Figure 24:
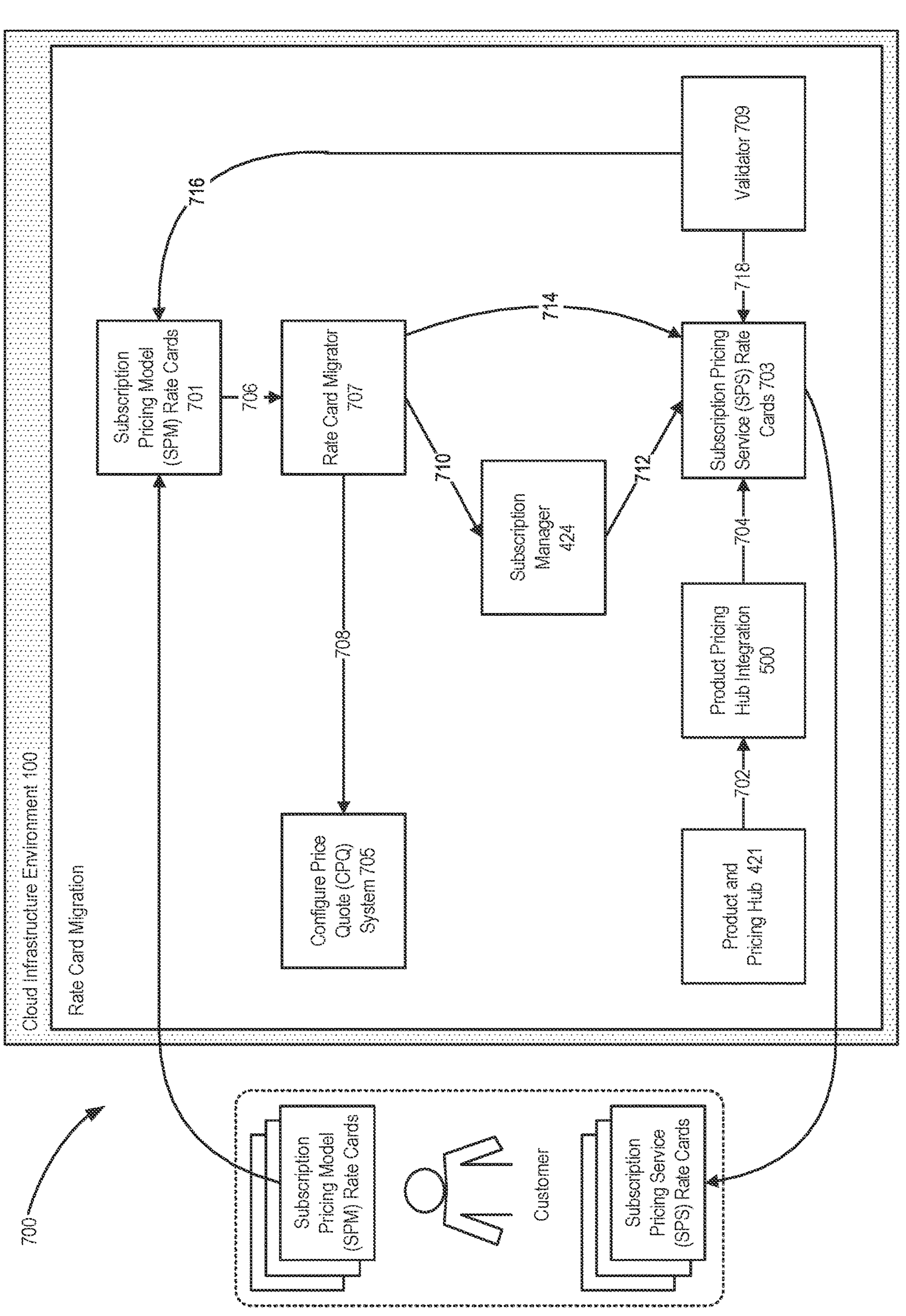
FIG. 24 illustrates an example of a cloud infrastructure architecture providing for migration of rate cards in accordance with an embodiment.

FIG. 24 illustrates an example of a cloud infrastructure architecture 700 providing for migration of rate cards in accordance with an embodiment.

In accordance with an embodiment, FIG. 24 shows in general the manner in which SPM rate cards 701 are migrated to SPS rate cards 703. Overall, the SPS pricing model uses a single global base price for products, and this global base price can be synced into SPS system from a product pricing hub.

At 702, historical data from the inception of SPM is synchronized to SPS.

At step 704, the system inserts product and price list data into the SPS system.

At 706, legacy (SPM) rate cards or subscriptions are delivered to the migration service (RC-Migrator) 707, or are read at 706 by the migration service (RC-Migrator) 707.

At step 708, the system determines the base price to be applied for contract rate types of subscriptions, as determined by for example a configure, price, quote (CPQ) system or application 705 that helps sellers configure products or services, together with quotes, to meet their customers' requirements.

In accordance with an embodiment, SPS requires the quoteConfigureDate of subscription to determine the base price to be applied for CONTRACT_RATE type of subscription. SPS will get this quoteConfigureDate information from CPQ/Source Channels for all subscriptions. SPS system will generate the rate card price list items for given quoteConfigureDate, priceChangePolicy combinations. This rate card price list item only contains the base prices without any discounts. Also, SPS rate cards are common for subscriptions with same quoteConfigureDate and priceChangePolicy.

At step 710, a rate card migrator 707 creates orders in the cloud subscription service, manager, or component, which creates, at 712, subscription pricing configuration information in the SPS system. The subscription pricing configuration contains the subscription quotation date and price list change policy information. In accordance with an embodiment, SPS can generate the rate cards based on this information.

In accordance with an embodiment, at 714 the system creates pricing rules as per the discount mentioned in an SPM rate card for the given subscription, as well as create and deliver to SPS additional pricing rules based on the SPS rate cards and pricing rules.

In accordance with an embodiment, a validator 709 is provided for reading the SPM rate cards, at 716, and the SPS rate cards, at 718, for performing comparisons to validate the results of the SPM-to-SPS rate card migration.

RC-Migrator Process

In accordance with an embodiment, the rate card migration service or process operates in accordance with a two-stage approach to create the pricing rules.

Stage 1: SPM RC Discounts

In a first stage, the system reads the SPM rate cards for each subscription and generate discounts. internally it performs following steps to generate discounts for given subscription:

1. Get the subscription creation date in SPM.
2. Read all the rate cards from SPM for subscription creation date whose reason code is null. This is exact match with rate cards from the Quote created by Sales people.
3. These rate cards contain a unitPriceDiscount (discretionaryDiscount), which the rate card migration service or process needs to generate the pricing rule in SPS.
   a. Group all the products of similar discount category.
   b. Determine the minimum discount in each group.
   c. Create a pricing rule with the minimum discount value for discount category for this group.
   d. From each product in the group subtract the category discount and create a product specific pricing rule if remaining discount is greater than 0.
4. Create pricing rules for ALL_SUBSCRIPTIONS with standard discount percentages from SPM, Typically a mapping of (DiscountCategory+CommitmentModel (Annual, Monthly, Quarterly)→Discount Percentage).
5. Get the SPS rate card and pricing rule created from SPS system.
6. Perform the validation against the SPM unitPrice for all the rate cards of give subscription from order creation until present day.
7. Identify all the SPM rate cards where final price does not match between SPS and SPM. Perform Stage 2 for all such rules.

Stage 2: Additional Discounts

In a second stage, the rate card migration service or process generates additional pricing rules to match the final unitPrice between SPM and SPS model, by performing the following tasks:

1. Read all the mismatched rate cards in stage 1 in the order of their creation.
2. Following sub-steps should be performed for each mismatched rate card:
   a. Determine the difference between the SPM RC unit price and SPS (Rate Cards-all discounts applied for product).
   b. Create a pricing rule with the difference identified in step 2.a. for current product and subscription.
   c. These additional pricing rules should have start date and end date should be same as the corresponding mismatched SPM rate cards.

In accordance with an embodiment, there are scenarios the rate card migration service or process needs to handle for start and end dates of these pricing rules, for example:

Generalized pricing rules should be applicable as per the start date and end date of SPM subscriptions.

If subscription has renewed or replenished, the previous set of rules should get automatically handled as the start date and end date of those pricing rules will be populated from SPM subscriptions.

For mismatched scenarios, those should have start date and end date same as the corresponding mismatched rate cards.

Migrating Legacy Rate Cards

Figure 25:
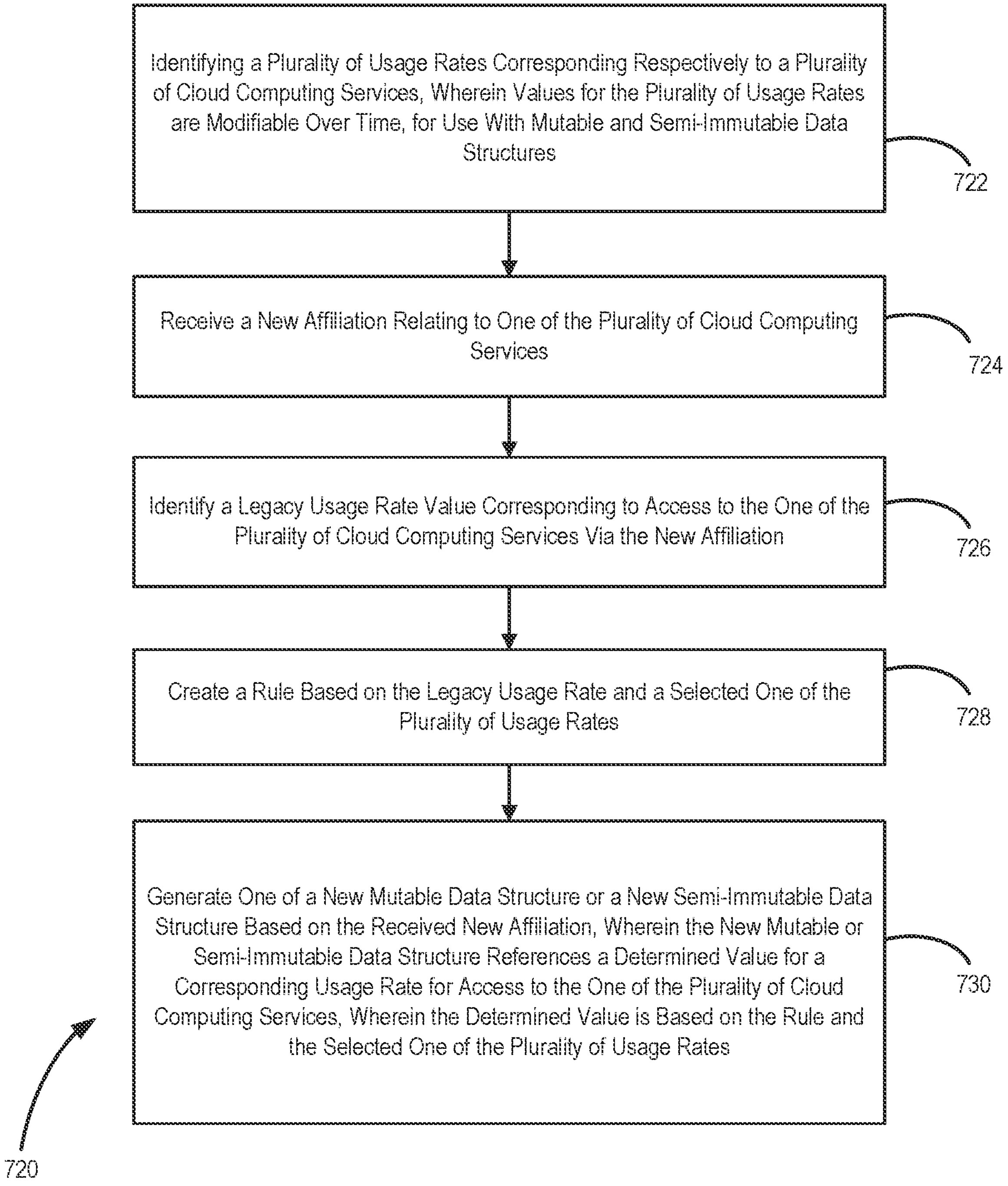
FIG. 25 is a flow diagram illustrating a method of migrating legacy rate cards to a cloud infrastructure environment in accordance with an embodiment.

FIG. 25 is a flow diagram illustrating a method 720 of migrating legacy rate cards to a cloud infrastructure environment in accordance with an embodiment.

As illustrated in FIG. 25, in accordance with an embodiment, the method 720 includes identifying at 722 a plurality of usage rates corresponding respectively to a plurality of cloud computing services, wherein values for the plurality of usage rates are modifiable over time, for use with mutable and semi-immutable data structures. In accordance with an embodiment the identifying at 722 the plurality of usage rates includes identifying the plurality of usage rates, wherein values comprising prices for the plurality of usage rates are modifiable over time, for use with mutable and semi-immutable data structures.

In accordance with an embodiment the mutable data structure references a first set of values for a corresponding first set of usage rates of the plurality of usage rates. In accordance with an embodiment the mutable data structure is modified responsive to determining that a change has occurred in a value of at least one of the first set of usage rates. In accordance with an embodiment, the mutable data structure is associated with a first plurality of affiliations in a one-to-many relationship.

In accordance with an embodiment the semi-immutable data structure references a second set of values for a corresponding second set of usage rates of the plurality of usage rates. In accordance with an embodiment the semi-immutable data structure is not modified responsive to determining that a change has occurred in a value of any of the second set of usage rates. In accordance with an embodiment the semi-immutable data structure is associated with a second plurality of affiliations in a set of one-to-many relationships.

With continued reference to FIG. 25 the method 720 includes receiving at 724 a new affiliation relating to one of the plurality of cloud computing services. In accordance with an embodiment the receiving at 724 the new affiliation includes receiving a new affiliation comprising a new subscription relating to one of the plurality of cloud computing services.

The method 720 includes identifying at 726 a legacy usage rate value corresponding to access to the one of the plurality of cloud computing services via the new affiliation.

The method 720 further includes creating at 728 a rule based on the legacy usage rate and a selected one of the plurality of usage rates. In accordance with an embodiment the creating the rule at 728 comprises creating a pricing/discount rule) based on the legacy usage rate and a selected one of the plurality of usage rates.

The method 720 further includes generating at 730 one of a new mutable data structure or a new semi-immutable data structure based on the received new affiliation. In accordance with an embodiment the new mutable or semi-immutable data structure references a determined value for a corresponding usage rate for access to the one of the plurality of cloud computing services. In accordance with an embodiment the determined value is based on the rule and the selected one of the plurality of usage rates.

Figure 26:
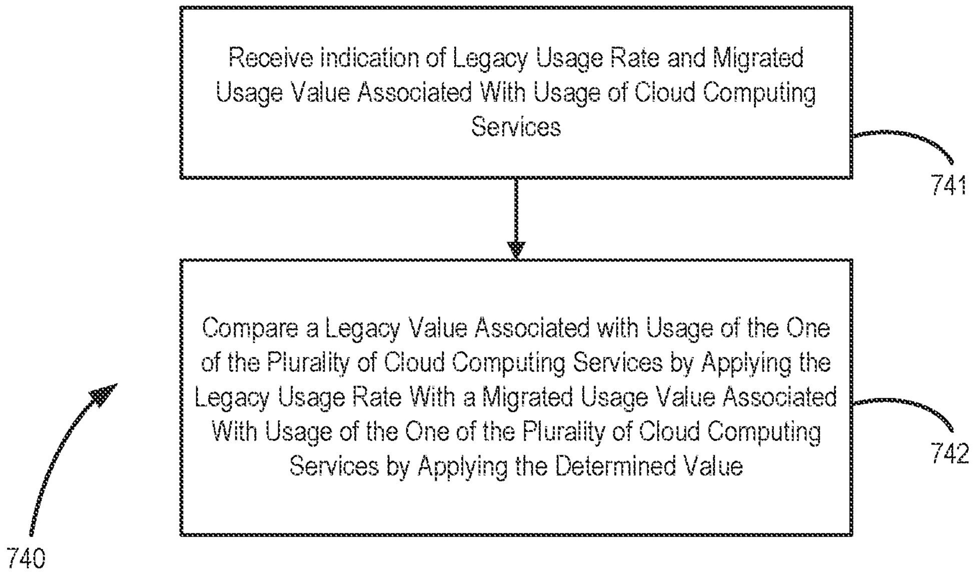
FIG. 26 is a flow diagram illustrating a method of validating migrated legacy rate cards in accordance with an embodiment.

FIG. 26 is a flow diagram illustrating a method 740 of validating migrated legacy rate cards in accordance with an embodiment.

As illustrated in FIG. 26, in accordance with an embodiment, the validation of the subscription migration includes validating the determined value referenced in the new data structure by receiving at 741, and comparing at 742 a legacy value associated with usage of the one of the plurality of cloud computing services with a migrated usage value associated with usage of the one of the plurality of cloud computing services.

In accordance with an embodiment the method 740 of validating the migrated legacy rate cards includes validating the determined value referenced in the new data structure by comparing the legacy value associated with the usage of the one of the plurality of cloud computing services by applying the legacy usage rate, with the migrated usage value associated with the usage of the one of the plurality of cloud computing services by applying the determined value.

Figure 27:
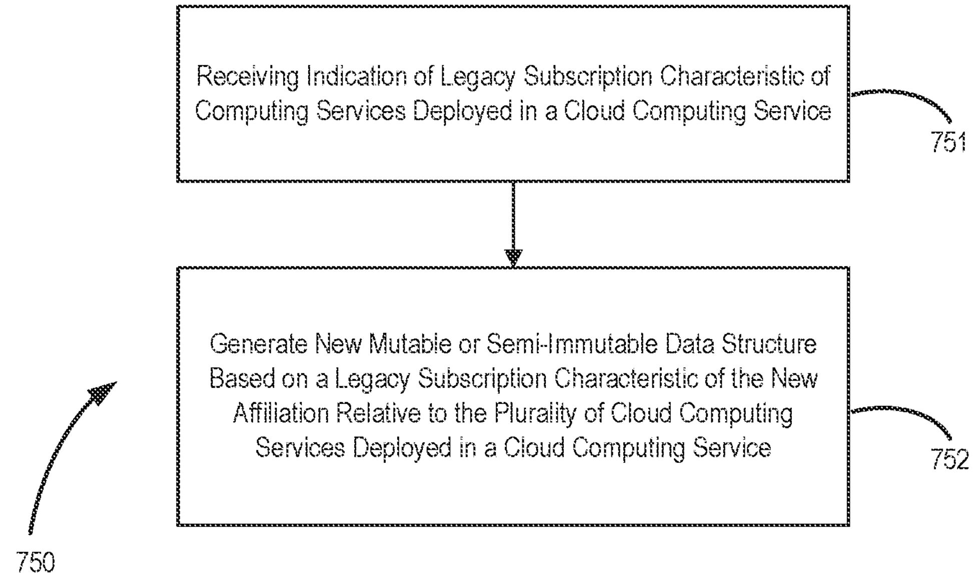
FIG. 27 is a flow diagram illustrating a method of subscription migration in context of operator realms.

FIG. 27 is a flow diagram illustrating a method 750 of subscription migration in context of operator realms.

As illustrated in FIG. 27, in accordance with an embodiment, an indication is received at 751 of legacy subscription characteristics of computing services that are deployed in the cloud computing service. The new mutable or semi-immutable data structure is generated at 752 based on a legacy subscription characteristic of the new affiliation relative to the plurality of cloud computing services deployed in a cloud computing service.

The new mutable or semi-immutable data structure is generated at 752 in accordance with an embodiment based on a legacy subscription characteristic comprising an operator realm associated with the service usage of the new affiliation relative to the plurality of cloud computing services deployed in a cloud computing service.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A method, comprising:

identifying a plurality of usage rates corresponding respectively to a plurality of cloud computing services, wherein values for the plurality of usage rates are modifiable over time, for use with mutable and semi-immutable data structures, wherein the mutable data structure comprises a first set of rate cards that respectively reference a first set of values for a corresponding first set of usage rates of the plurality of usage rates, wherein the mutable data structure is modified responsive to determining that a change has occurred in a value of at least one of the first set of usage rates, said mutable data structure being associated with a first plurality of affiliations in a one-to-many relationship, wherein the semi-immutable data structure comprises a second set of rate cards that respectively reference a second set of values for a corresponding second set of usage rates of the plurality of usage rates, wherein the semi-immutable data structure is not modified responsive to determining that a change has occurred in a value of any of the second set of usage rates, said semi-immutable data structure being associated with a second plurality of affiliations in a set of one-to-many relationships;

receiving a new affiliation or comprising a new subscription relating to one cloud computing service of the plurality of cloud computing services;

responsive to receiving the new affiliation, triggering a process for replacing a legacy rate card with a new mutable or semi-mutable data structure, the process comprising:

identifying a legacy usage rate, associated with a legacy rate card that is different than the first set of rate cards and the second set of rate cards, corresponding to access to the one cloud computing service of the plurality of cloud computing services wherein the legacy rate card has a one-to-one affiliation with an existing subscription to the one cloud computing service;

creating a rule based on the legacy usage rate and a selected one of the plurality of usage rates;

applying the rule to determine a value for a usage rate for access to the one of the plurality of cloud computing services via the new affiliation; and generating one of a new mutable data structure or a new semi-immutable data structure based on the new affiliation, wherein the new mutable or semi-immutable data structure references the value for the usage rate for access to the one cloud computing service of the plurality of cloud computing services via the new affiliation; and wherein the new mutable or semi-immutable data structure is associated with the new affiliation as one of a plurality of affiliations in a one-to-many relationship and replaces the legacy rate card corresponding to the legacy usage rate;

wherein the method is performed by at least one device including a hardware processor.

2. The method according to claim 1, wherein the generating the new mutable or semi-immutable data structure comprises:

generating the new mutable or semi-immutable data structure based on a legacy subscription characteristic or operator realm associated with the service usage of the new affiliation relative to the plurality of cloud computing services deployed in a cloud computing service.

3. The method according to claim 1, further comprising:

identifying a pricing policy associated with the legacy usage rate, wherein the rule is created based on the identified pricing policy and legacy usage rate and the selected one of the plurality of usage rates.

4. The method according to claim 1, wherein the creating the rule comprises:

grouping a plurality of products associated with the legacy usage rate into one or more discount-category groups based on a discount category associated with the products of the plurality of products;

determining a minimum discount value within a particular discount-category group;

creating a category-level pricing rule for the particular discount-category group using the minimum discount value; and per product in the particular discount-category group:

determining a remaining discount based on a discount value associated with the legacy rate card and the minimum discount value; and creating a product-specific pricing rule for the product when the remaining discount is greater than zero.

5. The method according to claim 1, further comprising validating the value referenced in the new data structure by comparing:

a legacy value associated with usage of the one of the plurality of cloud computing services by applying the legacy usage rate, with a migrated usage value associated with usage of the one of the plurality of cloud computing services by applying the determined value.

6. The method according to claim 5, wherein:

validating the value referenced in the new data structure comprises determining a correspondence between the legacy value associated with usage of the one cloud computing service of the plurality of cloud computing services by applying the legacy usage rate, and the migrated usage value associated with usage of the one cloud computing service of the plurality of cloud computing services by applying the value.

7. The method according to claim 1, wherein the creating the rule comprises:

a first stage comprising identifying a mismatch between the identified legacy usage rate and the selected one of the plurality of usage rates corresponding to access by the new affiliation to the one cloud computing service of the plurality of cloud computing services; and a second stage comprising generating in response to identifying the mismatch an additional rule, wherein the additional rule may be combined together with the rule created based on the identified legacy usage rate and the selected one of the plurality of usage rates to cause a match between the identified legacy usage rate and the selected one of the plurality of usage rates corresponding to access by the new affiliation to the one cloud computing service of the plurality of cloud computing services.

8. The method according to claim 7, wherein the additional rule has a start date and an end date that correspond to a start date and an end date of the legacy rate card associated with the mismatch, and wherein, upon renewal or replenishment of a subscription associated with the new affiliation, the start date and end date of the additional rule are automatically set based on the corresponding renewed or replenished subscription.

9. A system, comprising:

one or more computers comprising one or more microprocessors;

a cloud environment running on the one or more computers;

a plurality of services deployed within one or more realms of the cloud environment; and a rate card service operable in a realm of the cloud environment controlled by a cloud infrastructure provider, the rate card service being operable to:

identify a plurality of usage rates corresponding respectively to a plurality of cloud computing services, wherein values for the plurality of usage rates are modifiable over time, for use with mutable and semi-immutable data structures, wherein the mutable data structure comprises a first set of rate cards that respectively reference a first set of values for a corresponding first set of usage rates of the plurality of usage rates, wherein the mutable data structure is modified responsive to determining that a change has occurred in a value of at least one of the first set of usage rates, said mutable data structure being associated with a first plurality of affiliations in a one-to-many relationship, wherein the semi-immutable data structure comprises a second set of rate cards that respectively reference a second set of values for a corresponding second set of usage rates of the plurality of usage rates, wherein the semi-immutable data structure is not modified responsive to determining that a change has occurred in a value of any of the second set of usage rates, said semi-immutable data structure being associated with a second plurality of affiliations in a set of one-to-many relationships;

receive a new affiliation comprising a new subscription relating to one cloud computing service of the plurality of cloud computing services;

responsive to receiving the new affiliation, trigger a process for replacing a legacy rate card with a new mutable or semi-mutable data structure, the process comprising:

identifying a legacy usage rate, associated with a legacy rate card that is different than the first set of rate cards and the second set of rate cards, corresponding to access to the one cloud computing service of the plurality of cloud computing services wherein the legacy rate card has a one-to-one affiliation with an existing subscription to the one cloud computing service;

creating a rule based on the identified legacy usage rate and a selected one of the plurality of usage rates;

applying the rule to determine a value for a usage rate for access to the one of the plurality of cloud computing services via the new affiliation; and generating one of a new mutable data structure or a new semi-immutable data structure based on the new affiliation, wherein the new mutable or semi-immutable data structure references the value for the usage rate for access to the one cloud computing service of the plurality of cloud computing services via the new affiliation; and wherein the new mutable or semi-immutable data structure is associated with the new affiliation as one of a plurality of affiliations in a one-to-many relationship and replaces the legacy rate card corresponding to the legacy usage rate.

10. The system according to claim 9, wherein the rate card service is further operable to:

generate the new mutable or semi-immutable data structure based on a legacy subscription characteristic comprising an operator realm associated with the service usage of the new affiliation relative to the plurality of cloud computing services deployed in a cloud computing service.

11. The system according to claim 9, wherein the rate card service is further operable to:

identify a pricing policy associated with the legacy usage rate, wherein the rule is created based on the identified pricing policy and legacy usage rate and the selected one of the plurality of usage rates.

12. The system according to claim 9, wherein the rate card is further operable to create the rule by:

identifying in a first stage a mismatch between the identified legacy usage rate and the selected one of the plurality of usage rates corresponding to access by the new affiliation to the one cloud computing service of the plurality of cloud computing services; and generating in a second stage in response to identifying the mismatch an additional rule, wherein the additional rule may be combined together with the rule created based on the identified legacy usage rate and the selected one of the plurality of usage rates to cause a match between the identified legacy usage rate and the selected one of the plurality of usage rates corresponding to access by the new affiliation to the one cloud computing service of the plurality of cloud computing services.

13. The system according to claim 9, wherein the rate card service is further operable to:

validate the value referenced in the new data structure by comparing:

a legacy value associated with usage of the one cloud computing service of the plurality of cloud computing services by applying the legacy usage rate, with a migrated usage value associated with usage of the one cloud computing service of the plurality of cloud computing services by applying the value.

14. The system according to claim 13, wherein the rate card service is further operable to validate the value referenced in the new data structure by:

determining a correspondence between the legacy value associated with usage of the one cloud computing service of the plurality of cloud computing services by applying the legacy usage rate, and the migrated usage value associated with usage of the one cloud computing service of the plurality of cloud computing services by applying the determined value.

15. One or more non-transitory computer-readable media storing program instructions that, when executed by one or more hardware processors, cause performance of operations comprising:

identifying a plurality of usage rates corresponding respectively to a plurality of cloud computing services, wherein values for the plurality of usage rates are modifiable over time, for use with mutable and semi-immutable data structures, wherein the mutable data structure comprises a first set of rate cards that respectively reference a first set of values for a corresponding first set of usage rates of the plurality of usage rates, wherein the mutable data structure is modified responsive to determining that a change has occurred in a value of at least one of the first set of usage rates, said mutable data structure being associated with a first plurality of affiliations in a one-to-many relationship, wherein the semi-immutable data structure comprises a second set of rate cards that respectively reference a second set of values for a corresponding second set of usage rates of the plurality of usage rates, wherein the semi-immutable data structure is not modified responsive to determining that a change has occurred in a value of any of the second set of usage rates, said semi-immutable data structure being associated with a second plurality of affiliations in a set of one-to-many relationships;

receiving a new affiliation comprising a new subscription relating to one cloud computing service of the plurality of cloud computing services;

responsive to receiving the new affiliation, triggering a process for replacing a legacy rate card with a new mutable or semi-mutable data structure, the process comprising:

identifying a legacy usage rate, associated with a legacy rate card that is different than the first set of rate cards and the second set of rate cards, corresponding to access to the one cloud computing service of the plurality of cloud computing services wherein the legacy rate card has a one-to-one affiliation with an existing subscription to the one cloud computing service;

creating a rule based on the legacy usage rate and a selected one of the plurality of usage rates;

applying the rule to determine a value for a usage rate for access to the one of the plurality of cloud computing services via the new affiliation; and generating one of a new mutable data structure or a new semi-immutable data structure based on the new affiliation, wherein the new mutable or semi-immutable data structure references the value for the usage rate for access to the one cloud computing service of the plurality of cloud computing services via the new affiliation; and wherein the new mutable or semi-immutable data structure is associated with the new affiliation as one of a plurality of affiliations in a one-to-many relationship and replaces the legacy rate card corresponding to the legacy usage rate.

16. The one or more non-transitory computer-readable media of claim 15, wherein the generating the new mutable or semi-immutable data structure comprises:

generating the new mutable or semi-immutable data structure based on a legacy subscription characteristic or operator realm associated with the service usage of the new affiliation relative to the plurality of cloud computing services deployed in a cloud computing service.

17. The one or more non-transitory computer-readable media of claim 15, the operations further comprising:

identifying a pricing policy associated with the legacy usage rate, wherein the rule is created based on the identified pricing policy and legacy usage rate and the selected one of the plurality of usage rates.

18. The one or more non-transitory computer-readable media of claim 15, wherein creating the rule comprises:

a first stage comprising identifying a mismatch between the identified legacy usage rate and the selected one of the plurality of usage rates corresponding to access by the new affiliation to the one cloud computing service of the plurality of cloud computing services; and a second stage comprising generating in response to identifying the mismatch an additional rule, wherein the additional rule may be combined together with the rule created based on the identified legacy usage rate and the selected one of the plurality of usage rates to cause a match between the identified legacy usage rate and the selected one of the plurality of usage rates corresponding to access by the new affiliation to the one cloud computing service of the plurality of the cloud computing services.

19. The one or more non-transitory computer-readable media of claim 15, the operations further comprising validating the value referenced in the new data structure by comparing:

a legacy value associated with usage of the one of the plurality of cloud computing services by applying the legacy usage rate, with a migrated usage value associated with usage of the one of the plurality of cloud computing services by applying the value.

20. The one or more non-transitory computer-readable media of claim 19, wherein:

validating the value referenced in the new data structure comprises determining a correspondence between the legacy value associated with usage of the one of the plurality of cloud computing services by applying the legacy usage rate, and the migrated usage value associated with usage of the one of the plurality of cloud computing services by applying the value.

* * * * *